US011378282B2

(12) United States Patent
Field et al.

(10) Patent No.: US 11,378,282 B2
(45) Date of Patent: Jul. 5, 2022

(54) ENERGY STORAGE SYSTEMS

(71) Applicant: Sunamp Limited, East Lothian (GB)

(72) Inventors: John Field, Berwickshire (GB);
Andrew Bissell, East Lothian (GB)

(73) Assignee: Sunamp Limited, Tranent (GB)

( * ) Notice: Subject to any disclaimer, the term of this patent is extended or adjusted under 35 U.S.C. 154(b) by 0 days.

(21) Appl. No.: 16/740,459

(22) Filed: Jan. 12, 2020

(65) Prior Publication Data
US 2020/0217518 A1    Jul. 9, 2020

Related U.S. Application Data

(63) Continuation of application No. 15/871,225, filed on Jan. 15, 2018, now Pat. No. 10,900,667, which is a
(Continued)

(30) Foreign Application Priority Data

Nov. 16, 2009  (GB) .................................... 0919934

(51) Int. Cl.
*F24D 11/00* (2022.01)
*F24D 11/02* (2006.01)
(Continued)

(52) U.S. Cl.
CPC .......... *F24D 11/004* (2013.01); *F24D 11/003* (2013.01); *F24D 11/0214* (2013.01); *F24H 7/04* (2013.01); *F24H 7/0441* (2013.01); *F24H 9/20* (2013.01); *F24H 9/2014* (2013.01); *F24S 10/45* (2018.05); *F24S 10/95* (2018.05); *F24S 60/10* (2018.05); *F28D 20/02* (2013.01); *F28D 20/021* (2013.01); *F24D 2200/11* (2013.01); *F24D 2200/12* (2013.01); *F24D 2200/14* (2013.01); *F24D 2200/16* (2013.01);
(Continued)

(58) Field of Classification Search
None
See application file for complete search history.

(56) References Cited

U.S. PATENT DOCUMENTS 3,623,549 A  11/1971  Smith, Jr.
3,989,927 A  11/1976  Erb
(Continued)

FOREIGN PATENT DOCUMENTS

AT    382636 B    3/1987
AT    508922 A1   5/2011
(Continued)

OTHER PUBLICATIONS

Communication Pursuant to Article 94(3) EPC, EP Application No. 09746088.5-1602, EPO (dated May 3, 2017).
(Continued)

*Primary Examiner* — Avinash A Savani
*Assistant Examiner* — Deepak A Deean
(74) *Attorney, Agent, or Firm* — Wright IP & International Law; Eric G. Wright

(57) ABSTRACT

There is herein described energy storage systems. More particularly, there is herein described thermal energy storage systems and use of energy storable material such as phase change material in the provision of heating and/or cooling systems in, for example, domestic dwellings.

6 Claims, 37 Drawing Sheets

Related U.S. Application Data continuation of application No. 13/509,979, filed as application No. PCT/GB2010/051910 on Nov. 16, 2010, now abandoned.

(51) Int. Cl.
| | | |
|---|---|---|
| *F24H 7/04* | (2006.01) | |
| *F24H 9/20* | (2022.01) | |
| *F28D 20/02* | (2006.01) | |
| *F24S 10/40* | (2018.01) | |
| *F24S 60/10* | (2018.01) | |
| *F24S 10/95* | (2018.01) | |

(52) U.S. Cl.
CPC ...... *F24D 2200/20* (2013.01); *F24D 2220/10* (2013.01); *F24H 2240/08* (2013.01); *Y02B 10/20* (2013.01); *Y02B 10/40* (2013.01); *Y02B 10/70* (2013.01); *Y02B 30/12* (2013.01); *Y02B 30/52* (2013.01); *Y02E 10/44* (2013.01); *Y02E 60/14* (2013.01); *Y10T 29/4935* (2015.01)

(56) References Cited

U.S. PATENT DOCUMENTS

| | | | |
|---|---|---|---|
| 4,182,409 A | 1/1980 | Robinson, Jr. | |
| 4,199,021 A * | 4/1980 | Thoma | F28D 20/028 165/10 |
| 4,250,866 A | 2/1981 | Telkes | |
| 4,402,188 A | 9/1983 | Skala | |
| 4,637,219 A | 1/1987 | Grose | |
| 4,727,726 A | 3/1988 | Mitani et al. | |
| 4,750,543 A | 6/1988 | Edelstein | |
| 4,893,476 A | 1/1990 | Bos et al. | |
| 5,445,213 A | 8/1995 | Im | |
| 5,497,629 A | 3/1996 | Rafalovich et al. | |
| 5,507,337 A | 4/1996 | Rafalovich et al. | |
| 5,755,104 A | 5/1998 | Rafalovich et al. | |
| 5,770,903 A | 6/1998 | Bland et al. | |
| 5,953,207 A | 9/1999 | Aakalu et al. | |
| 6,371,198 B1 | 4/2002 | Hirano | |
| 6,668,567 B2 | 12/2003 | Levenduski et al. | |
| 6,701,914 B2 | 3/2004 | Schwarz | |
| 8,443,868 B2 | 5/2013 | Barnwell | |
| 8,495,894 B2 | 7/2013 | Kerler et al. | |
| 9,719,688 B2 | 8/2017 | Holloway et al. | |
| 10,012,451 B2 | 7/2018 | Owens et al. | |
| 2002/0082747 A1* | 6/2002 | Kramer | H02J 3/005 700/276 |
| 2007/0175609 A1 | 8/2007 | Christ et al. | |
| 2008/0039979 A1* | 2/2008 | Bridges | B60L 53/65 700/292 |
| 2008/0115911 A1 | 5/2008 | Duesterhoeft | |
| 2008/0167756 A1* | 7/2008 | Golden | G06N 5/04 700/297 |
| 2010/0000707 A1 | 1/2010 | Tsubone et al. | |

FOREIGN PATENT DOCUMENTS

| | | |
|---|---|---|
| AT | 508992 A1 | 5/2011 |
| DE | 2054057 A1 | 5/1972 |
| DE | 2524393 A1 | 12/1976 |
| DE | 4419887 A1 | 1/1995 |
| DE | 29914113 U1 | 10/1999 |
| DE | 20022367 U1 | 12/2001 |
| DE | 10248064 A1 | 4/2004 |
| EP | 0203501 A1 | 12/1986 |
| EP | 0921365 A2 | 6/1999 |
| EP | 0995963 A1 | 4/2000 |
| EP | 0998869 A1 | 5/2000 |
| EP | 2098807 A2 | 9/2009 |
| EP | 2108910 A1 | 10/2009 |
| GB | 1396292 | 6/1975 |
| GB | 2280746 A | 2/1995 |
| JP | S61265492 A | 11/1986 |
| JP | H07091755 A | 4/1995 |
| JP | 8-192619 A | 7/1996 |
| JP | 2003106681 A | 4/2003 |
| NL | 1018449 C2 | 1/2003 |
| WO | 9516175 A1 | 6/1995 |
| WO | 2011058383 A2 | 5/2011 |

OTHER PUBLICATIONS

International Search Report, PCT/GB2010/051910, EPO (dated Apr. 11, 2012).
Communication Pursuant to Article 94(3) EPC, EP Application No. 09 746 088.5 -1602, EPO (dated Jun. 20, 2018).
Communication Pursuant to Article 94(3) EPC, EP Application No. 09 746 088.5-1602, EPO (dated Sep. 23, 2016).
Communication Pursuant to Article 94(3) EPC, EP Application No. 09 746 088.5-1602, EPO (dated Nov. 9, 2015).
Communication Pursuant to Article 94(3) EPC, EP Application No. 09 746 088.5-1602, EPO (dated Apr. 13, 2015).
International Search Report, PCT/GB2009/050449, EPO (dated Nov. 12, 2009).

* cited by examiner

ENERGY STORAGE SYSTEMS

CROSS-REFERENCE TO RELATED APPLICATIONS

This patent application is a continuation application of and claims benefit of the filing date of copending U.S. application Ser. No. 15/871,225 titled "Energy Storage Systems" filed Jan. 15, 2018 which is a continuation application of and claims benefit of the filing date of copending U.S. application Ser. No. 13/509,979 titled "Energy Storage Systems" filed May 16, 2012, which is a US National Stage Entry of PCT/GB2010/051910 titled "Energy Storage Systems" filed Nov. 16, 2010, and which claims foreign priority to United Kingdom application GB 0919934.0 titled "Energy Storage Systems" filed Nov. 16, 2009. Thus, this patent application claims foreign priority to GB 0919934.0 filed Nov. 16, 2009, through Ser. No. 15/871,225 filed Jan. 15, 2018 and through Ser. No. 13/509,979 filed May 16, 2012 and through PCT/GB2010/051910 filed Nov. 16, 2010, to each of which domestic benefit is claimed.

INCORPORATION BY REFERENCE

This patent application incorporates by reference in its entirety copending U.S. application Ser. No. 15/871,225 titled "Energy Storage Systems" filed Jan. 15, 2018, which incorporates by reference in its entirety copending U.S. application Ser. No. 13/509,979 titled "Energy Storage Systems" filed May 16, 2012, and incorporates by reference in its entirety PCT/GB2010/051910 titled "Energy Storage Systems" filed Nov. 16, 2010, and also incorporates by reference in its entirety United Kingdom application GB 0919934.0 titled "Energy Storage Systems" filed Nov. 16, 2009. Thus, this application incorporates by reference in their entirety each of: U.S. application Ser. No. 15/871,225 filed Jan. 15, 2018; U.S. application Ser. No. 13/509,979 filed May 16, 2012; PCT/GB2010/051910 filed Nov. 16, 2010, and United Kingdom application GB 0919934.0 filed Nov. 16, 2009.

FIELD OF THE INVENTION

This invention relates to energy storage systems. More particularly, the present invention relates to thermal energy storage systems and use of energy storable material such as phase change material in the provision of heating and/or cooling systems in, for example, domestic dwellings.

BACKGROUND OF THE INVENTION

Although there are many heating and cooling systems on the market many of these prior art systems suffer from efficiency problems and are also expensive to run. Prior art systems also tend to be based on fossil fuels which are environmentally unfriendly.

Space heating ("heat") and hot water are an expected facility in homes, offices, factories, hotels, shops, etc around the world. Recent common practice has been to deliver this type of heating on-demand by burning storable energy sources (e.g. oil, gas and the like) or by using electrical energy (typically generated from gas or coal) in a heating element.

In most cities in the world, the storage of fuel takes place at centralized facilities (e.g. gas storage tanks; piles of coal at a power station) and is transferred via a distribution grid on-demand to the user (e.g. gas pipes, electricity lines etc.).

Modern gas and oil condensing boilers convert oil and gas to heat at over 90% efficiency. Electrical elements operate at almost 100% efficiency. Superficially this looks better, however most electricity is generated from gas, oil or coal with only around 30% efficiency. So going back to the original fuel, electric heating is only around 30% efficient.

Typically the stored fuels (coal, oil, gas) are fossil fuels. These are convenient stores of "fossil sunlight." Their energy originates from the sun, via photosynthesis in plants which were ultimately trapped underground. They were laid down over millions of years but we are burning them in hundreds. As a result we face major problems in continuing to use these fossil fuels:

They will run out within foreseeable timeframes (ranging from decades for oil to centuries for gas and coal). Long before they reach depletion, once they pass their peak in production, prices rise rapidly.

Huge quantities of atmospheric $CO_2$ were sequestered in the ground during their formation.

We are releasing this $CO_2$ back into the atmosphere at a hugely accelerated rate. The consequence is climate change with potentially catastrophic consequences in loss of both planetary biodiversity and human habitat (water shortages, desertification, and sea level rise).

There are many proposed methods to reduce and ultimately remove reliance on fossil fuels. In essence, they all seek to move the source of energy from ancient, fossil sunlight to current sunlight, with varying degrees of directness.

For heating and cooling applications, heat pumps can be used to move and concentrate naturally occurring or waste heat energy. To drive heat pumps requires electrical energy. Fossil-free energy sources driven from the sun include:

Photovoltaics that convert sunlight to electricity with efficiencies from under 10% to over 20% for cost-effective panels.

Solar thermal electricity generating plants concentrate sunlight to heat a working fluid which drives a generator. They must be located in areas of high direct sunlight, e.g. deserts. They are therefore only really suited to generating grid electricity.

Wind turbines harness winds which originate from solar energy driving the movement of air masses. It is rare that good wind resource exists at the point of use allowing co-location of generation and use.

Hydro electricity uses the gravitational potential energy of water running from high places to lower places. Except in very few parts of the world, hydro cannot provide the bulk of the demand for grid electricity. There are limited further sites to implement large reservoirs, and there can be human and bio-diversity issues around flooding large areas.

Wave power uses waves which are largely generated by action of the wind on the sea. In turn the wind is powered by the sun.

Bio-fuels: Wood can be burnt directly in thermal power stations the way coal is. A wide variety of feedstocks can be processed to make liquid or gaseous fuels. Whether using corn, rape-seed oil, saw grass, animal wastes or used cooking oil, the energy in them derives from current sunlight. However there are major concerns about competition between food and bio-fuel crop production, and between bio-fuel crops and naturally bio-diverse land (e.g. the elimination of jungle for palm oil).

It can be observed that apart from biofuels and some hydro, solar-driven renewables energy conversion devices do not operate on-demand (or in the jargon of the electricity generating industry, they are not "dispatchable"): their energy comes when the sun shines; when the wind blows; when seas are high. Energy available is statistically predictable at the scale of days, weeks, months or years; however electricity grids need to be balanced at the level of minutes, quarter or half hours.

Storing electrical energy is difficult. At present electricity grids include almost no storage—they are balanced in real-time. Hydro-electric reservoirs provide one opportunity to store electricity. When excess electricity is available on the grid, it can be used to pump water from a lower level to the higher reservoir, thus storing the electrical energy in the form of gravitational potential energy in the water that was moved uphill. When the grid is short of electricity this water can be allowed to flow down through the turbines and re-generated into electricity. This process is 90% efficient, but suitable pumped-storage hydro sites are scarce.

Another approach, proposed as an application of the current invention, is to convert surplus electrical energy from intermittent renewable sources into heat or cool when the electricity is available, store the heat or cool in a thermal store and then make it available as useful heat and cool on demand.

Thermal energy storage technologies store heat, for example from active solar collectors, in an insulated repository for later use in space heating, domestic or process hot water, or to generate electricity. Most practical active solar heating systems have storage for a few hours to a days worth of heat collected. There are also a small but growing number of seasonal thermal stores, used to store summer heat for use during winter.

Phase change materials have previously been employed in energy storage devices using the solid-liquid phase change. The liquid-gas phase change material is usually not practical for use as thermal storage due to the large volumes or high pressures required to store the materials when in their gas phase.

Initially, the solid-liquid phase change materials perform like conventional storage materials; their temperature rises as they absorb heat. Unlike conventional storage materials, however, when phase change materials reach the temperature at which they change phase (their melting point) they absorb large amounts of heat without a significant rise in temperature. When the ambient temperature around a liquid material falls, the phase change material solidifies, releasing its stored latent heat. Within the human comfort range of 20° to 30° C., some phase change materials are very effective. They can store about 5 to 14 times more heat per unit volume than conventional storage materials such as water, masonry, or rock.

Phase change materials can be broadly grouped into two categories: organic compounds (such as waxes, vegetable extract, polyethylene glycol); and salt-based products (such as Glauber's salt). The most commonly used phase change materials are salt hydrates, fatty acids and esters, and various paraffins (such as octadecane). Recently, also ionic liquids were investigated as phase change materials. As most of the organic solutions are water free, they can be exposed to air, but all salt based phase change materials solutions must be encapsulated to prevent water evaporation. Both types offer certain advantages and disadvantages for certain applications.

Eutectic salts, a class of phase change materials, have also been used since the late 1800s as a medium for thermal storage applications. They have been used in such diverse applications as refrigerated transportation for rail and road applications and their physical properties are, therefore, well-known.

The temperature ranges offered by phase change material technology provides a new horizon for building services and refrigeration engineers regarding medium and high temperature energy storage applications. The scope of these thermal energy applications are wide ranging such as solar heating, hot water, heating rejection, air conditioning and thermal energy storage applications.

However, there are a number of problems with practical use of phase change materials including achieving suitable rates of heat transfer in and out and acceptable levels of thermodynamic efficiency.

It is an object of at least one aspect of the present invention to obviate or at least mitigate one or more of the aforementioned problems.

It is a further object of the present invention to provide an improved thermal energy store.

It is a further object of the present invention to provide an improved heating and/or cooling system comprising phase change material.

SUMMARY OF THE INVENTION

According to a first aspect of the present invention there is provided a heating and/or cooling system comprising:
a thermal energy source; and
a series of banks containing thermal energy storage material;
wherein the thermal energy storage material in the series of banks is capable of storing and/or releasing energy at different temperatures.

The heating and/or cooling system may form part of or may include within it a thermal energy store.

According to a second aspect of the present invention there is provided a thermal energy store capable of accepting and/or storing and/or releasing thermal energy at a range of one or more temperatures to/from at least one thermal energy source and/or sink, said thermal energy store comprising:
a configuration of one or more thermal energy storage banks, each of said thermal energy storage banks having an operating temperature range;
at least one or more of the thermal energy storage banks capable of containing an appropriate amount and type of thermal energy storage material comprising a single material or a mixture of materials;
wherein said thermal energy storage material in at least one bank contains at least some of one or more types of thermal energy storage material that undergoes at least one energy absorbing and/or releasing phase transition at one or more temperatures or one or more sub-ranges of temperatures within the usual operating temperature range of each bank; and
wherein each phase transition is associated with a change in the physical and/or chemical properties of said thermal energy storage material.

In preferred embodiments, at least one or all of the phase transitions may be reversible without substantial loss of energy absorbing and/or storing and/or releasing capacity across at least more than one reversible cycle or cycles.

Typically, the heat storage (i.e. thermal energy storage) material may undergo a solid-liquid phase change and may store/release energy on undergoing a phase change. This process may occur a plurality of times.

The present invention therefore relates to a thermal energy store and resulting thermal energy storage. The technology described in the present invention may be used in a number of technologies that store energy in, for example, a thermal reservoir for later re-use. A particular advantage of using solid-liquid phase change material as set out in the present invention is to balance energy demand between day time and night time. A thermal reservoir may be maintained at a temperature above (i.e. hotter) or below (i.e. colder) than that of the ambient environment. The present invention can therefore be used in both a heating and/or a refrigeration system. A particular use of the present invention is in air conditioning units or in central heating systems.

Typically, the thermal energy store may comprise at least one bank or a plurality of banks. The at least one or plurality of banks may contain one or more heat exchanger means that may permit thermal energy to be transferred (e.g. by conduction and/or radiation and/or convection and/or heat pipe and/or thermal energy transfer indirectly via a thermal energy transfer fluid and/or any other means of thermal energy transfer) to and/or from at least one thermal energy sources and/or sinks.

The heat exchanger means in at least one bank may permit thermal energy to be simultaneously or substantially simultaneously transferred (and, for example, with the same heat exchanger means, also on other occasions, non-simultaneously transferred) to and/or from two or more thermal energy sources and/or sinks.

The heat exchanger means in at least one bank may permit thermal energy to be simultaneously (and, for example, with the same heat exchanger means, also on other occasions, non-simultaneously and/or simultaneously only in relation to some subset of the possible set of thermal energy sources/sinks) transferred to and/or from three or more thermal energy sources/sinks.

In particular embodiments, the number of potentially simultaneous thermal energy sources and/or sinks may be four or more, five or more, six or more, seven or more, eight or more, nine or more, or ten or more. There may therefore be a plurality of thermal energy sources and/or sinks.

There may therefore be multiple sources with varying temperatures.

In particular embodiments, the thermal store may comprise two or more banks, three or more banks, four or more banks, five or more banks, six or more banks, seven or more banks, eight or more banks, nine or more banks, or ten or more banks. There may therefore be a plurality of banks.

Typically, the thermal store and/or each bank and/or a plurality of banks may be capable of accepting and/or storing and/or releasing thermal energy at a range of one or more temperatures to and/or from one or more thermal energy sources and/or sinks simultaneously or at different times.

At least one or all of the banks in the thermal store may be nested. Typically, a configuration of banks may be wholly and/or partially nested within one another.

At least one of the one or more outer banks (meaning, without considering any interposing insulation, being entirely and/or mostly surrounded by one or more local environments external to the thermal energy store and meaning not being enclosed substantially and/or at all by any other bank) may be at or substantially near the temperature of the one or more local environments enclosing the thermal energy store.

The one or more hottest banks (meaning, for example but not limited to, the bank having a phase transition temperature and/or current average and/or maximum and/or minimum temperature of its thermal energy storage material which is the highest in absolute terms from the set of all banks within the thermal energy store and/or represents a local maximum) may be at least one of the one or more innermost nested banks (meaning that bank or those banks for which no other bank is wholly and/or mostly enclosed within it/them).

The one or more coldest banks (meaning, for example but not limited to, the bank having a phase transition temperature and/or current average and/or maximum and/or minimum temperature of its thermal energy storage material which is the lowest in absolute terms from the set of all banks within the thermal energy store and/or represents a local minimum) may be at least one of the one or more innermost nested banks (meaning that bank or those banks for which no other bank is wholly and/or mostly enclosed within it/them).

The thermal energy store may include at least one coldest bank and one hottest bank, each of which may be an innermost bank.

Typically nesting, and/or wholly and/or partially enclosing banks within one another, may reduce the thermal energy lost from the thermal energy store to its one or more surrounding local environments compared to the case where no nesting is used.

In particular embodiments, at least one thermal energy sources/sinks may be external to the thermal store. At least one thermal energy source/sink may be within at least one bank of the thermal energy store.

Typically, the thermal energy store may comprise at least one thermal energy transfer connection between at least one thermal energy source and one thermal energy sink.

The thermal energy store may comprise at least one thermal energy transfer connection between at least one thermal energy source/sink within the thermal store and at least one thermal energy sink/source external to the thermal store.

The thermal energy store may comprise at least one thermal energy transfer connection between at least one thermal energy source/sink within at least one first bank of the thermal store and at least one thermal energy sink/source within at least one second bank of the thermal store.

Typically, any thermal energy source/sink within a bank comprises at least some thermal energy storage material in thermal contact (whether directly physically in contact or radiatively in thermal contact or otherwise) with the one or more heat exchanger means within the bank. The heat exchanger means may permit thermal energy to be removed from and/or delivered to (by conduction and/or radiation and/or convection and/or heat pipe and/or thermal energy transfer indirectly via a thermal energy transfer fluid and/or any other means of thermal energy transfer) the thermal energy storage material within the bank by transfer to/from at least one thermal energy transfer connection comprising at least one thermal energy transfer medium (including but not limited to thermally conductive metal and/or high thermal conductivity plastic and/or gas and/or refrigerant and/or electromagnetic radiation and/or liquid and/or other heat transfer fluid).

The at least one thermal energy transfer connection comprising at least one thermal energy transfer medium permits thermal energy to be transferred from/to at least one thermal energy source/sink external to the thermal store which is in thermal contact (whether directly physically in contact or radiatively in thermal contact or otherwise) with the at least one thermal energy transfer connection.

The thermal energy transfer medium of the thermal energy transfer connection may be contained within and/or enclosed by and/or directed by one or more pipes and/or other vessels and/or enclosures (which may be closed and/or open, and may be point-to-point in nature and/or form a loop and/or form all or part of a network) to promote and/or assist and/or ensure the thermal energy transfer medium's function to transfer thermal energy from the thermal energy source at one end of the thermal energy transfer connection to the thermal energy sink as the thermal energy transfer medium may be pumped and/or otherwise caused to move by the application of external energy and/or by natural processes (such as but not limited to convection and/or thermosyphoning and/or capillary action) in such a way as to promote and/or assist and/or ensure its function to transfer thermal energy from the thermal energy source at one end of the thermal energy transfer connection to the thermal energy sink at the other or vice-versa.

Typically, at least one thermal energy transfer connection may comprise and/or include a heat pipe or a pipe circuit containing heat transfer fluid driven by a pump.

Thermal energy may be caused to move within and/or through the thermal energy transfer connection by the application of external energy (such as but not limited to heat pumping and/or thermoelectric effects and/or thermionic emission) and/or by natural processes (such as but not limited to convection and/or thermosyphoning and/or capillary action) in such a way as to promote and/or assist and/or ensure the thermal energy transfer medium's function to transfer thermal energy from the thermal energy source at one end of the thermal transfer connection to the thermal energy sink at the other or vice-versa.

The thermal energy transfer connection may comprise and/or incorporate one or more devices for transferring heat from a lower temperature body to a higher temperature body wherein such devices may include, but are not limited to:
 a vapour compression heat pump;
 and/or chemical heat pump;
 and/or thermoelectric device;
 and/or thermionic device;
 and/or any other device capable of moving heat from a lower temperature body to a higher temperature body operating within the laws of thermodynamics.

The thermal store may incorporate integrally within its function and/or structure and/or control logic one or more devices for transferring heat from a lower temperature body to a higher temperature body wherein such devices may include, but are not limited to:
 a vapour compression heat pump;
 and/or chemical heat pump;
 and/or thermoelectric device;
 and/or thermionic device;
 and/or any other device capable of moving heat from a lower temperature body to a higher temperature body operating within the laws of thermodynamics.

The heating and/or cooling system may incorporate integrally within its function and/or structure and/or control logic one or more devices for transferring heat from a lower temperature body to a higher temperature body wherein such devices may include, but are not limited to:
 a vapour compression heat pump;
 and/or chemical heat pump;
 and/or thermoelectric device;
 and/or thermionic device;
 and/or any other device capable of moving heat from a lower temperature body to a higher temperature body operating within the laws of thermodynamics.

The thermal energy transfer connection may link two or more banks and may comprise and/or incorporates one or more devices for transferring heat from a lower temperature body to a higher temperature body wherein such devices may include, but are not limited to:
 a vapour compression heat pump;
 and/or chemical heat pump;
 and/or thermoelectric device;
 and/or thermionic device;
 and/or any other device capable of moving heat from a lower temperature body to a higher temperature body operating within the laws of thermodynamics.

The ability to transfer thermal energy of a thermal energy transfer connection and/or a part of a thermal energy transfer connection and/or heat exchanger means within a bank connected to such a thermal energy transfer connection and/or heat exchanger means external to the thermal energy store connected to such a thermal energy transfer connection may be modulated between a state in which it is maximally resistant to and/or completely incapable of transferring thermal energy and a state in which it is at its minimal resistance to transferring thermal energy and/or modulated to any degree of permissiveness between the minimum and maximum levels.

Changes of thermal permissiveness may be accomplished by, for example, but not limited to, varying the amount of motivating energy, whether electrical or otherwise, applied to a pump and/or a heat pump and/or thermoelectric device and/or other apparatus, and/or by varying the rate of flow of a thermal energy transfer fluid, and/or by selecting from the available set of channels and/or pipes capable of carrying thermal energy transfer fluid through heat exchange means and/or thermal energy transfer connections a subset that are at a specific moment opened to carry thermal energy transfer fluid using, for example, but not limited to, valves and/or motor-driven valves and/or manifolds and/or solenoids.

Change of thermal permissiveness may occur by changes to the physical configuration of the structure of the heat exchanger and/or thermal energy transfer connection means and/or the thermal energy transfer fluid in response to, for example, but not limited to, the physical state of the thermal store and/or some part of the thermal store, and/or the physical state of the environment surrounding the thermal store and/or some other stimulus, for instance, but not limited to, temperature changes at either end of a thermosyphon or heat pipe switching on or off and/or modulating its ability to transfer thermal energy, and/or a specially designed heat pipe with a reservoir for its thermal energy transfer fluid having that reservoir opened and/or closed, and/or a bi-metallic strip acting in response to a temperature change to open and/or close a valve.

The modulation may be controlled and/or influenced by, for instance, but not limited to, user stimulus and/or the action of a thermostat and/or mechanical and/or electrical controller and/or control program running on a programmable computation system, responding in turn to the physical state of the thermal store and/or some part of the thermal store, and/or the physical state of the environment surrounding the thermal store.

At least some of the banks may have overlapping and/or identical usual operating temperature ranges.

At least some of the banks may have distinct, non-overlapping usual operating temperature ranges.

At least two banks and/or at least one bank and at least one external thermal energy source/sink may be connected by at least one thermal energy transfer connection constituting a network and/or directed graph wherein the banks may constitute nodes and the thermal energy transfer connections may constitute edges.

At least one thermal energy transfer connection, may transfer thermal energy in only one direction and/or can transfer with much higher permissiveness in one direction and very low permissiveness in the other (for example, but not limited to, from a first bank to a second bank, only when at that moment the thermal energy storage material within the first bank is at a temperature higher than the thermal energy storage material within with the second bank, but never from said second bank to said first bank).

One or more single-direction-only thermal energy transfer connections may comprise and/or include, for instance, but not limited to, heat diodes and/or specially configured heat pipes and/or thermosyphons, and/or pumped circuits operating only when thermostats and/or thermocouples in the banks and/or thermal energy sources/sinks at either end of report a temperature higher at one end than at the other but not when the temperature difference goes the other way, and/or selective emissivity surfaces and/or selective emissivity glass and/or double glazing and/or triple glazing and/or inert gas and/or vacuum.

Every external heat source/sink may be directly connected by thermal energy transfer connection means to every bank within the thermal store.

Every bank within the thermal store may be connected to every other bank within the thermal energy store by thermal energy transfer connection means.

For at least one external thermal energy source/sink it may be connected to at least one bank within the thermal energy store but it may not be connected to every bank within the thermal energy store.

For at least one bank within the thermal store it may be connected to at least one other bank within the thermal energy store but it may not be connected to every other bank within the thermal energy store.

Every bank within the thermal store may be connected to only the next bank hotter/colder than the given bank, wherein the temperature of each bank means, for example, but not limited to, phase transition temperature of thermal storage material within each bank, and/or the minimum and/or maximum and/or centre of each bank's usual operating temperature range.

At least one thermal energy source external to the thermal energy store and/or at least one source bank within the thermal energy store may lack a direct thermal energy transfer connection to/from at least one destination bank within the thermal energy store and/or at least one thermal energy sink external to the thermal energy store. Thermal energy can still be transferred between the source and destination (or vice-versa) by utilising as a substitute for the missing direct thermal energy transfer connection at least a sequence of a first thermal energy transfer connection leading to a first intermediate bank followed by a second thermal energy transfer connection leading to the original destination.

Transfer of thermal energy from the source using the first thermal energy transfer connection causes the thermal energy to be added to the energy stored in the at least one intervening bank, where it may be stored temporarily. Simultaneously and/or previously and/or later thermal energy may be removed from the said intervening bank and transferred using the second thermal energy transfer connection to the destination.

The sequence of intermediate transfers may include at least two intermediate banks and at least three thermal energy transfer connections.

At least three sources/destinations for thermal energy transfers (i.e. sources/sinks external to the thermal energy store and/or source/destination banks within the thermal energy store) may share a single thermal energy transfer connection.

The thermal energy transfer connection may be shared by virtue of being continuously connected to the heat exchangers of each of the at least three sources/destinations.

The thermal energy transfer connection may be shared at some times by virtue of being on at least some occasions connected to the heat exchangers of at least two of the at least three sources/destinations.

One or more thermal energy storage banks may be connected to another set of one or more thermal energy storage banks by thermal energy transfer connection means wherein said means may permit the controlled and/or deliberate and/or uncontrolled transfer of thermal energy between banks.

The thermal energy transfer connections between banks may be changed during the use of the system by, for example but not limited to, physically making and/or breaking pipework and/or other connections, and/or by switching on and/or off and/or into intermediate positions valves and/or pumps and/or heat pumps and/or other switchable and/or controllable elements and/or by changing the ability to transfer thermal energy of heat pipes and/or any other means of controlling heat transfer known to the art.

In aspects of the invention, a source may at another time and/or at the same time also be a destination In particular embodiments, the sources and/or destinations of thermal energy transfers may be switched in succession and/or in parallel amongst one or more thermal energy sources/sinks (whether external to a thermal energy store and/or thermal energy storage banks within a thermal energy store) and one or more thermal energy storage banks of a thermal energy store.

The switching of sources/destinations may result from physical changes to properties (for example, but not limited to temperature) of the system and/or the environment surrounding the system and/or the component parts of the system (such as, but not limited to, thermal energy storage banks and/or thermal energy sources/sinks) causing natural physical changes to some element of the system (for example, but not limited to, expansion of a metal and/or variable expansion of a bi-metallic strip, and/or density change and/or evaporation and/or condensation of a thermal energy transfer fluid) that may result in change to the function of some part of the system (such as, but not limited to, opening and/or closing and/or variation of the state of a valve, and/or variation of the ability of a heat pipe to transmit heat) wherein such changes were intended by a system designer.

A control system may choose and/or switch the sources and/or destinations of thermal energy transfers in succession and/or in parallel amongst one or more thermal energy sources/sinks (whether external to a thermal energy store and/or thermal energy storage banks within a thermal energy store) and one or more thermal energy storage banks of a thermal energy store.

At regular and/or at irregular intervals of time, the control system may calculate the relative overall system coefficient of performance and/or efficiency and/or any other performance metric for one or more potential thermal energy transfers at any time and the control system may choose a more beneficial or the most optimal choice of such transfers in relation to parameters set by an over-arching control system and/or according to criteria established by the thermal energy storage system designer and/or user and/or purchaser and/or legal criteria and/or safety criteria and/or any other design and/or usage and/or benefit criteria, and switch the sources and/or destinations accordingly.

The amount and/or temperature of thermal energy available from/acceptable by a thermal energy source/sink external to the thermal energy store may be variable over time.

The amount and/or temperature of thermal energy available from/acceptable by a thermal energy source/sink external to the thermal energy store may be variable over time due to user choices, for example but not limited to:

the decision of a user to light and/or not light and/or increase/decrease the fuel flow rate to and/or increase/decrease the oxidiser flow rate to and/or extinguish a source of combustion, for example but not limited to, the burning of wood and/or natural gas;

and/or the decision of a user to deploy a solar panel and/or modify its position to increase and/or decrease its ability to capture sunlight and/or service it to remove dirt;

and/or the decision of a user to switch on and/or off a pump causing cold lake water to be available at an external heat exchanger as a thermal energy sink.

The amount and/or temperature of thermal energy available from/acceptable by a thermal energy source/sink external to the thermal energy store may be variable over time due to the process of operation of the thermal energy source, for example but not limited to:

the warming up phase of a combustion burner; and/or the ability and/or inability and/or accuracy and/or responsiveness of a solar panel to track the sun as it traverses across the sky, and/or self-limiting and/or imposed limitation of performance of an external heat pump due to limits on available electrical energy, and/or the exhausting of the capacity of a reservoir of thermal energy (such as, but not limited to, a tank of waste warm water and/or a block of ice) to release/accept thermal energy.

The amount and/or temperature of thermal energy available from/acceptable by a thermal energy source/sink external to the thermal energy store may be variable over time due to intrinsic or natural variability of the source/sink itself, for example but not limited to:

variability in the quality of a fuel, for example but not limited to, the quality of and/or moisture content of firewood and/or the volumetric energy content of natural gas and/or biogas; and/or the rising/setting of the sun and/or the increase/decrease of the sun's height above the horizon and/or the traverse of the sun across the sky with changing angle relative to the surface of a solar panel and/or the occlusion and/or partial occlusion of the sun's rays falling on a solar panel due to clouds and/or shadows; and/or naturally occurring changes in air temperature and/or water temperature and/or the change of temperature of a body that constitutes a thermal energy source as it tends towards achieving equilibrium temperature with an environment surrounding it.

At least some sources and/or destinations of thermal energy transfers may be switched in succession and/or parallel such that at least at some times thermal energy may be transferred from one external source of thermal energy to a selected bank that has at said times a lower average and/or maximum and/or minimum temperature in its thermal energy storage material than the temperature at said times of the external source of thermal energy.

On at least some occasions, the selected bank may be chosen because it is, at that time, the hottest bank (i.e. that bank having the highest average and/or maximum and/or minimum temperature of its thermal energy storage material) amongst all banks of the thermal energy store that have temperatures lower than the external thermal energy source.

On at least some occasions, the selected bank may be chosen because it is, at that time, the bank most depleted in thermal energy by some measure, for example, but not limited to the bank having the lowest average and/or maximum and/or minimum temperature of its thermal energy storage material, and/or wherein the thermal energy storage material may be a phase change material being the closest (whether on an absolute measure and/or proportional to the maximum possible for that bank) to being entirely in its lowest energy state, for example but not limited to, frozen.

After and/or at the same time as thermal energy is transferred from the external thermal energy source to the selected bank, potential to transfer thermal energy to other banks in the thermal energy store may remain, and a further bank and/or banks may be selected to accept some and/or all of the remaining thermal energy that could be potentially transferred in sequence and/or at the same time by, for example, but not limited to, causing a thermal transfer fluid (that has already been directed by one thermal energy transfer connection from the external thermal energy source to a first bank) to be further directed by an arrangement of one or more additional thermal energy transfer connections in sequence to heat exchanger means in one or more additional banks, wherein the one or more additional banks are visited in descending sequence of average and/or maximum and/or minimum temperature of the thermal energy storage material within each bank.

At least some sources and/or destinations of thermal energy transfers may be switched in succession and/or parallel such that at least at some times thermal energy is transferred to one external sink of thermal energy from a selected bank that has at said times a higher average and/or maximum and/or minimum temperature in its thermal energy storage material than the temperature at said times of the external sink of thermal energy.

On at least some occasions, the selected bank may be chosen because it is, at that time, the coldest bank (i.e. that bank having the lowest average and/or maximum and/or minimum temperature of its thermal energy storage material) amongst all banks of the thermal energy store that have temperatures higher than the external thermal energy sink.

On at least some occasions, the selected bank may be chosen because it is, at that time, the bank containing the largest quantity of thermal energy by some measure, for example, but not limited to the bank having the highest average and/or maximum and/or minimum temperature of its thermal energy storage material, and/or wherein the thermal energy storage material may be a phase change material being the closest (whether on an absolute measure and/or proportional to the maximum possible for that bank) to being entirely in its highest energy state, for example but not limited to, molten.

After and/or at the same time as thermal energy may be transferred to the external thermal energy sink from the selected bank, potential to transfer thermal energy from other banks in the thermal energy store remains, and a further bank and/or banks may be selected to provide some and/or all of the remaining thermal energy that could be potentially transferred in sequence and/or at the same time by, for example, but not limited to, causing a thermal transfer fluid to be first directed by an arrangement of one or more additional thermal energy transfer connections in sequence to heat exchanger means in one or more additional banks, wherein the one or more additional banks may be visited in descending and/or ascending sequence of average and/or maximum and/or minimum temperature of the thermal energy storage material within each bank before it is directed by a final thermal energy transfer connection to the external thermal energy sink from the last bank.

Thermal energy transfer fluid may flow around a circuit that may include an external source/sink of thermal energy and at least one bank of a thermal energy store selected from the full set of such banks.

The number and/or order and/or phase transition temperature and/or current average and/or maximum and/or minimum temperature of banks to include in the transfer of thermal energy from/to an external source/sink may be chosen such that the return temperature of any thermal energy transfer fluid that may flow back from the thermal energy store may be better adapted to and/or optimally matched to some characteristic of the external source/sink, for example, but not limited to, the temperature at which thermal energy transfer fluid flowing into the external source/sink may deliver and/or collect and/or reject and/or generate and/or convert thermal energy most optimally, for example, but not limited to:

returning thermal energy transfer fluid to a solar thermal panel during the day at a low temperature so that radiative losses from the panel are minimised and therefore the solar panel operates as efficiently as possible to collect heat; and/or returning thermal energy transfer fluid to a solar thermal panel during the night; and/or a radiator at a high temperature so that radiative losses from the panel and/or radiator are maximised and therefore the solar panel operates as efficiently as possible to reject heat and/or returning thermal energy transfer fluid to a gas boiler within the design temperature range for which its operation is designed and rated to be most efficient; and/or returning thermal energy transfer fluid to a back boiler in a wood-burning stove at a temperature whereby the thermal energy transfer fluid will not boil and whereby the structure of the stove will not crack due to thermal stress.

The objective to better and/or optimally match some characteristic of the external source/sink is balanced against the objective to maintain certain target quantities of, for example but not limited to, thermal energy in each bank and/or certain target temperatures, which may be changed from time-to-time, by changing from time-to-time the number and/or order and/or phase transition temperature and/or current average and/or maximum and/or minimum temperature of banks to include in the thermal energy transfers between the thermal energy store and at least one external sources/sinks.

The objective to maintain and/or achieve certain target quantities of, for example but not limited to, thermal energy in each bank and/or certain target temperatures, which may be changed from time-to-time, may be achieved by a control system adapting the thermal energy transfers within and to/from the store.

Such adaptation may be performed having reference to current and/or historical information and/or future-looking projections about physical parameters and/or user behaviour related to the thermal energy store itself and/or its banks and/or its thermal energy storage materials, and/or the environment immediately surrounding the thermal energy store, and/or the demand patterns of any services supplied by the thermal energy store (for example, but not limited to, the schedule of production of a factory using such thermal energy), and/or the wider environment (for example, but not limited to, current/projected outdoor temperature and/or solar insolation and/or cloud cover and/or projected and/or actual availability of fuel and/or electrical energy), and/or user behaviour (for example, but not limited to, user presence or absence and/or user preferences for comfort temperature).

The external source of thermal energy may be a fluid and/or environment containing waste and/or excess thermal energy from a process (for example, but not limited to, exhaust warm air from a building in a cold environment and/or exhaust cool air from a building in a warm environment and/or waste warm water from bathing and/or showering and/or oil in a heat engine requiring cooling before re-use and/or cooling fluid from a fuel cell and/or a biogas digester and/or a bio-fuel production plant).

The external source of thermal energy may be a fluid and/or environment containing waste and/or excess thermal energy and this thermal energy may be transferred to at least one bank that may be chosen specifically for having a phase transition temperature of its thermal energy storage material that makes it well adapted to absorbing the waste thermal energy.

There may exist, from the at least one bank that absorbs waste and/or excess thermal energy, no direct thermal energy transfer connections to thermal energy sinks/sources external to the thermal energy store (apart from the one or more thermal energy transfer connections to the waste and/or excess thermal energy source).

There may exist, from the at least one bank that absorbs waste and/or excess thermal energy, at least one thermal energy transfer connection (specifically including those where machines are used to transfer thermal energy from lower to higher temperature) to at least one other banks within the thermal energy store.

The effect may be to capture waste and/or excess heat from a fluid and/or environment at a temperature below that at which such waste/excess heat could usefully directly contribute to a useful service of the thermal energy system and to effect such capture at an energy transfer rate that is adapted to the availability of waste/excess heat into one or more banks containing thermal energy storage materials at temperatures below those at which waste/excess heat could usefully directly contribute thermal energy to a useful service of the thermal energy system and to use devices (for example but not limited to heat pumps) to transfer thermal energy from these one or more lower temperature banks to one or more higher temperature banks (which are at temperatures from which they can usefully directly contribute thermal energy to a useful service of the thermal energy system) at a rate that may differ substantially from the waste/excess energy capture rate.

The rate of thermal energy transfer from lower to higher temperature banks may be lower than the peak rate at which thermal energy transfers to the lower temperature banks from the waste/excess energy sources.

On at least some occasions thermal energy may be removed from at least one bank and delivered to at least one other bank of the thermal energy store, and at the same time no thermal energy may be added to and/or removed from the thermal energy store from/to any thermal energy source/sink external to the thermal energy store.

The configuration of the system may be such that it may be possible that on at least some occasions thermal energy may be removed from at least one bank and delivered to at least one other bank of the thermal energy store, and at the same time no thermal energy is added to and/or removed from the thermal energy store from/to any thermal energy source/sink external to the thermal energy store.

As a result of actions dictated by at least one control system and/or by design of the system the amount of thermal energy added to each bank may be kept in perfect balance with the amount of thermal energy removed from each bank (including any lost by unwanted and/or unintended thermal transfers and/or other losses) over a cycle which may be of any duration, for example but not limited to, some seconds and/or some minutes and/or one hour and/or several hours and/or one day and/or several days and/or one week and/or several weeks and/or one month and/or several months and/or one year and/or several years.

One or more thermal energy transfer fluids may be re-routed and/or re-cycled through and/or via heat exchangers in thermal contact with a configuration of banks in an order intended and/or selected from time-to-time to maximise and/or enhance the thermal energy extracted from the thermal energy transfer fluid and stored into the thermal energy storage material of the banks and/or extracted from the thermal energy storage material of the banks and transferred into the thermal energy transfer fluid.

The physical configuration of the thermal energy store may be changed during the use of the system by any of the following:

adding one or more extra banks to the thermal energy store; and/or removing one or more banks from the thermal energy store; and/or exchanging one or more banks for replacement banks.

During use and/or between uses the addition and/or connection to the thermal energy store of one or more banks may add further stored thermal energy to the thermal energy store wherein such additional thermal energy results from:

the one or more additional banks being created in a manufacturing process external to the thermal energy store which manufacturing process itself imbues the thermal energy storage material within the one or more additional banks with thermal energy suitable for later release via a phase transition; and/or the one or more additional banks being created in a manufacturing process external to the thermal energy store and later, but before being added to the current thermal energy store, absorbed thermal energy in another thermal energy store and/or within other equipment designed to add thermal energy to the thermal energy storage material of the one or more additional banks.

During use or between uses the thermal energy storage material in one or more thermal energy storage banks may be added to and/or exchanged wholly and/or partially by replacement thermal energy storage material.

The exchange of and/or addition to the thermal energy storage material of one or more banks adds further thermal energy to the one or more banks wherein:

the additional and/or replacement thermal energy storage material was made in a manufacturing process external to the thermal energy store which manufacturing process itself imbued the additional and/or replacement thermal energy storage material with thermal energy suitable for later release via a phase transition; and/or the additional and/or replacement thermal energy storage material absorbed thermal energy in another thermal energy store and/or within other equipment designed to add thermal energy to the additional and/or replacement thermal energy storage material.

Heat may be allowed to flow in a controlled and/or an uncontrolled way from one or more banks at a higher temperature to one or more banks at a lower temperature, and/or from one or more banks at a higher temperature to one or more ambient environments in thermal contact with the thermal store, and/or from the one or more ambient environments in thermal contact with the thermal store to one or more banks at a lower temperature, by means of conduction and/or radiation and/or convection and/or heat pipe and/or transfer through a thermal transfer fluid and/or any other known physical mechanism of heat transfer.

One or more banks may be equipped with insulation means to:

promote thermal isolation between one or more banks and one or more other banks and/or one or more banks and one or more ambient environments in thermal contact with the thermal store and/or one or more banks of the thermal store; and/or to eliminate to the greatest extent possible and/or restrict and/or limit and/or selectively control heat allowed to flow from one or more banks at a higher temperature to one or more banks at a lower temperature, and/or from one or more banks at a higher temperature to the one or more ambient environments in thermal contact with the thermal store, and/or from the one or more ambient environments in thermal contact with the thermal store to one or more banks at a lower temperature, by means of conduction and/or radiation and/or convection and/or heat pipe and/or transfer through a thermal transfer fluid and/or any other known physical mechanism of heat transfer.

One or more banks may be physically separated from one or more other banks of the same thermal energy store.

Physically separated banks may be controlled by the control system as part of the same thermal energy store.

Thermal energy transfers may be possible between said physically separated banks and one or more other banks of the same thermal energy store.

The system of the present invention may be used as a heating system and/or to provide a heating service (wherein the system may be used to add heat to at least one body and/or at least one environment external to the thermal energy store).

The system of the present invention may be used as a cooling system and/or to provide a cooling service (wherein the system is used to remove heat from at least one body and/or at least one environment external to the thermal energy store).

The system of the present invention may be used as a combined heating and cooling system used at the same and/or at different times as both a cooling system and a heating system and/or to provide at different and/or the same times heating and/or cooling services (wherein the system is used to add heat to at least one body and/or at least one environment external to the thermal energy store and, at the same and/or different times, is used to remove heat from at least one body (which may be a different and/or the same body) and/or at least one environment (which may be a different and/or the same environment) external to the thermal energy store).

The heating and/or combined system and/or service may be used as a central and/or distributed space heating system (for example, but not limited to use in, a building and/or a vehicle and/or an outdoor space).

The heating and/or combined system and/or may be used for water heating (for example, but not limited to use in, heating clean water for washing and/or bathing and/or cooking and/or drinks preparation and/or swimming pool heating).

The heating and/or cooling and/or combined system and/or service may be used for heating and/or cooling thermal energy transfer fluids to provide industrial process-heat and/or cooling, and/or directly and/or indirectly heating and/or cooling working fluids of an industrial process.

The heating and/or cooling and/or combined system and/or service may be used for heating heat-transfer fluids for use in a machine that converts thermal energy and/or temperature differences into electrical and/or mechanical energy (for example, but not limited to, a steam piston and/or a Stirling engine and/or Rankine cycle engine and/or steam turbine, whether on its own and/or attached to an electric alternator and/or dynamo, and/or a thermoelectric and/or thermionic device used as an electrical generator).

The cooling and/or combined system and/or service may be used as a central and/or distributed space cooling and/or air conditioning system (for example, but not limited to use in, a building and/or a vehicle and/or an outdoor space).

The cooling and/or combination system and/or service may be used as a refrigeration system (for example, but not limited to use in, a domestic refrigerator and/or freezer, and/or commercial and/or industrial chilled and/or frozen storage and/or temperature controlled storage, such as but not limited to, a potato store, and/or cryogenic system).

The thermal energy transfer fluid of the heating and/or cooling and/or combined system and/or service may be a liquid (for example, but not limited to, water and/or water-glycol mixture and/or water with other additives and/or a flowable oil) and/or a refrigerant (for example, but not limited to, butane and/or propane and/or ammonia and/or R-12 and/or R-22 and/or R-134a) and/or a gas (for example, but not limited to, air).

At least one bank of the thermal energy store may be used as a thermal store for at least one heating and/or cooling and/or combined service.

At least one bank of the thermal energy store may be used as a thermal store for at least one service that may be used at least some of the time for heating and the same service may be used at least some of the time for cooling.

At least one bank may be greatly increased in size to act as a bulk thermal energy reservoir for at least one service.

The at least one service may be space heating and/or cooling delivered through (for example, but not limited to) radiant walls and/or under-floor heating and/or radiant ceilings and/or chilled beams and/or radiators and/or over-sized radiators and/or fan-coil radiators and/or air handling systems.

At least one bank and/or at least one sub-parts of at least one bank of the thermal energy store may be physically co-located with and/or close to the point of delivery of the service for which it is a thermal energy reservoir and is selected to have a usual operating temperature range and/or ranges suitable to directly drive said service (for example but not limited to, one or more banks distributed at one or more taps where hot water is drawn in a domestic hot water system and/or one or more radiators and/or areas of radiant wall and/or ceiling and/or under-floor heating comprising parts of one or more banks directly in radiative and/or conductive and/or convective exchange with the one or more environments and/or bodies to be heated/cooled).

The system may be used inside domestic and/or commercial and/or industrial appliances and/or machinery, for example but not limited to, a dishwasher, washing machine, etc; a hot drinks machine that also delivers chilled water and/or cold drinks; a hot/cold vending machine for food and/or drinks; a system incorporating reusable, re-chargeable heated/cooled cups which may incorporate phase change material in their operation.

At least one bank and/or the whole thermal energy store may be used as a heat/cool battery.

At least one thermal energy source may be an environmental and/or natural and/or waste source of heat and/or cool.

At least one thermal energy source may be variable in temperature and/or thermal energy available over time.

At least one thermal energy source/sink may be at least one solar thermal collector (wherein the at least one solar thermal collector may be used at different times to collect solar heat and/or reject heat to the environment), for example including but not limited to, flat plate solar collectors using a pumped loop of ethylene glycol solution in water as thermal energy transfer fluid and/or evacuated tube solar collectors using heat pipes as thermal energy transfer connection and/or roof tiles and/or dedicated solar air heaters using air as thermal energy transfer fluid and/or photovoltaic panels and/or hybrid solar thermal photovoltaic panels using heat pipes and/or direct conduction and/or air and/or a pumped loop of ethylene glycol solution in water as thermal energy transfer fluid, all heated by the sun and/or cooled by night-time radiation and/or convection and/or conduction.

At least one thermal energy source/sink may be at least one ground source (wherein the at least one ground source may be used at different times to collect heat from the earth and/or reject heat to the earth).

At least one thermal energy source/sink may be at least one air source (wherein the at least one air source may be used at different times to collect heat from the air and/or reject heat to the air).

At least one thermal energy source may be at least one combustion system (for example but not limited to a wood burning stove and/or a natural gas burner and/or an oil burner).

At least one thermal energy source may be at least one electrical heater (for example but not limited to an electric water heater, heating water as a thermal energy transfer fluid and/or a resistance element in direct thermal contact with the thermal energy storage material in a bank).

At least one thermal energy source may be the waste heat (that would otherwise be dissipated and/or vented via, for example but not limited to, a fan coil to a first environment) from at least one air conditioner and/or refrigeration system and/or heat pump external to the thermal energy store (wherein the primary purpose is to cool a second environment).

At least one thermal energy source may be the waste heat (that would otherwise be dissipated and/or vented via, for example but not limited to, a fan coil and/or a cooling tower to a first environment and/or into a river and/or the sea) from at least one external system that is a heating system and/or industrial process and/or thermal electricity generation system and/or machine (for example, but not limited to, an internal combustion engine and/or a jet engine) and/or any other system of energy conversion that is less than 100% efficient and wherein some of the in-efficiency is manifested as waste heat.

At least one thermal energy source may be the waste heat (that would otherwise need to be managed and/or dissipated and/or vented via, for example but not limited to, a fan coil and/or a cooling tower and/or an active cooling system and/or a heat sink to a first environment) from at least one electronic assembly and/or other machine that generates waste heat in its operation including, for example, but not limited to, computer processors and/or micro-processors and/or amplifiers and/or batteries and/or lighting equipment and/or LED lighting and/or an electric motor and/or an internal combustion engine and/or photovoltaic solar cells, wherein the waste heat is not merely managed and/or dissipated and/or vented by these means, but is also used as a way for a bank or thermal energy store or thermal energy system to gain useful thermal energy.

At least one piece of equipment that generates waste heat may be wholly and/or partially directly embedded inside one or more banks and/or directly in thermal contact with one or more banks.

The at least one piece of equipment that generates waste heat may be at least one chemical battery for example, but not limited to, a configuration of lithium ion battery cells, wherein the thermal energy storage material of a bank and/or sub-bank within which the batteries are embedded and/or in thermal contact is chosen to enhance the likelihood in operation and/or storage of the batteries remaining within a preferred operating temperature range thereby enhancing one or more of the safety and/or effectiveness and/or efficiency of the one or more batteries.

At least one thermal energy source may be the waste thermal energy embodied in waste fluids, for example but not limited to exhaust air and/or waste water (that would otherwise be dissipated and/or vented via, for example but not limited to, exhaust air ducts and/or waste pipes, from a first environment into a second environment) including, for example but not limited to, waste water from domestic bathing and/or ventilation air extracted from a building at a temperature above and/or below that of a second environment and/or rainwater collected on a roof and vented to a storm drain.

A high rate of waste thermal energy can be absorbed over a short period into the thermal energy storage material of one or more banks of the thermal energy store, and later and/or at the same time, at a different, for example but not limited to lower, rate the thermal energy absorbed can be transferred to other banks of the same thermal energy store and/or sources/sinks external to it.

A smaller capacity active cooling system, for example but not limited to a heat pump, may be required because peak cooling loads for waste thermal energy are reduced by temporal buffering in the thermal energy storage material of one or more banks of the thermal energy store.

The elimination of and/or reduction in size and/or capacity of fans and/or pumps and/or heat pumps may result in a cooling system that is significantly quieter and/or produces fewer vibrations and/or uses less energy.

At least one thermal energy source may be at least one connection to at least one district heating system.

At least one thermal energy source may be at least one room and/or other internal environment, wherein waste heat accumulates as a result of, for example but not limited to, occupancy by metabolising people and/or animals, and/or use of equipment that generates waste heat, and/or solar gain as a result of solar energy passing through windows and/or other apertures open to the ingress of visible and/or ultraviolet and/or infra-red radiation and being absorbed by one or more surfaces internal to the room with a resultant rise in thermal energy and/or temperature and/or re-radiated as longer wavelength infra-red and/or other thermal radiation and/or warming the air in the room. The at least one thermal energy source which is at least one room and/or other environment, wherein waste heat accumulates, may be connected to the thermal energy store by at least one thermal energy transfer connection that comprises all and/or part of a system designed to extract waste thermal energy from the at least one room and/or other environment, comprising, for example but not limited to, an air conditioning and/or comfort cooling and/or radiant cooling system and/or designed to alternate between extracting waste thermal energy at some times and delivering desired heat at others, present in the one or more room and/or other environment.

At least one thermal energy sink may be a room and/or environment requiring to be heated and/or cooled.

The thermal energy transfer connection between the whole of and/or at least one banks of the thermal energy store and a room and/or environment requiring to be heated and/or cooled, may comprise at least one of, for example but not limited to a circuit and/or network of pipes and/or ducts carrying thermal transfer fluid such as ethylene glycol and/or R134a and/or air, and/or heat pipes and/or direct conduction and/or radiative transfer, transferring thermal energy to at least one of radiant walls and/or under-floor heating and/or radiant ceilings and/or chilled beams and/or radiators and/or over-sized radiators and/or fan-coil radiators and/or air handling systems.

The room and/or environment may constitute a location wherein perishable articles, for example but not limited to food and/or biological specimens and/or formerly living beings, are kept to delay processes of decay and/or promote freshness, for example, but not limited to, a larder room and/or domestic and/or commercial and/or industrial refrigerator and/or freezer and/or chiller and/or vehicle and/or container and/or cryogenic storage and/or morgue.

One or more banks of a thermal energy store may be connected to a source/sink of thermal energy comprising equipment that uses thermal energy to control the humidity of air by, for example but not limited to, using removal of thermal energy to cool humid air below its dew point and thereby cause water vapour to condense out and thereby reduce the humidity of the air, and/or thereafter adding thermal energy to re-heat the now dried air to a user comfort temperature, and/or adding thermal energy to water to evaporate some water and thereby add humidity to air.

One or more banks of a thermal energy store may be used to store excess and/or waste heat from a cooling system during the daytime (and/or any other period of peak heat load) so that the heat can be dumped at a later time when conditions allow that to be done with lower use of additional pumping and/or heat pumping energy, for example, but not limited to, during the night when air temperatures are colder and/or a solar panel can radiate heat to the night sky.

One or more banks of a thermal energy store may be used to store excess and/or waste heat from a cooling system during the daytime (and/or any other period of peak heat load) so that the heat can be dumped at a later time selected such that any required additional pumping and/or heat pumping energy will have a lower cost and/or be more available, for example but not limited to, when a lower costs night-time tariff from an electric utility is in force and/or when the wind blows on a wind turbine to generate electrical and/or mechanical power.

Any heat pumping and/or pumping of thermal energy between banks and/or to/from banks and thermal energy sinks/sources may be, in at least some cases and/or on at least some occasions, made to occur at a time selected such that any required additional pumping and/or heat pumping and/or heating and/or cooling energy will have a lower cost and/or be more available, for example but not limited to, when a lower costs night-time tariff from an electric utility is in force and/or when the wind blows on a wind turbine and/or the sun shines on a photovoltaic panel to generate electrical and/or mechanical power.

Any heat pumping and/or pumping of thermal energy between banks and/or to/from banks and thermal energy sinks/sources may be, in at least some cases and/or on at least some occasions, selected to occur when the temperatures of the banks and/or the thermal energy sinks/sources are such as to make the temperature difference between the source and destination of each thermal energy transfer optimal and/or preferable and/or better than at other times (whether on the basis of historical record and/or predicted future performance), so as to reduce the use of additional pumping and/or heat pumping and/or heating and/or cooling energy.

The phase transition utilised for thermal energy storage may be one or more of:

melting of a solid to become liquid and/or freezing of the same liquid to become a solid, with absorption and/or release of thermal energy, whether such melting and freezing happen at the same temperature or at different temperatures (e.g. wax melting; metals melting, especially selected eutectic alloys of metals melting; salts melting; salts melting to low-temperature ionic liquids); and/or the change of hydration state of a salt and/or salt hydrate, with absorption and/or release of thermal energy; and/or the change of the crystalline structure of a material from one conformation to another, with absorption and/or release of thermal energy; (e.g. $Na_2SO_4$ changing from rhombic to cubic crystal structure); and/or adsorption and/or absorption and/or desorption and/or evaporation and/or condensation of water vapour and/or other gases and/or liquids from and/or onto surfaces and/or from and/or into the structure of materials, with absorption and/or release of thermal energy (e.g. silica gel/water vapour) and/or;

any other change of physical and/or chemical state of a material and/or system of materials that absorbs and/or releases thermal energy wherein said change is reversible without substantial loss of energy absorbing and/or storing and/or releasing capacity across at least more than one reversible cycles.

The phase transition may absorb and/or release substantially more energy at the said one or more temperatures or one or more sub-ranges of temperatures than would be the case taking account solely of the thermal energy absorbed and/or released as specific heat at the said one or more temperatures or one or more sub-ranges of temperatures.

One or more thermal energy storage materials may be combined with one or more additives to promote desirable properties and/or suppress undesirable properties and/or otherwise modify the phase transition wherein the effect of the additives is, for example but not limited to, one or more of:

modification of the temperature and/or range and/or ranges of temperatures at which phase transition occurs; and/or promotion of nucleation when freezing salts and/or metals and/or water and/or any other liquid; and/or promotion of nucleation of desirable salt hydrates and/or suppression of nucleation of undesirable salt hydrates; and/or selectively controlling when nucleation and/or freezing and/or crystallization and/or any other energy releasing phase transition commences; and/or controlling the rate of nucleation and/or freezing and/or crystallization and/or any other energy releasing phase transition and the related rate of thermal energy release; and/or promoting the repeatability of cycles of thermal energy absorbing followed by thermal energy releasing phase transitions; and/or promoting an increase in the number of cycles of thermal energy absorbing followed by thermal energy releasing phase transitions in the useful life of the thermal energy storage materials; and/or promoting an increase in the useful operating time and/or pre-operation shelf-life of the thermal energy storage materials; and/or enhancing the thermal conductivity of the thermal energy storage materials; and/or any other desirable modification of the phase transition properties of the one or more thermal energy storage materials.

One or more thermal energy storage materials and/or additives may be chosen to improve and/or optimise a trade off between their cost and/or safety and/or physical density and/or phase transition temperature and/or the energy absorbed and/or released during phase transition and/or the characteristics of the phase transition and/or the minimisation of volume change from one side to the other of the phase transition and/or narrowness of their phase transition temperature range and/or similarity and/or difference of their phase transition temperatures when absorbing and/or releasing energy and/or repeatability of releasing and/or absorbing thermal energy and/or loss of energy associated with absorbing and subsequently releasing thermal energy and/or thermal conductivity and/or materials compatibility and/or other physical properties according to criteria established by the thermal energy storage system designer and/or user and/or purchaser and/or legal criteria and/or safety criteria and/or any other design and/or usage and/or benefit criteria.

In the event of mains electric power failure, the system of the present invention may be self-powering for at least some of its functions by allowing for heat transfers from hotter to colder banks via, for example, but not limited to, a steam piston and/or a Stirling engine and/or Rankine cycle engine and/or steam turbine, whether on its own and/or attached to an electric alternator and/or dynamo, and/or a thermoelectric and/or thermionic device used as an electrical generator.

The system of the present invention may also compensate dynamically for change in the thermal energy storage materials properties (e.g. melting temperature; sharpness of melting temperature) over time.

The system of the present invention may also be for both heating and cooling and wherein at least one bank may act as a source of thermal energy so as to increase the temperature of one or more thermal energy sinks and simultaneously and/or at a different time may act as a sink of thermal energy so as to reduce the temperature of one or more thermal energy sources. The thermal store of the present invention may also comprise two banks so there is no heat pumping apparatus in the thermal energy transfer connection between them.

Using the present invention also allows water heating by passing through several banks at rising phase transition temperatures. This allows mixed grade heat to be used for water heating.

Thermal energy storage as described in the present application can refer to a number of technologies that store energy in a thermal reservoir for later reuse. The described technologies can be employed to balance energy demand between day time and night time. The thermal reservoir may be maintained at a temperature above (hotter) or below (colder) than that of the ambient environment.

Further embodiments of the present invention may be as described below.

1. One or more MCPCM Thermal Stores ("Thermal Stores") can be integrated into a Smart Grid to act (in aggregate) as one or many virtual dispatchable loads on the electricity grid to effect demand reduction. When the grid is in danger of becoming unstable due to overly high demand conditions, or when it is judged more economical to shed loads instead of activating further generators, a number of elements of the Thermal Stores can be switched to draw lower power or switched off completely:

Heat pumps within the Thermal Stores

Circulation pumps, valves, etc dedicated to transferring heat from external heat sources like solar panels or waste water heat recovery ("WWHR")

Certain elements might be switched off for limited periods only (while below the threshold of user perceptibility):

Circulation pumps, valves, etc used to deliver local services (e.g. space heating, cooling)from the Thermal Stores that can accept brief interruptions due to thermal inertia of the space being heated or cooled However certain elements would not normally be switched off in a demand reduction scenario:

Control logic (this is low power anyway)

Circulation pumps, valves, etc used to deliver time-critical local services from the Thermal Stores (e.g. hot water)

The net effect for the grid is that reducing loads can alleviate the instability condition, or avoid the need to dispatch additional generation. The local user of each Thermal Store perceives no interruption in service as the local supply of heat, hot water or cooling continues by drawing on the stored thermal energy in the Thermal Store. The decision to reduce or switch off elements of each thermal store can be made by:

Monitoring (human or automated) at a central or decentralised control facility, resulting in a decision to reduce demand from a selected set of Thermal Stores, followed by sending commands to them (wirelessly, over the internet, over power lines, etc) to partially power down, or Each Thermal Store independently sensing signs of grid overload on its own mains electrical inputs (e.g. low voltage conditions or frequency instability), and using internal decision logic (whether pre-programmed, self-learned or remotely updated by policies sent from a central facility) to decide when to partially power down.

2. A Thermal Store can be combined with an electrical battery (which can be recharged from the electrical grid whenever power is available, local electrical power sources, e.g. photovoltaic or a diesel generator, or a combination), to form a Semi-Autonomous Thermal Store. In the situations identified in 1 above, it can accept commands to disconnect fully from the grid (further reducing load) while still delivering a full set of local services.

This arrangement also provides disaster resilience where the grid may be interrupted in an unplanned way (due to natural disaster, operational failure, rolling blackouts, etc). When a Semi-Autonomous Thermal Store detects complete failure of its mains input power, it can switch to use only stored electrical power from internal batteries, and apply this only to the most essential services (perhaps offering the user the explicit trade off between battery life and which services to maintain).

NB The storage and use of electrical power within the Semi-Autonomous Thermal Store could be entirely done using Direct Current (DC), providing the essential services to be maintained are performed using DC electronics, pumps, etc. This would avoid the cost of an internal inverter, although one might be used in some configurations (e.g. if AC pumps or heat pumps formed part of essential services).

A Semi-Autonomous Thermal Store can also offer continuity of supply of heating, cooling and hot water in areas where there is a limited availability of electricity, e.g. rationing to only certain hours of the day, either on a planned or erratic basis.

3. Adding an inverter to a Semi-Autonomous Thermal Store creates a Hybrid Thermal/Electrical Store that:

Whilst maintaining essential thermal services as above, can also deliver essential electrical power within an affected building during a planned or unplanned power outage (for this application a grid-tie inverter is optional, but a suitable grid-disconnect switch, for anti-islanding protection, is essential).

Provide additional grid stability services such as delivering supportive electrical power to the local electrical grid during times of peak demand (for this application a grid-tie inverter is required).

All of 1, 2, 3 above may be delivered in combination with services to monitor the amount of grid support services delivered; report this to the owner, user, grid operator and electricity supply company; and reward the owner via rebates on their electricity supply bill or direct payments. Often large payments are made for these kinds of services such as fast dispatchable "spinning reserve" or frequency support.

4. For situations that are fully off-grid, a Semi-Autonomous Thermal Store can become a fully Autonomous Thermal Store by removing any grid electrical connection, and furnishing it entirely with locally generated electricity, whether from renewable power like Photovoltaic or conventional generation.

To reduce costs, it is desirable in this case to avoid requiring an inverter anywhere in the system. PV panels, etc produce DC electrical power. Cheap electronics can control storage to and retrieval from batteries. If the remainder of the Autonomous Thermal Store is equipped fully with DC equipment (including electronics, pumps, valves and heat pumps) then the need to have a DC to AC inverter can be eliminated.

5. It may be desirable to include an inverter to create a fully Autonomous Hybrid Thermal/Electrical Store capable of providing off-grid thermal services and electrical power in combination. In this case the local generation capacity and internal batteries must be sized large enough to provide all the electrical power needed for all the operation of the Thermal Store and all the electrical loads of the off-grid building.

6. The various forms and derivatives of Thermal Stores that can accept locally generated electrical power (listed in 2 to 5 above) or any other similar variations can be further integrated by incorporating all controlling electronics and power electronics required for the chosen local electrical generation source, e.g. the Maximum Power Point Tracker used by a string of Photovoltaic ("PV") panels.

7. The various forms and derivatives of Thermal Stores that can accept locally generated electrical power (listed in 2 to 6 above) or any other similar variations may be configured without an electrical battery and still retain some of the capabilities highlighted. For example a Thermal Store equipped with all the circuitry to work with PV panels, lacking a battery, but equipped with a grid-tie inverter, could provide demand reduction at all times; supply limited local grid electrical power support on demand during daylight hours; reduce the household energy bill by using locally generated PV electrical power to drive the Thermal Store; and deliver surplus PV electrical power when available to the electrical grid (benefiting the householder through net metering or feed-in tariffs).

8. The various forms and derivatives of Thermal Stores that can accept locally generated electrical power (listed in 2 to 7 above) or any other similar variations may be preferentially used in combination with a local energy source that co-generates combined heat and electrical power ("Local CHP Generator") such as:

Fuel Cell (which generates both heat and power simultaneously)

Diesel generator (tapping into engine waste heat)

Hybrid PV/Thermal collectors where PV is overlaid on a conventional flat plate solar thermal collector Solar Thermal Electrical generators (e.g. trough collectors, Fresnel concentrators, solar towers) where sunlight is concentrated to a point or a line to heat water (or ammonia) to steam after which it is used in a turbine to generate electricity. The waste heat (which is otherwise a disposal problem) can be partially diverted to provide thermal energy to the Thermal Store The Local CHP Generator has the advantage that a single piece of equipment (potentially occupying less space, and costing less, than two separate pieces of equipment) provides both the required thermal energy and electrical power to drive the Thermal Store (or derivative).

9. In 8 above, the output from the Local CHP Generator can be modulated to be led by the local demand for electrical power (in which case the heat energy can be viewed as a form of waste heat that is opportunistically captured in the Thermal Store for later use). Alternatively, where the primary demand is for heat or the demand for heat exceeds that for electricity, the modulation may be controlled to satisfy the full heat demand, creating excess electricity over the local need. For units that are attached to an electricity supply grid and capable of exporting excess electricity with payment via a feed-in tariff, this may yield attractive profits.

However for the case where a Local CHP Generator, electrical batteries and a Thermal Store are used off-grid, the "waste electricity" could be a problem if (over the long term) the heat-led demand results in more electricity generation than can be used locally. In this case a preferential embodiment is controlled to modulate the output of the Local CHP Generator to a lower level (that will not generate enough heat to meet the whole heat load), but still provides excess electrical energy in a carefully chosen amount: sufficient electrical energy to bridge the gap between generated and demanded heat when that electrical energy is used to drive the heat pumps embodied in the Thermal Store (or external heat pumps) in combination with waste heat or local sources of low grade heat (e.g. an air source).

10. An integrated solar collector combines a solar thermal panel with a store of heat integrated into the panel. In a specific configuration, the locally integrated store of heat could use Phase Change Material, or could be a MBPCM Thermal Store locally integrated with the solar panel (See FIG. 12).

One embodiment starts with a standard solar collector comprising:
   a glass cover plate;
   a metal collecting plate (covered in TiNOX or other selective absorber coating);
   a meander tube carrying heat transfer fluid ("HTF"), bonded to the metal plate;
   a structural frame, to support the above, equipped with rear and side insulation.

In a specific embodiment, the metal plate and meander tube can be replaced with a thin sheet (e.g. 1000×500× 20 mm) of shape-stabilised PCM composite with a meander tube embedded within it or attached to the back of it.

The PCM melting temperature can be selected to suit the application, for example choosing a lower temperature PCM (say 32° C.) if the goal is to capture the maximum thermal energy from sunlight without needing high grade heat (for instance for underfloor heating which could be driven in a loop directly from such panels), or a higher temperature PCM (say 58° C.) if the goal is to achieve a certain minimum grade of heat (for instance for water heating).

A low melting point PCM may require less insulation, e.g. it may not require cover glass over the integrated collector.

In a system deployment, several different melting point PCM integrated collector panels might be deployed to provide collected and stored heat at different temperatures on demand by the rest of the system, for instance 32° C., 45° C. and 58° C. panels. Domestic hot water ("DHW") could be provided by running cold mains through progressively the 32° C., 45° C. and 58° C. panels in series, thus providing (directly on the roof of a building) both the collector for solar thermal heat but also the storage in a distributed Multi-Bank PCM Thermal Store integrated into the collectors.

In such a system, different collectors might be more optimally placed at different angles and locations, for instance:
   A 32° C. panel, primarily driving under-floor heating, on a steep roof pitch around 60 degrees or even on a south-facing wall, as this optimises heat capture in the autumn, winter and spring heating season
   A 58° C. panel on a shallow roof pitch around 35 degrees as this optimised year-round average heat capture for hot water production The PCM composite can have carbon or another conductivity enhancing material mixed into its composition. Additionally or alternatively, a selective absorbing material like TiNOX (or an alternative which may also be chosen for its properties as a thermal conductivity enhancer) can be combined into (or coated over) the PCM composite, to promote the absorption of visible light, UV and short-wave infra-red, and reduce the emission of long-wave infra-red. Alternative embodiments could include:
   Encapsulating the PCM in a thin walled metal box of the appropriate size, if the PCM was not in a composite or not shape-stabilised
   Coating such a box with selective absorber on the top outside surface.

Adding fins to the meander tube as an alternative to or supplement to enhanced heat transfer via a conductivity enhancing material in the PCM composite Using finning internally within such a box to both enhance thermal conductivity and provide rigidity (e.g. via an aluminium honeycomb grid) thereby allowing the box walls to be thinner A thin hermetic sealing layer to avoid degradation of the PCM over time via loss of water (in the case of a hydrated salt PCM)

A pillow-like flexible plastic or rubber or similar outer membrane (suitably formulated with integrated selective absorber material) capable of expanding and contracting to allow for volume change on melting and freezing of a PCM 11. In an alternative embodiment the solar collectors might be vacuum tube collectors, each comprising an outer glass tube, an inner long, narrow collector plate, and a heat pipe to carry heat to one end of the tube, where it would conventionally be heat exchanged with flowing heat transfer fluid.

Instead the heat pipe could be extended into a block or container of PCM (with suitable heat exchange structure comprising fins and/or thermal conductivity enhancer). Thus the heat pipe would directly transfer captured solar heat to local PCM storage. A further extension of the heat pipe beyond the upper end of the PCM to a conventional heat exchanger would allow heat to be transferred from the PCM to flowing heat transfer fluid. Alternatively the order could be collector plate, heat exchanger, PCM thermal storage. This would allow the flow rate of HTF through the heat exchanger to determine whether heat is immediately removed when available or stored for later use in the PCM. To control this more finely, and to address losses via the solar collector at night, a heat pipe with a diode or a switchable heat pipe might be employed.

Vacuum tubes typically can get very hot in direct sunlight (around 200° C.) when no HTF flows to carry heat away. This high temperature is referred to as the stagnation temperature. It leads to risks of thermal damage to vacuum tube panels. Because the heat losses (by way of conduction and long-wave infra-red radiation) from a solar thermal panel increase with temperature, keeping the solar panels at a lower temperature will make them both less susceptible to damage and more efficient (i.e. they will capture more useable heat from the incident sunlight). By choosing a suitable PCM melting temperature, e.g. 58° C., the temperature of the vacuum tube will be regulated down as long as the PCM is not all melted, after which there will be a moderation of the rate of rise up to the stagnation temperature.

PCM could alternatively or additionally be integrated beneath the collector plate inside the vacuum tube additionally to or instead of integrating PCM at one end of the tube or in the manifold.

This approach could allow direct retrofit replacement of standard vacuum tube collectors by vacuum tube collectors incorporating PCM thermal storage. Alternatively standard vacuum tubes could be used with a modified manifold incorporating the local PCM thermal storage. An existing system can therefore be upgraded to compactly store heat at source, allow it to deliver heat at night, be more protected against heat damage and operate with higher efficiency.

Note that again it would be possible to integrate different collectors with different PCM temperatures. For example individual vacuum 12. In an alternative embodiment to 11 above, there could be in sequence along each heat pipe, several banks of PCM, each with different melting point temperatures (See FIG. 13). Typically these temperatures would be lowest closest to the vacuum tube and highest furthest away. Thus low grade heat with low flux (e.g. cloudy conditions) would be used first in the coolest bank—e.g. 40° C. heat going into a 32° C. bank but too cool to enter a 45° C. bank beyond. As higher grade, higher flux heat became available (e.g. sun comes out from behind clouds) there would be too much heat for it all to be absorbed fast enough in the first, lower temperature bank (its capacity would be saturated) so the remainder would be carried further along the heat pipe and absorbed in a higher temperature bank—e.g. 80° C. in the solar collector with 100 W, 32° C. bank can absorb 10 W with this ΔT (and does); 45° C. bank can absorb 40 W (and does); 58° C. bank absorbs remainder. Some kind of heat diode between each stage of the heat pipe would be required to ensure heat did not leak back from high T to lower T banks later. Alternatively a switchable heat pipe plus decision logic could actively choose into which bank heat would be delivered.

13. In another embodiment of an integrated collector solar thermal panel, a conventional flat plate panel structure is maintained, and a local MBCPM thermal store is integrated locally with each panel or group of panels.

For example, three insulated banks of PCM (each with integral heat exchange mechanisms) with melting points 32° C., 45° C. and 58° C., could be integrated beneath a conventional flat plate collector. A local circulation pump (perhaps powered by a small local PV panel), plus suitable valves and control logic, could cause HTF to circulate through the solar panel whenever enough thermal energy is being captured from the sun to warm the HTF above 32° C. How far the HTF can reach above 32° C. (determined by a small irradiance sensor, or sensing the power generated by a local PV panel) would then be used to decide whether to route HTF to just the 32° C. integrated bank, or to the 45° C. and/or 58° C. banks as well/instead.

An external over-ride command would set the valves to permit HTF to flow through a selected bank temperature to collect heat and deliver it to some other part of a system to do work (e.g. collecting 32° C. heat to drive under-floor heating; collecting 45° C. or 58° C. heat to drive a radiator loop; or collecting 32° C., 45° C. and 58° C. to put heat into a central MBPCM thermal store for later hot water delivery). The local pump might also be commanded to run alongside the pumps of other integrated collector solar panels to allow them in combination to pump the HTF around the system, obviating the need for other pumps, and making the system scale in pump power directly in proportion to the number of panels deployed.

14. In an alternative configuration to 12 above, and having similar attributes to 11 above, the collector plate could be replaced by a flat heat pipe (sometimes known as a Megaflat), carrying heat to one of several insulated banks of PCM behind the collector, using appropriate design of heat pipes to allow (by the opening or closing of reservoirs) an individual bank to be chosen at any given time, and using a heat pipe heat diode approach preventing heat from returning to the collector plate for re-radiation.

15. In an alternative configuration of any of 11 to 14 above, each PCM bank would be connected to the relevant heat pipe via a thermo-electric device (or other equivalent solid-state heat pumping means such as a thermionic device), generically "TED". When the temperature in the heat pipe exceeds the melting temperature of the bank, heat will flow into the bank through the TED generating a harvestable electrical current. Conversely, when the temperature in the heat pipe is lower than the bank temperature, a decision could be made to expend electrical energy in the TED so that heat could be pumped into the bank. The TED can also be left in a condition where essentially no heat flows. (See FIG. 14 which gives detail of the modification to 12. Top part of diagram shows bank connected to heat pipe by thermoelectric device (TED); middle part shows 32 C bank connected by TED driven by current to heat pump into bank from 20 C heat pipe; bottom part shows heat transferring through TED from bank to 20 C heat pipe, generating current.)

16. In another embodiment, Photovoltaic energy conversion efficiency (light to electricity) typically degrades with rising operating temperature, often by as much as 0.5%/° C. Consider a solar panel rated 100 W/m$^2$ in 1000 W/m$^2$ of sunlight at 20° C. In real use (on a roof with poor ventilation at the back of the panel) it may heat up to over 80° C. in full sunlight. This could reduce its energy conversion efficiency by 30% to 70 W/m$^2$.

Overlaying such PV material in place of or bonded to the front/top surface of any of the solar thermal panels 9 to 16 above can form a PV+Thermal panel. Choosing a PCM temperature of say 20° C. can result in much better performance of the PV as it can be held close to 20° C. even in direct sunlight (provided the detailed design provides adequate heat exchange between the PV material and the PCM). This can form part of a Thermal Store, in which other PV panels or solar thermal panels or other banks in a central Thermal Store may contain PCMs at other temperatures, e.g. 32° C. or 45° C.

17. In another embodiment, transparent solar PV material can form part of or replace any cover glass employed over any solar thermal panels 9 to 16 above or PV+Thermal panel 16 above, in which case the transparent PV material may be optimised to absorb one part only of the incident solar spectrum and transmit the remainder, while the PV material directly overlaid on the solar thermal panel is optimised to absorb a complementary part.

18. It may further be advantageous in any embodiment of PV+Thermal panels 16 or 17 above for the PV material layer directly overlaying the underlying solar thermal panels 9 to 16 above to be transparent to certain infra-red or other wavelengths that the PV material cannot be optimised to absorb, and for the underlying thermal elements to be coated with or mixed in a composite with a selective absorber such as TiNOX.

19. Radiators with integrated local PCM thermal storage can be embodied similarly to the PCM-based integrated collector solar thermal panels 9, 13, 14 or 15 above, however omitting any cover glass and selective absorber (or tuning it to be well suited to exchanging heat with an environment to be heated and cooled). For example, such a radiator might be configured as a ceiling tile or a conventional radiator, employing a mix of radiative and convective heat transfer to/from a room to be heated/cooled. Using mechanisms like those in 9, 13, 14 or 15 above, the flow of heat between the room and the PCM thermal storage material in each radiator can be switched on or off (e.g. using switchable heat pipes) or reversed (e.g. using any kind of heat pump including thermoelectric devices). A system with many such radiators or panels could form a distributed Thermal Store if some of the radiators contained PCM with different melting temperatures from others (whether connected via pipes containing heat transfer fluid, or purely in radiative or convective contact with the room).

A single radiator could be a Thermal Store if it contained several banks of PCM at different melting temperatures, and means (e.g. switchable heat pipes) to allow heat to be controlled to flow between the room and selected bank(s) at any given time.

20. A specific embodiment of a radiator from 19 above is a ceiling panel comprising two insulated banks of PCM (one melting at 18° C. and one at 24° C.), with suitable internal fins or conductivity enhancing material to allow heat to flow to/from a flat heat pipe; the flat heat pipe being arranged so that at another point it forms the bottom surface of the ceiling tile, bringing it into radiative contact with a room (See FIG. 15). The heat pipe includes a switching mechanism allowing the flow of heat to be controlled from the room to the 18° C. bank or from the 24° C. bank to the room. An interposed heat pump (e.g. thermoelectric device or vapour compression heat pump) can be used to move heat from the 18° C. bank to the 24° C. bank. By controlling this arrangement, each tile can contribute to:

Preventing excursions of room temperature outside the range 18° C. to 24° C. (when the room temperature starts to exceeds 24° C., allow heat to flow to the 24° C. bank, or if heat loads become excessive, to the 24° C. and 18° C. banks at the same time; when the room temperature falls below 18° C., allow heat to flow from the 18° C. bank, or if room temperature falls too fast, from the 24° C. and 18° C. banks at the same time).

Within the range 18° C. to 24° C., achieving a user selected temperature, by either removing heat from the room to the 18° C. bank or adding heat to the room from the 24° C. bank.

After operation for a period of time the coolth in the 18° C. bank and the warmth in the 24° C. bank will become depleted. Operation of the interposed heat pump will restore the coolth and warmth by pumping heat from the 18° C. to the 24° C. banks. Because the ΔT is small (just 6° C. in this example), the COP will be high (even using thermoelectric devices).

In summer, excess heat will gradually build up in the 24° C. bank. This can be removed conventionally, for instance by running cooler night air through the ceiling void above the ceiling tiles and switching an extension of the heat pipe to exhaust heat into this air flow. Alternatively, the 24° C. banks can be cooled when needed by using their heat to pre-heat cold water. This can be done by having a push-fit mains water in and out port on each tile, combined with internal valve and simple control logic to switch the flow of water to cool the 24° C. bank when excess heat needs to be dumped, or bypass the 24° C. bank at other times. Thus the ceiling tiles can form part of the water heating system to supply DHW to the building. In winter, when there is a net heat load on the room (i.e. over a 24 hour period some heat escapes to the outside world, and if left alone the room would eventually cool to the outside world temperature), the ceiling tiles can:
- deal with peak internal heat loads (e.g. those in a restaurant kitchen during food preparation, or in an office during peak occupancy hours) by storing heat to the 18° C. banks;
- remove heat to insulated overnight storage by cooling the room to 18° C. at the end of the day (reducing the ΔT between the room and the outside world, so reducing the rate of cooling) storing the heat in a well insulated set of banks and using overnight cheap rate electricity to heat pump the heat to the 24° C. bank overnight (in the process adding both the heat from the 18° C. bank and the heat from the electrical energy used for heat pumping);
- use the heat in the 24° C. bank to pre-set the temperature in the room to a comfortable level before the start of the working day.

Policies for when to remove and return heat, and the temperatures to be met at different hours of each day, days of the week—such as weekends, or periods when heating/cooling can be at a broader set-back band—such as school holidays, can be set using a centralized controller (e.g. on a web page) and then communicated to each ceiling tile (which can include its own control logic and temperature sensors).

Using this approach it is even possible to deliver very fine zone control in which part of a room could be targeting one set temperature while another part targets a different set temperature, by setting different tiles with different target temperatures. Combined with Active Badges, or other person tracking technology (e.g. local Bluetooth connections to personal mobile phones), individual users could set their personal temperature preferences and have these follow them around a building (when people gather together a policy would decide the target temperature, for example by averaging personal targets).

21. An alternative embodiment of 20 above would have a single insulated bank of PCM (e.g. 24° C.), plus a thermoelectric device ("TED") connecting that bank to a heat spreader (perhaps a planar heat pipe) (See FIG. 16). By allowing heat to flow from the PCM through the TED to the heat spreader, heat can be released to raise room temperature to any selected temperature up to just below 24° C. (This will also generate a small electrical current that could be stored locally in an electrical battery for later re-use). By driving a current through the TED, heat can be pumped from the heat spreader into the PCM, for example to cool the room to any temperature below 24° C. In this embodiment there is no benefit of working with exclusively off-peak electricity, however the ability to trade heat in and out of the PCM store with compensating electricity flows in and out of an electrical battery may compensate.

22. A heat recovery ventilation ("HRV") unit or mechanical ventilation with heat recovery ("MVHR") recovers heat from exhaust warm air leaving a warm building (to a colder outdoor environment), and delivers the recovered heat immediately to counter-flowing fresh incoming air to pre-heat it.

An embodiment of a Thermal Store provides a delay or storage MVHR:
- For the case of a warm building in a colder environment, multiple separate heat exchangers along an insulated exhaust air duct are connected to progressively lower melting temperature insulated banks of PCM (via heat pipes or circulating heat transfer fluids, etc). If heat pipes are used, they all have heat diodes to prevent heat flowing back from the PCM to the exhaust air duct. The same banks of PCM are connected to multiple heat exchangers in a counter-flowing insulated inflow fresh air duct. If heat pipes are use they are switchable so that heat only flows from the PCM to the inflowing fresh air when commanded.
- The warmest bank of PCM is chosen to be close to (and just below) room temperature; the coldest bank of PCM to be close to (and just above) the coldest outdoor air temperature expected for the region.
- For the case of a cool house in a warm environment, the PCM banks along the exhaust air duct are in reverse order, i.e. of progressively higher melting point.
- The coolest bank of PCM is chosen to be close to (and just above) room temperature; the hottest bank of PCM to be close to (and just below) the hottest outdoor air temperature expected for the region.
- In regions where outdoor air temperatures swing from significantly above to significantly below room temperature a switchable pair of ducts can be used.
- Advantageously, switching which PCM banks participate in heating incoming fresh air can finely control the temperature of that incoming air. At times where air coming into the building does not need to be heated or the temperature can be reduced (e.g. overnight, on weekends or holidays for a school), heat can still be captured to the PCM banks from outflowing air.

23. In a further embodiment, heat pumps (for example TEDs) can be interposed between some or all of the banks of PCM, or between the heat exchangers in the exhaust air duct and their associated PCM banks, or between each PCM bank and the related inflow duct heat exchanger (See FIG. 17). These configurations allow for electrical energy expenditure to upgrade the heat captured to a higher temperature to ensure that sufficient heat of high enough grade (temperature) is available to pre-heat inflow air to provide all required heat in (for example) a Passivhaus.

A particularly advantageous embodiment for use in a UK climate would have an array of PCM banks at 20° C., 17° C., 14° C., 11° C., 7° C. each connected via heat exchangers to both exhaust and inflow ducts (thus providing delayed or storage heat exchange). In addition two further banks would be present:
- one at 24° C.: connected to the inflow duct only;
- one at 0° C.: connected to the outflow duct only;

With a heat pump connected between the two (or alternatively with a sequence of TEDs connected between 0° C. and 7° C.; 7° C. to 11° C.; and so on until 20° C. to 24° C., creating a heat pumping ladder between 0° C. and 24° C.). The 0° C. bank is available full time to capture heat by cooling exhaust air to a temperature lower than the normal low outdoor air temperature. This heat can be heat pumped using low-tariff electricity (e.g. overnight) to the 24° C. bank. Heat stored in the 24° C. bank can be used on-demand to pre-heat inflowing fresh air above the temperature of exhaust air.

24. In an embodiment, in at least one bank, the heat exchanger between PCM and a heat transfer fluid ("HTF") can comprise an enclosure containing the PCM and a pipe (or pipes) carrying the HTF through the PCM (ensuring that the PCM and the HTF don't come into direct contact, but are in thermal contact). The pipe may run up and down several times through the PCM to increase the thermal contact area. The pipe may also have a round or a flattened cross-section (again to promote heat transfer area), and may have a wrinkled, convoluted or dimpled surface (on the outside, to increase heat transfer area, and on the inside to promote heat transfer between the flowing HTF and the pipe wall). The addition of fins to the outside of the pipe can further increase heat transfer area. Typically the pipe and fins may be made of copper or aluminium.

25. In a preferred embodiment, a fin-tube heat exchanger is used (commercial examples: Lordan, SP Coils), which would normally be used to transfer heat between HTF (e.g. water or refrigerant) flowing in the tubes and air flowing across the fins. In this embodiment PCM (or a composite of PCM with a thermal conductivity enhancer like carbon) fills the air spaces in the fin-tube heat exchanger. With a typical fin spacing of 6-22 fins per inch (~1-4 mm gap between fins) the low thermal conductivity of PCM is overcome by the thin layer thickness and large surface area for heat transfer from fins into the PCM.

Standard manufacture techniques for such a heat exchanger can be employed initially: an array of U-shaped tubes is arranged in a grid, and then a plurality of fins with a suitable grid of holes (furnished with spacing collars that also provide extra surface area for heat to transfer from tubs to fins) are pushed over the tubes so that the collars abut. Other short curved tube sections are brazed on at the opposite end to complete the circuits. The tubes are either pressure expanded or a ball bearing is driven through them to ensure that the tubes are mated firmly to the collars on each fin.

In a special step to adapt the standard manufacture to this embodiment, a suitable enclosure is added to provide containment for the PCM. Then PCM in its liquid state is poured into the enclosure so that it infiltrates the gaps between fins from one edge and flows down under gravity until it fills all of what were air spaces between fins.

It may be necessary to do this under a vacuum or reduced pressure to eliminate bubble or voids forming. The addition of thermal conductivity enhancer may thicken the liquid PCM. Up to a certain proportion of thermal conductivity enhancer the PCM composite may be able to be introduced by pouring it into the enclosure.

As the proportion of thermal conductivity enhancer rises, the thickness of the PCM composite rises and it ceases to be pourable, but may be infiltrated between the fins under pressure from one or all edges.

26. Above a certain further percentage (e.g. around 10% of expanded natural graphite as a thermal conductivity enhancer) the PCM composite acts like a putty. In this case, it becomes difficult or impossible to infiltrate it between fins from the edges of the fin array. Instead a change in the manufacture of the basic fin-tube heat exchanger is made: after each fin is pushed over the tubes and seated home with its collars abutting the previous fin, a thin layer of PCM composite is laid down over the fin (e.g. by a machine with many nozzles, which descends over the pipes, lays down a thin layer, and then is withdrawn) before the next fin is pushed on and bedded home. By careful calculation of how much PCM composite to lay down where on the fin all the space between fins can be filled with PCM composite.

27. In another embodiment of 25 or 26 above, the metal fins are omitted, but the grid of tubes is retained. PCM or PCM composite can be poured into the spaces in the grid until it is full. Alternatively if the PCM composite is relatively thick, it can be laid down in multiple layers by a machine with nozzles (being tamped home by a plate, equipped with the appropriate hole pattern, pushed down over the tubes between each layer application and then withdrawn).

28. Alternatively the PCM composite can be introduced as PCM composite fins: PCM composite in its solid phase a few millimetres or centimetres thick; cast, formed or drilled with the appropriate hole pattern; pushed home in the same sequence as the fins of a fin-tube heat exchanger.

29. In any of 25 to 28 above, the outside of the tubes can be specially prepared with thermal grease and/or graphite and/or with a pattern of small longitudinal fins to ensure that there is adequate thermal contact between the PCM composite and the tubes after the tubes are expanded.

30. During the manufacture of expanded natural graphite ("ENG"), very highly expanded natural graphite is compressed using a plate attached to a piston. This aligns the graphite planes to be more nearly parallel to the compression plate (and more nearly perpendicular to the driving axis of the piston). Graphite is more thermally conductive in the plane of the graphite than between planes. Thus the resultant ENG is more thermally conductive in plane and less between planes. PCM composite including ENG as a thermal conductivity enhancer ("PCM+ENG") is similarly non-isotropic in its thermal conductivity.

31. When using PCM+ENG in 27 and 28 above, preferential thermal performance will therefore result due to the manufacturing process involving a pressing stage which will align the higher thermal conductivity plane of the PCM+ENG perpendicular to the tubes carrying the HTF.

In 26 above, there is sub-optimal performance: the optimal alignment of graphite planes would be perpendicular to the fins (the metal fins will be at least an order of magnitude more thermally conductive than the PCM+ENG) but the processing steps in manufacture will tend to lay down the PCM+ENG with the higher thermal conductivity plane of the PCM+ENG parallel to the fins (i.e. again perpendicular to the tubes carrying the HTF).

32. In an alternative embodiment, the heat exchanger between PCM and a heat transfer fluid ("HTF") can comprise an insulated enclosure containing alternating layers of:
PCM or PCM composite
Pressed plate heat exchangers, typically made of copper, aluminium or steel
The pressed plate heat exchangers can be formed by stamping a flat sheet of metal using a die with a suitable pattern of raised areas that (in inverse after stamping) form a network or networks of channels. A pressed plate is soldered, welded, brazed or otherwise attached to either a flat backing plate or a mirror image pressed plate.

In small volume or prototype production a pressed plate can be formed using a CNC (Computer Numerically Controlled) stamping machine deploying a hemispherical and a cylindrical stamping tool (See FIG. 18).

The network of channels can be configured to carry just one or several independent heat transfer fluids. Channels may branch to increase surface area. By attaching two pressed plates back to back with a flat plate (furnished with suitable drilled, punched or formed holes) attached between, it is possible to arrange for independent channels to cross each other, in a similar way to multiple layers in a Printed Circuit Board allow circuits to cross each other.

The network of channels is welded, soldered, brazed or otherwise connected to short pipes at the edges of the plates; these pipes pass through the surrounding enclosure and give access to the channels to make them part of heat transfer circuits.

The enclosure is filled with an initial layer of PCM or PCM composite (equipped with ENG or other thermal conductivity enhancer or an aluminium honeycomb that adds finning). A pressed plate heat exchanger is layered on top, ensuring that the amount of PCM/composite and the placement of the pressed plate heat exchanger (including any support posts, etc) yield a slight pressure and a good thermal contact between the two. Multiple further alternating layers of PCM/composite and pressed plate heat exchangers are layered above until a final layer of PCM/composite below the ceiling of the enclosure.

Just as a single pressed plate heat exchanger could carry several different channels for different heat transfer fluids, the two pressed plate heat exchanger layers above and below a layer of PCM/composite may each carry different services. This arrangement could alternate in pressed plate heat exchanger layer pairs up the enclosure.

The thickness of the metal used for the pressed plate heat exchangers may be as thin as is compatible with ensuring:
- Any necessary structural rigidity to avoid the pressed plate heat exchangers sagging under gravity (the pressing itself can help to add rigidity and be designed with this goal as well as fluid flow and heat transfer in mind; also, if the PCM composite between layers is quite solid under all conditions (PCM melted or frozen) then the metal can be thinner).
- That the static and dynamic pressures of flowing heat transfer fluids can be contained.
- That there is a good vapour barrier between the PCM and the atmosphere.
- That any corrosion or other chemical attack or physical erosion will not break through the chosen thickness of metal in the service life of the Thermal Store.

If the material can be made very thin, then other materials such as plastic or metallised film may substitute for the metal.

33. In 32 above, as the metal or other material to be stamped becomes very thin, it is no longer rigid enough to be used (after initial pressing) to itself indent the PCM composite, nor it is rigid enough to withstand the static pressure of the PCM to prevent collapse of the stamped channel structure.

Therefore in a further embodiment, the stamping tool is applied directly to stamp a pattern of channels into the PCM composite itself (carefully selecting the mixture of PCM, thermal conductivity enhancer, and other material forming the PCM composite to ensure that in all conditions it will maintain structural rigidity).

In this case a very thin metal (or other material) layer may be overlaid on the PCM composite layer (or on the stamping die) and stamped simultaneously to provide:
- A good vapour barrier between the PCM and the atmosphere.
- Resistance to corrosion or other chemical attack.

This layer would not be expected to provide:
- Any structural rigidity
- Static or dynamic pressure containment Instead of co-stamping, another coating process could be used, for example shrink wrapping; spray coating; vapour deposition; tin dipping; etc.

34. The channel structure in 32 or 33 above can take the form of discrete channels (effectively tubes of some profile, whether round, flattened or otherwise), which may carry independent HTF or may all be linked to carry just one HTF. Equally the channel structure between two layers can form a complete shallow, wide void, stretching from one edge of the containment to the other, that can carry HTF.

Advantageously in 33 and 34 above discrete tubes or pipes are eliminated, being replaced by a forming process of the PCM composite itself, thus reducing the resources required to construct the heat exchanger. (See FIGS. 19, 20 and 21)

35. In 32 to 34 above, the stamping process can be used to apply, in addition to the medium scale pattern of flow channels, any or all of:
- A larger scale pattern (e.g. a long wavelength sinusoidal displacement in one, two or three dimensions) that serves to increase the overall heat transfer surface area and channel length.
- Additional medium scale indentations, for example deep narrow grooves indenting into the PCM composite layer, running broadly parallel to the flow direction, that increase surface area for heat transfer and reduce the maximum distance from a heat transfer surface into the body of the PCM composite.
- Small scale patterns of ridges, bumps, fins or grooves in spiral, linear, crossed or pseudo-random patterns (independently or overlaid) that create advantageous fluid flow patterns (e.g. reducing pressure drop by helical flow) and/or increase heat transfer between HTF and the surface (by increasing surface area at small scale and promoting turbulent mixing of surface and bulk layers to move heat in the HTF to/from the heat exchange surface).

(See FIG. 23 in which only channel structure is shown; PCM/composite omitted for clarity.)

36. In all cases where a structure is made employing PCM composite, that composite may be made by first forming ENG into the appropriate shape (for example by pouring low density ENG in and then compressing it) and then subsequently infiltrating PCM into the air gaps in the compressed ENG.

37. In any heat exchanger embodiment, the structure of the containment may be adapted on one or several sides to contain suitable void spaces acting as a manifold for HTF to flow into and elsewhere out of the PCM-HTF heat exchanger channels or tubes. Such a void is equipped with holes, slots or other arrangements to allow HTF to flow between the void and the channels, tubes, etc between PCM composite layers. A suitable application of known sealing methods (overlapping, O-rings, silicone sealant, etc) ensures that HTF flows through the holes only into the designated channels. Where multiple manifolds serve multiple HTFs through different channel sets, a suitable geometry and sealing is adopted to ensure no mixing of fluids. From each void a further hole (or holes), of suitable diameter to satisfy the aggregate design flow rate through all channels, leads to/from external pipe connectors supplying/removing the HTF to elsewhere in the Thermal Store. (See FIG. 21.)

In an alternative embodiment another method of constructing a manifold is adopted. (See FIG. 22.)

38. In a further embodiment of a bank, there are no manifolds at the edges of the heat exchanger. A biomimetic approach inspired by animals' arterial to capillary bed to venous blood flow is adopted: The pipe connectors to external tubes of a given diameter extend directly to a same diameter main arterial channel into the PCM composite. After a short distance the main artery branches and reduces in size. In a sequence of branching steps, combined with suitable curving paths, the channel branches down to a large set of very fine ("capillary") tubes running through the PCM composite. Further along the flow direction the capillaries progressively join together to form larger and larger channels ("veins") until one large vein exits the PCM composite to a pipe connector.

In the case where a single HTF flows through the bank, the combination of branching arteries/capillaries/unbranching veins is arranged to form a space-filling network whose voids occupy a designed fraction of the volume of the PCM-HTF heat exchanger, e.g. 10%. The network is designed such that at all stages it keeps the maximum distance from a heat exchange surface (forming the interior surface of an artery, capillary or vein) into the PCM composite broadly constant and below a threshold value defined having reference to the thermal conductivity of the PCM or PCM composite, e.g. 10 mm.

All the medium and small scale techniques detailed in 35 above may be used on the inside of the channels to enhance heat transfer area, minimise surface to PCM distance, increase surface roughness for heat transfer promotion and induce helical or laminar flow in some zones to reduce pressure drop.

In the case where multiple independent channels carry independent HTFs through the bank, the separate branching arteries/capillaries/un-branching vein combinations (one per channel) are arranged to form space-filling networks within the bounds of the containment that interpenetrate but do not connect (i.e. no transfer of HTF between channels), with the constraints that:
  in any zone of the PCM-HTF heat exchanger the average density of each channel must be roughly equal (or alternatively roughly in a pre-defined ratio determined by a designer, if for example one service needs larger heat transfer than another)
  within each zone the distribution of each channel in all directions is roughly isotropic to prevent concentrating all of one channel together and all of another channel together Manufacture of such an embodiment may be by any one or a combination of:
  Starting with a solid block of PCM/composite, drilling holes into it using a flexible drill (based on a navigable endoscope mechanism) to create the appropriate network of branching pipes (starting from the arterial and venous end of each network, and "meeting in the middle" of each capillary).
  Starting with a branching pipe mesh made of a thin flexible plastic or rubber. This may initially be made to sit essentially in a single plane, for instance due to its mode of manufacture. By pushing the arterial and venous ends towards each other the finer structure in the middle can be pushed into a three dimensional conformation. This may be pulled into specific shape by use of a three-dimensional mesh of fine wires or threads. Then a liquid PCM (with no or limited thermal conductivity enhancer to keep it quite liquid) can be poured into the containment around the pipe network.
  Casting: in one embodiment, starting with a network made from bundles of fine wax wires, each separate in the middle and arranged into the appropriate 3D shape for the capillary network but bound (or glued or braided) together towards each end to form the ever thicker arterial and venous networks. More than one network can be simultaneously built and intertwined if multiple channels are required. Using this as a single use die, the substrate (e.g. ENG) for the PCM composite can be introduced and packed around the wire network. Following this the wax wire is melted away in a lost wax process. Then the PCM is infiltrated into the ENG to form the PCM composite. Finally a coating stage (e.g. vapour deposition blown through the networks) seals the exposed surface of the PCM+ENG.
  Alternatively the above lost wax structure can be built up using a stereolithography machine.
  A suitably adapted stereolithography machine can deposit the PCM composite directly.

39. A Thermal Store may need to be connected to a number of different sources or loads (i.e. providers or consumers of thermal energy—collectively "services") to any given bank of PCM. The fluids used to carry heat to/from these services may be completely incompatible, e.g.
  clean mains water to be heated;
  dirty waste water to contribute heat;
  refrigerant gas (e.g. R410A) from a heat pump bringing heat from a bank below;
  a different refrigerant gas carrying heat to a heat pump to a bank above;
  solar heat transfer fluid (50% propylene glycol with water) bringing heat from solar panels;
  water mixed with Fernox or other additive to carry heat to a space heating radiator loop;
  a different low-temperature heat transfer fluid to carry cooling to air-conditioning cassettes.

In a simple embodiment, pipes for each service would pass through the PCM-HTF heat exchanger, with a division of the total pipes running through the heat exchanger made to assure sufficient power to each service.

40. In an alternative embodiment, all the pipes running through the heat exchanger of a bank are dedicated to carry just one secondary HTF. The pipes form part of a circuit, incorporating a pump to circulate the secondary HTF. This secondary HTF carries heat to and from the PCM-HTF heat exchanger in the bank and so stores or retrieves heat from the PCM. On another part of the circuit (external to the PCM-HTF heat exchanger) the circuit passes through a number of external heat exchangers, one dedicated to each service. Preferentially such heat exchangers may be plate heat exchangers. Each service has its own heat exchanger, allowing heat to be exchanged between the secondary HTF and the fluid of each service. The secondary heat transfer circuit is capable of simultaneously taking heat from and delivering heat to multiple services. (See FIGS. 24 and 25.)
41. In a further alternative embodiment, some services share a secondary heat transfer circuit as in 40 above, while other services are furnished with dedicated tubes or pipes running through the PCM-HTF.
42. In a further alternative embodiment, a shared secondary heat transfer circuit also functions as a primary direct heat transfer circuit for another service or services, for example a set of pipes in the PCM-HTF heat exchanger can be dedicated to carry potable mains water, which is used to heat water directly for DHW on demand, however between DHW demand times, a system of valves and a circulation pump allow the same potable mains water to act as a secondary HTF to carry heat to/from other services via plate heat exchangers.
43. In a further alternative embodiment two or more services can share a direct heat transfer pipe when they employ compatible HTF, for example a circuit carrying propylene glycol HTF for solar panels can share with a circuit bringing heat from waste water heat recovery. The latter circuit would only be switched into service when a sensor detects the flow of waste water of sufficient temperature, at which time flow to the solar circuit can be interrupted or the flow rate reduced if necessary to compensate. (See FIGS. 26 and 27.)
44. In 42 to 43 above a set of pipes carrying a compatible fluid (a "port") are time-shared between two or more services. A controller can choose (by controlling pumps, valves, etc) which service to prioritise when there is a conflict. For example, DHW would be always be prioritised versus carrying heat to any other service via a plate heat exchanger. A hierarchy of priorities can be formed (for each time-shared port) by applying the following rules in order (1 is highest priority):
    1. Which service does a human or other user expect to be delivered instantly, on demand and for as long as requested? (example: DHW)
    2. Which service can be interrupted for a short time only before a safety concern is introduced? (example: carrying heat from a back boiler in a wood stove which could overheat and be damaged otherwise)
    3. Which service can be interrupted for a short time only before a performance issue arises? (example: carrying heat from a solar panel)
    4. Which service can be interrupted for a longer time before a performance issue arises? (example: background heating/cooling of a room—covered by thermal inertia of room for a considerable time)

Some services will have variable priority, for example heat pumping to replenish heat or coolth in a bank: this can be the lowest priority until a low-cost time of use electricity tariff comes into effect, at which time its priority may be allowed to rise so that the time of use tariff can be used for all heat pumping; a further increase in priority can be put into effect when it becomes apparent that any further delay in heat pumping may result in there being too little heat in the bank to deliver full service the next day.
45. In the various embodiments above, where some or all of the tubes or pipes are used to carry heat between services and the PCM using a secondary HTF, this arrangement can be substituted by heat pipes performing the same duty.
46. In the various embodiments above, where some or all of the tubes or heat pipes pass through fins with PCM or PCM composite between the fins, or pass through PCM composite without fins ("fin-tube-like embodiments"), the along-tube direction can be divided into several segments containing different PCMs with different melting temperatures (See FIG. 28). To prevent heat leaking from one area of a PCM into an adjoining colder one, a set of fins (or a volume of PCM composite) typically one to two centimetres thick is replaced with insulating material (for example vacuum insulation panel pre-formed with an array of holes to carry tubes or heat pipes). Where heat pipes are used, they can also be furnished with heat pipe switching or diode arrangements to prevent heat from flowing from hotter to colder zones of PCM in an uncontrolled way.
47. In a fin-tube-like embodiment, any given port can consist of a single pipe or heat pipe that winds its way back and forwards several times from end to end of the PCM-HTF heat exchanger; or it can consist of two headers or manifolds (one at each end of the heat exchanger or both at the same end), dividing the flow through the port across multiple pipes, which either traverse the PCM once (end to end) or several times (each pipe winding its way back and forwards).
48. Where there are several ports traversing the PCM-HTF heat exchanger, there can be equal numbers of traversals for each port, or some ports (requiring perhaps more heat exchanger surface) may have more traversals or use larger bore tubes/heat pipes or flattened section tubes/heat pipes.
49. Where there are several ports traversing the PCM-HTF heat exchanger, these may be preferentially arranged in way that, when viewed in cross-section (i.e. with the tubes or heat pipes running away from the viewer), they form a pattern in which the tubes/heat pipes are most evenly spaced (diagrammatic examples), for example such that the average distance between tube/heat pipe centres for a given port is as close as possible to equal in all directions.
50. In any embodiment of a PCM-HTF heat exchanger, the HTF may be a two-phase liquid, for example a dielectric liquid with a low boiling point. Heat is taken from the PCM by the evaporation or boiling of some of the dielectric liquid to form bubbles, without a change in temperature of the liquid [Ref: Parket Hannifin], or vice versa the re-absorption of vapour releases heat into the liquid which can be absorbed by the PCM (or alternatively vapour may be separated from liquid and the vapour passed through a service heat exchanger where it picks up extra heat before being allowed to condense in a PCM-HTF heat exchanger). This creates a close to constant temperature system.
51. In any embodiment of a PCM-HTF heat exchanger, the HTF may be a refrigerant, for example R410A.
52. In a further embodiment of 50 or 51 above, the vapour phase of a two-phase liquid cooling system, or a refrigerant, used to carry heat between a PCM-HTF heat exchanger and one or more service heat exchangers may also, at the same or another time, by a suitable arrangement of compressors, expansion valves and diverter valves, be the working fluid of a heat pump used to pump heat from this bank to a bank with a higher melting point PCM, or to this bank from a lower melting point PCM, or both. In this way heat pumping becomes an integrated element of the PCM-HTF heat exchanger bank structure. (See FIG. 29.)
53. In a preferred embodiment of 52 above, the compressor would also serve at another or the same time as the circulation pump for the secondary heat transfer fluid (at which time the expansion valve(s) would be by-passed).
54. In an alternative embodiment of the current invention, providing a wholly different mode of integrating heat pumping into the structure of a bank, magneto-caloric material can be attached to the heat exchanger or added as small particles into the mixture of a PCM composite (PCM+thermal conductivity enhancer+magneto-caloric material). Combined with apparatus to control the application of magnetic fields by moving permanent magnets in relation to the bank structure, or otherwise, heat can be pumped to/from each bank.
55. In an embodiment of the current invention, a bank or banks of a Thermal Store can be used to pre-cool mains water arriving into a building (See FIG. 30, centre and right hand side). This is especially useful in parts of the world or at times of the year, where mains water is delivered at too high a temperature to be comfortably used as cold water (e.g. in Dubai where mains water can arrive into a dwelling at 35-40° C., or the southern USA where it may arrive at 25-30° C., but would ideally be delivered at a cold tap at a comfortable temperature for drinking such as 6° C.). A ladder of cooler PCM banks, e.g. in sequence 20° C. and 7° C. in Southern USA, can conveniently provide such pre-cooling. The energy captured from such cooling of mains water can conveniently be heat pumped to higher temperatures to add heat to higher temperature banks (e.g. heat from the 7° C. bank to a 45° C. bank and from the 20° C. bank to a 58° C.) which can then be used to deliver DHW.
56. In an embodiment where a Thermal Store is integrated into a building that also has a grey-water system (a system to capture water already used for some purposes such as showering or bathing, and re-use it for other purposes such as toilet flushing), the grey-water tank itself may preferentially be equipped with a coil of copper pipe or other heat exchanger means so that it can act as a source of heat to be transferred (directly or via interposed heat pumping means) to a bank or banks of the Thermal Store. In such an embodiment:
Preferentially, the heat exchanger in the grey-water tank will channel heat exchange fluid so that it starts at the bottom of the grey-water tank and progresses to the top, to take advantage of stratification within the grey-water tank and have the HTF leave the grey-water tank heat exchanger at the highest temperature possible;
At different times the temperature of HTF leaving the grey-water tank may be high enough to exceed the input temperature threshold of several banks, in which case a controller may preferentially choose to load this heat to the highest melting temperature bank, or the bank that is emptiest, or to several banks of descending melting temperature in sequence, while avoiding running HTF to any bank with a melting temperature higher than the exit temperature of the HTF from the grey-water tank heat exchanger;
The grey-water tank should be well insulated: this would not be necessary in a normal grey-water system, as the grey-water tank would be allowed to equilibrate to room temperature, however in this embodiment the grey-water can be cooled well below room temperature (e.g. to 7° C.) as heat is extracted from it to the Thermal Store.
57. In an embodiment where heat is to be recovered from waste water but the waste water must be allowed to run away immediately without storage, a waste water heat recovery unit comprising a section of waste downpipe made of copper surrounded by a coil (or alternatively a sheath) made of copper carrying counter flowing heat transfer fluid may be used (a "waste water heat recovery unit"). The HTF only flows when there is a flow of waste water in the downpipe, and that waste water exceeds a threshold temperature. Based on the temperature then reached by the HTF, the HTF can be directed to the highest melting temperature bank colder than the HTF, and subsequently directed through a sequence of ever lower temperature banks, before being pumped back to the waste water heat recovery unit. (See FIG. 27.)
58. In an alternative embodiment to 57 above, the waste water heat recovery unit may be replaced by several distinct thermally isolated smaller units, each one directly connected via a pumped circuit to just one bank (See FIG. 30, centre and left hand side). When waste water flows, depending on its temperature, selected pumped circuits are activated to carry heat to their respective banks, but only for banks with PCMs with melting points lower than the temperature of the waste water, and that require additional heat.
59. In an alternative embodiment to 58 above, each waste downpipe section is formed from a planar heat pipe curved through 360 degrees into a pipe section. The curved planar heat pipe is thermally bonded to (or alternatively itself divides to form) one or more heat pipes running into the respective bank, wherein it forms part of the PCM-HTF heat exchanger. These heat pipes are equipped with heat diodes to prevent heat running from each bank to the waste pipe when the temperature in the waste pipe is lower than that in the bank.
As an alternative embodiment the planar heat pipes can form a large flat surface, perhaps forming one side of the thermal store, over which the waste water can run. In a specific embodiment, each of 56 to 59 above can be used autonomously, for instance where a small Thermal Store is integrated as part of waste water heat recovery system, to be used within a larger system of conventional design or incorporating another central Thermal Store.
60. In an embodiment where a large quantity of high-grade heat (e.g. over 80° C. or over 100° C.) is entering the Thermal Store (e.g. from a solar thermal panel in the summer or from a fuel cell) and where there is also a demand for cooling, such high grade heat may be used (either immediately when it is available, or having first been stored in a bank of PCM with a suitable melting point, e.g. 80° C. or 100° C.) to drive either an absorption or adsorption or other heat-driven heat pump to pump heat from cold banks (e.g. with PCM melting at, e.g. 7° C. or 0° C. or −22° C.) to generate coolth for cooling needs (such as air-conditioning or refrigeration). Absorption or adsorption heat pumps typically also yield "waste heat" at an intermediate temperature that, conventionally, needs to be disposed of via, for instance a cooling tower. In the context of an embodiment that integrates such a heat pump with a Thermal Store, the waste heat can be preferentially stored in another bank or banks of suitable melting temperature PCM and later used for purposes such as water heating or space heating or medium temperature process heat.

61. An embodiment of a Thermal Store may preferentially integrate electrical storage by integrating battery cells directly within the structure of the PCM-HTF heat exchanger of one or several banks.

Electrical batteries all depend on different chemistries. Each one has a comfortable range in which it operates well, often around room temperature. For example:
  With rising temperature, NiMH (Nickel Metal Hydride) lifetime (in cycles) degrades rapidly: Compared to operation around 20° C., operation at 30° C. reduces cycle life by 20%; 40° C. by 40%; 45° C. by 50%.
  Lithium Ion can typically operate between −20° C. and 60° C., however as the temperature drops the discharge rate that can be supported drops dramatically.
  Discharge of Lithium Ion at the high end of the temperature range is strongly advised against as self-heating can initiate which can cause a reduction in performance of the batteries; irreversible internal damage; and in some cases catastrophic failure (due to fire or thermal expansion bursting open the cells).
  Most batteries need to be above 0° C. to charge.
  Solid electrolyte Lithium Polymer batteries need to be between 60° C. and 100° C. to operate.

The surrounding environment can make it hard to maintain batteries within these limits, for example:
  A car battery can be exposed to very low temperatures in cold climates. Battery heaters are often employed to counteract this.
  Equally in hot climates electric vehicles must usually be furnished with battery cooling by heat pumps to keep them in operating range.
  Batteries used in close proximity to electronics, e.g. laptop batteries, can be subjected to high temperature waste heat from the electronics.

Operation of the batteries themselves also tends to heat up the batteries: battery cells are not 100% efficient during charging at converting applied electrical energy into stored chemical energy (or conversely during discharging at converting stored chemical energy into electrical energy); the inefficiency is exhibited primarily as waste heat.

Thus, maintaining batteries in their optimal operating range is a challenge. An embodiment of a modified bank or banks of a PCM Thermal store can achieve this by interleaving the battery cells into the structure of a bank with a PCM melting point close to the optimum operating temperature of the battery cells, in such a way that the battery cells and the PCM can exchange heat at high enough rates that the peak heat loads on the battery cells (e.g. during burst discharge or fast charging) can be dissipated into the phase-changing of the PCM.

In specific embodiments for example:
  A string of cylindrical Lithium Ion cells can be emplaced in a fin-tube-like PCM heat exchanger in positions that would otherwise be occupied by tubes or heat pipes; the PCM may be selected at room temperature, e.g. 24° C.
  Flat solid electrolyte Lithium Polymer cells can be introduced as intervening layers in a structure like: HTF channel-PCM Composite-Lithium Polymer-PCM Composite-HTF channel (and repeat); the PCM may be chosen around 80° C. representing a mid-point in the operating range of the solid electrolyte Lithium Polymer battery.

Being in close proximity to PCM composite (large surface area between the battery case and the PCM composite; with suitable finning or thermal conductivity enhancer in the PCM composite to ensure good heat transfer) means that:
  (as long as some of the PCM is still molten) the PCM can give up heat to raise the temperature of the battery cells if environmental temperatures fall;
  (as long as some of the PCM is still frozen) the PCM can accept heat to cool the battery cells to remove operational waste heat or if environmental temperatures rise.

Clearly in this embodiment, over operating cycles, heat will build up if not removed. Here the advantage of this arrangement being one or more modified banks of a PCM Thermal Store becomes clear:
  A carefully selected melting point PCM (e.g. 24° C.) keeps the battery temperature modulated, constraining the operating temperature range of the battery cells to keep them in a safe and efficient operating regime.
  Eventually the PCM's ability to store more heat at constant temperature would become saturated (with the PCM fully molten) and the temperature of PCM and battery cells would rise.
  However in the context of a Thermal Store there can be external demands for the stored heat for other uses from, for instance, DHW heating; building space heating; cabin heating in a vehicle. These extract heat from the PCM and re-freeze some of it, thus enabling the battery cells temperature to continue to be conditioned. Thus the waste heat of the battery operation substitutes for heat that would otherwise have to have been sourced in some other way.
  Even if there are no external demands for useful heat, the PCM storage permits the time when the heat is dissipated to be delayed until one or more of:
    The external environment cools below the bank temperature allowing free cooling of the PCM (e.g. a grid electrical energy store that was operating in 35° C. daytime temperatures experiences 15° C. conditions overnight, allowing HTF to circulate through the 24° C. bank and carry heat to be dissipated via an HTF-air heat exchanger, thus re-freezing PCM).
    The external environment becomes cold (e.g. −10° C.) and the PCM re-freezes releasing heat that protects the battery cells against low temperatures.
    The external environment remains hot (e.g. 35° C. by day, followed by 32° C. in a tropical night) requiring heat pumping from the bank to dissipate the heat, however it has been possible to delay that heat pumping until a more suitable time (e.g. when cheap rate electricity is available at night; when the temperatures are somewhat lower, reducing the heat pumping lift and improving the COP; when an electric vehicle is parked and attached to mains electrical power, so that valuable battery electrical energy did not have to be used reducing the autonomous range during operation).

Thus this embodiment has multiple benefits:
  It uses PCM to maintain battery cells in or near their optimal operating temperature regime in the face of varying environmental temperatures and heat loads resulting from operation, thus enabling them to electrically perform better and be used more safely.

It harnesses the waste heat from battery operation to deliver useful heat to other services at other times, thus reducing heat that has to be specifically sourced for these services.

Where harnessing of waste heat is not possible it offers opportunities to optimise the timing (and hence energy or financial cost) of heat dissipation of battery waste-heat.

62. In an embodiment where a source of heat to a Thermal Store is an air source using a fan coil, a bank or banks of the Thermal Store may be directly integrated into the air source (See FIG. 31). For example a fin-tube heat exchanger may have a fan mounted in front of it so that air can be drawn across the fins through a volume defined by projecting backwards the swept area of the fan. Outside of this area the remaining part of the fin-tube heat exchanger can be filled with PCM composite (suitably protected by insulation). The tubes form a continuous snaking curve, passing alternately through the middle of the heat exchanger (where each tube sees a segment of fin embedded in PCM composite, followed by some part of the air path volume, followed by some more PCM-composite) and the edge area (where it sees entirely fin embedded in PCM composite). In this way, when the air temperature is high enough (exceeding the PCM melting temperature), running the fan and a pump to circulate HTF through the tubes will transfer heat from the air to the flowing HTF and thence to the PCM.

By stacking several layers of the above embodiments behind each other (with reducing PCM temperature in each bank in sequence along the air flow direction) more heat can be extracted from the air (See FIG. 32). Additionally, when the air temperature is below the temperature of some banks but above the temperature of other banks, the fan can operate but only the circulation pumps of the second set of banks will be operated. Use of three port valves allows the tubes at other times to be used to extract heat from the PCM to send to some other part of a larger Thermal Store or to be used by another consumer of heat or a heat pump.

In an alternative embodiment, the tubes and circulation pumps may be replaced with several heat pipes, each containing a heat diode between the air volume and the PCM volume. The heat pipes extend beyond the PCM volume to a set of headers forming heat exchangers with a separate circuit of heat transfer fluid to carry heat (only when this HTF is flowing) to another part of a larger Thermal Store or to be used by another consumer of heat or a heat pump. Advantageously, these embodiments permit heat to be collected from air at times (e.g. the middle of the day) when it is at a higher temperature, while delaying the time at which heat is moved to another part of the system (e.g. a heat pump) until a time when power to use such heat is cheaper or more readily available.

63. An existing hot water tank used as a solar thermal DHW system, combined with a number of banks, can form an embodiment of a Thermal Store. Typically a solar hot water tank operates with its lowest strata at around 40° C., thus heat at below 40° C. cannot be captured. In an embodiment, Solar HTF, which has passed through the solar coil in the solar hot water tank, is diverted to first pass through e.g. a 32° C. and then a 20° C. bank before returning to the solar thermal panels, thus enabling additional heat to be captured. When the solar HTF (at the outlet of the solar panels) is colder than the bottom stratum of the hot water tank, the solar controller would not normally run the circulation pump as no heat would transfer. In this embodiment, an adapted solar controller runs the circulation pump whenever the solar HTF (at the outlet of the solar panels) is hotter than 20° C., however when it falls between 20° C. and the temperature at the bottom of the hot water tank, switching valves to bypass the hot water tank and start directly with either the 32° C. or the 20° C. bank as appropriate.

Mains cold water (as long as it is colder than 20° C.) would first be heated by the 20° C. bank, then by the 32° C. bank, as a pre-heat stage, followed by heating by the hot water tank. In this way, less heat needs to come from the hot water tank, and overall the system is more thermodynamically efficient.

64. For any embodiment where a solar thermal (or PV+T) panel provides heat to a local or remote Thermal Store, the temperature of HTF flowing from the solar panel can be used to select which bank to initially transfer heat to. The bank to select will be the bank with the highest PCM melting point that is below the HTF temperature plus a defined margin to allow for efficient heat transfer, e.g. if the PCM banks having melting points 20° C., 32° C., 45° C., 58° C., and the margin is determined to be 5° C., then at or above 25° C. the 20° C. bank will be the first visited; at or above 37° C. the 32° C. bank will be the first visited; at or above 50° C. the 45° C. bank will be the first visited; at or above 63° C. the 58° C. bank will be the first visited.

Because of the lower temperature banks the amount of heat that can be collected will be higher than for a water tank based system where typically the lowest temperature at which solar heat can be captured is around 40-45° C.

65. Prior art solar thermal systems are typically equipped with a constant speed pump to circulate solar HTF. This pump is on when the solar HTF at the exit of the solar panels is hot enough to deliver heat to the hot water tank. The constant speed pump delivers a constant flow rate of solar HTF. Therefore the solar HTF temperature will vary continuously with rising solar irradiance.

A solar panel is a balance between heat gain and heat loss. With rising irradiance the heat gain increases, thus so does the temperature, however also the heat loss rises. Reducing the operating temperature of a solar panel reduces the heat losses. For constant irradiance a decrease in temperature can be achieved by increasing the flow rate of HTF through the panel. So by increasing flow rate at a given irradiance we can collect more heat, albeit at a lower temperature.

When solar thermal heat will be stored in a Thermal Store, we can note that the banks are at quantised temperatures, e.g. with melting points of PCM of 20° C., 32° C., 45° C., 58° C. If a defined margin above these temperatures, to allow for efficient heat transfer, is determined to be 5° C. then it is more efficient to collect solar thermal heat at precisely 25° C. (for the 20° C. bank), 37° C. (for the 32° C. bank), 50° C. (for the 45° C. bank) or 63° C. (for the 58° C. bank), than to collect at any other temperatures. To confirm this, imagine that we collected at 43° C., for the 32° C. bank. At this temperature we will add a certain amount of heat to the 32° C. bank. The heat can only be extracted again from the bank at or below 32° C. If instead we collected at 37° C., we would collect more heat energy than at 43° C., which can still later be extracted from the bank at or below 32° C. This better situation can be arranged by modifying (speeding up) the flow rate of HTF.

Thus, in an enhanced embodiment of a system with solar thermal panels and a Thermal Store, at any given moment the irradiance can be measured and for that irradiance a model can assess for different flow rates which temperatures of HTF would be generated. Only the flow rates that would match the actual bank temperatures (+margin) would be candidates to be chosen. All other things being equal the highest temperature amongst the candidate list is chosen. Other factors (such as weather predictions, demand predictions, bank energy state of charge, etc) may overload this choice to select a lower temperature, but in all cases it will be one at a bank temperature (+margin).

From the model, for the chosen temperature, the related flow rate and hence pump speed can be looked up, and then the pump set to that flow rate, rather than a standard flow rate.

Rather than measure irradiance directly, the current temperature of the HTF at the exit point from the solar panels, combined with a knowledge of current flow rate, can be used (by reverse modelling or a learning system in the controller looking at past relationships) to estimate the irradiance, and thus drive the forward model to predict what change to pump speed should be made.

66. In a further embodiment, the return temperature of solar HTF from the Thermal Store to the solar thermal panel can be controlled to enhance the thermodynamic efficiency of the solar thermal panel. The lower the return temperature the more efficient the solar panel (because at lower temperatures the heat losses are lower). With a water tank based solar thermal system, where normally, after heat transfer with the lowest temperature stratum, the return temperature will be around or above 40° C. Advantageously, where banks at e.g. 20° C. and 32° C. exist, an embodiment can be arranged so HTF normally visits these colder banks before returning from the coldest bank to the solar panel, thus increasing the efficiency of the solar panel. (See FIG. 33.)

However, there may be larger control objectives, such as achieving a minimum amount of heat above a certain temperature, that conflict with this: if the HTF returns colder to the solar panel it will also flow from the solar panel colder. Thus a controller may change the last bank visited to a higher temperature bank than the coldest one. This may also be done because the coldest bank is full. Such control adaptation can be combined with that in 65 above to adapt the hottest and coldest banks visited, and the HTF flow rate to be most advantageous to meet the higher control objectives.

Note that 20° C. is not a minimum temperature. Banks at e.g. 7° C., 0° C. or even sub-zero temperatures like −10° C. can usefully be used in Thermal Stores, and can be visited last in sequence to send HTF back to the solar panel at say 10° C., 3° C. or −7° C. Provided the HTF is protected from freezing, and the flow temperature from the panel will be hot enough to be useful, such low temperatures can generate even higher efficiencies.

Heat stored in banks of PCM below the minimum temperature in the hot water tank may be heat pumped, for instance overnight or at other times when electricity is cheap and plentiful, and introduced to the hot water tank at higher temperatures.

67. In a further embodiment improving on 66 above (and applicable to many solar and PV+T embodiments above) the solar panel itself may be broken into a number of thermally isolated segments. (See FIG. 34.)

For example consider a flat plate solar collector that includes a copper collecting plate, bonded to which is a copper meander tube carrying HTF: this snakes from side to side while climbing row by row up the copper plate. Normally the copper plate and meander tube are continuous. The copper is highly thermally conductive, so although the HTF returns cold water to the solar panel, and warms progressively as it meanders up the panel, the hotter copper at the top of the panel will rapidly transfer heat by conduction to the bottom of the panel. Thus the whole copper collecting plate will be warmer at the bottom (due to heat transfer through the copper) than the returning cold water, and will therefore lose more heat.

In the current embodiment, thermal isolation can be achieved by splitting the copper plate into horizontal strips (one per horizontal run of the meander tube), between each of which is interposed a thin strip of insulation or alternatively air. Further thermal isolation can be achieved by introducing a short insulating material pipe section (e.g. 20 mm of plastic pipe) in each curve of the meander tube that climbs to the next higher horizontal run.

The result of this thermal isolation is that the copper plate and pipe near the bottom of the panel, where the cold return HTF arrives, will be genuinely cold (because it will receive no high temperature heat conducted through copper from the top of the panel) and thus will radiate less heat. This effect will pertain all the way up the panel, sharpening the performance of each horizontal strip, compared to the more averaged performance without the thermal isolation. Overall the thermodynamic efficiency of the solar panel will be higher than a system without thermal isolation.

This benefit should apply also in the context of a solar thermal panel of this construction used with any kind of solar thermal store including a water tank.

68. In many embodiments a set of tubes (or other channels e.g. pipes; channels between pressed plates; bio-mimetic arterial/capillary/vascular trees) carries heat by means of changes in the temperature of a heat transfer fluid, i.e. using the specific heat of the HTF (in contrast to either heat pipes or systems employing two-phase liquids, where the heat is largely carried by the latent heat of liquid-vapour and vapour-liquid phase change).

In these embodiments, HTF in the tube at the point it enters the PCM-HTF heat exchanger will have a larger absolute magnitude of $\Delta T$ between HTF and PCM temperature than at the exit of the heat exchanger.

For a case where the distribution of PCM (or PCM composite) around the tube (or into a layer between voids, etc) is constant along the length of the tube, plotting a graph of absolute value of HTF temperature versus length along tube (from the entry point) yields a curve that is broadly an exponential decay curve, i.e. starts high, drops quite steeply and then becomes more shallow. If the tube is made very long, there is a very long tail of very shallow gradient as the curve asymptotes towards the PCM temperature.

The explanation is simple (considering here the case where cold HTF, sat 10° C., flows through PCM with a higher melting point, say 24° C.):

as heat flows from the PCM into the cooler HTF, the temperature of the HTF rises;

now, just slightly further along the pipe, the (absolute magnitude of the) ΔT from HTF to PCM is smaller, hence the rate at which heat can flow from the PCM to the HTF (which is dependent on the ΔT) falls;

so heat flows more slowly from the PCM to the HTF in this next section, and the temperature of the HTF rises a little slower (however the flow rate of HTF has not diminished—it is constant)

repeating this for many small sections in sequence along the pipe sees ΔT decreasing, with the change in ΔT from one segment to the next decreasing with each step thus the power (rate of heat transfer) along the tube and the ΔT decrease in synchrony, with the rate of decrease falling off sharply at first and more and more gradually later (and in principle never quite reaching zero however long the tube is.

The above scenario persists as long as none of the PCM in the distribution around the tube is fully frozen (i.e. as long as the PCM all along the tube still has latent heat to give up to the HTF). In a real case, by some point the PCM surrounding the start of the tube will be fully frozen, having released all its latent heat, and it will start to cool (giving up its specific heat). As further heat is extracted, the zone of depletion moves along the tube, and the overall rate of heat transfer (i.e. power) from PCM to HTF aggregated along the tube falls.

(The same analysis can be reversed for the case of a hotter HTF carrying heat to a lower melting point PCM—at some point all the PCM around the start of the tube will be molten, and as this zone travels further along the tube the aggregate power the PCM can sink will diminish.)

Thus, in an alternative and preferred embodiment (for all the embodiments that use the specific heat capacity of HTF to carry heat) the distribution of PCM around the tube (or the layer thickness for plates, etc) is not held constant. Rather it tapers from associating a larger amount of PCM with a tube (or equivalent) near the start, to a smaller associated (e.g. surrounding) amount towards the end of the tube. The goal of this is to ensure that all along the tube the time where the specific heat of the PCM is depleted is broadly the same moment all along the tube.

The starting point for such a design is to model or measure the rate of heat depletion/addition for steady state HTF flow (assuming the PCM is not fully melted or frozen) at each of many points along the tube, i.e. the power at each point. Using this, design the PCM-HTF heat exchanger geometry so that the amount of PCM associated with each small section along the tube is scaled by the power related to that section, e.g. if the steady state power is 20 W in one section of 10 mm length near the start, and 10 W in another section of 10 mm length near the end of a heat exchange tube, then the section near the start should have twice the PCM associated with it than the section near the end—this could be done, for the case of a tube, by ensuring that an annulus of active PCM associated with the early section of PCM has twice the area (hence I2 the radius).

The new geometry can be simulated fully or built and measured, and further amendments made to account for:

Segments where more PCM is associated are physically larger, hence have longer heat transfer paths through the fins or PCM composite surrounding the tube (or similar). Thus the power is not just dependent on ΔT with the HTF but also on distance through the PCM composite or fins that the heat must travel (and this distance itself will vary with time—as an annulus around a tube or sub-layer within a layer melts/freezes during a run of HTF through the heat exchanger).

Taking full account of the specific heat of fins, thermal conductivity enhancer or PCM (once frozen or melted) as well as latent heat.

Interactions through the body of the PCM/composite between segments of tube on either side of a body of PCM (e.g. as a tube snakes up and down through the heat exchanger)

Designs can be iterated until the geometry, now being one that has an adapted amount and depth of PCM/composite associated with each point on the heat exchange surface, results in full depletion of heat (when heat is being extracted) or full addition of heat (when heat is being added) approximately simultaneously all along the heat exchanger. Real embodiments of this approach include, but are not limited to:

Fin-tube like embodiments (including those with no fins but purely tubes and PCM-composite) that have a single tube running back and forth through the fins, the tubes being placed so that, seen in cross-section, the tubes form a spiral path, spiraling out from a central tube (every alternate tube running in opposite directions), with the spacing between tubes on the spiral increasing along the spiral path in a logarithmic way. HTF always starts (whether loading or unloading heat) from the outermost (furthest spaced) tube and ends at the central tube.

Simplifications of the above where there are several rows of tubes: going from bottom to top, with increasing vertical spacing between successive rows; and with each successive row containing fewer tubes, more widely spaced. Again every alternate tube runs in opposite directions. HTF starts at one end of the top-most (widest spaced) row and ends at the (closest spaced) bottom row.

Embodiments where multiple layers are separated by laterally wide flow channels (of constant thickness to ensure constant flow rates, joined around at the ends so that HTF flows one way through one channel and back through the next), but with layers of PCM/composite of variable thickness, ranging from thin layers (hence closely spaced channels) at the bottom thru progressively thicker layers in the middle to thick layers (with widely spaced channels) at the top—with HTF starting at the latter end and flowing to the former (see FIG. 19).

A water tank filled with metal or plastic spheres encapsulating PCM, arranged in layers with larger spheres at the bottom of the tank, and progressively reducing size in successive layers up the tank. Water flows in at the bottom of the tank and out at the top.

Bio-mimetic arterial/capillary/venous networks, with designs grown by computer programs obeying constraints that include those ensuring that the average distance from heat exchange surface into surrounding PCM/composite is greater at the arterial end and progressively reduces towards the venous end (with the rules initially set based on some simple exponential decay function, but then allowing simulation and refinement over multiple cycles with simulated annealing or genetic algorithms to refine towards an ideal that balances all heat transfer objectives against ensuring that all heat is depleted roughly isochronously).

This kind of embodiment has the advantage that it leads to high power behaviour as long as there is heat energy stored in the PCM, followed by a sharp drop off in power once the energy is exhausted (or conversely high power acceptance of heat, until the PCM is all melted, at which time the ability to sink heat drops off rapidly) rather than slow degradation of power as the heat storage/retrieval progresses. Slow degradation means that the PCM may be far from fully melted (or frozen, as the case may be) before the power (rate of heat transfer in/out) goes too low to be meaningful, for example:

To supply DHW for a shower, ~10 kW power is required. If a Thermal Store holds 5 kWh, it can in principle deliver 30 minutes of shower time. If it can deliver 18 kW initially, 10 kW after 10 minutes, 6 kW after 20 minutes and 3 kW after 30 minutes, then in reality it can only supply around 10 minutes at 10 kW or better, i.e. its power drops too low after depleting only ⅓ of the energy stored. So its effective useable energy density would only be ⅓ of its actual energy density.

By contrast, a re-designed Thermal Store with much more PCM associated with each heat transfer tube near the start of the PCM-HTF heat exchanger, and much less near the end, could deliver a much more consistent power close to 10 kW for the full 30 minutes, at which point all the latent heat is depleted (and thereafter the rate would drop to near zero very quickly).

69. Many embodiments include all or some of pumps, compressors, thermoelectric devices, powered valves, control electronics and power electronics (or other powered components that dissipate waste heat in their operation). All or most of these components require cooling to avoid failure or degraded performance.

In preferred embodiments directing the waste heat from these components to one or more suitable melting point banks of PCM provides such cooling, thereby harnessing (for later use) rather than wasting the "waste heat".

Generally such components are air-cooled. In a preferred embodiment all components to be air-cooled are located in a sealed void, e.g. a chamber 100 mm front to back, as wide and high as the Thermal Store, mounted on the front side of the Thermal Store behind a sealed door (capable of being opened for servicing, but normally forming an air-tight seal).

Within this chamber an air-to-water radiator is mounted near the top of the chamber, relying on convection and/or fan-assisted airflow to draw air warmed by the components through the radiator. (A return path for cooled air to return to the bottom of the chamber is provided.)

The HTF flowing in the water side of the radiator is chosen to flow to a bank or banks (in succession) having PCM with melting point temperatures (e.g. 24° C.) low enough to cool the air in the chamber to a suitable temperature to, in turn, cool the components and keep them at acceptable operating temperatures.

Apart from capturing as useful heat the waste heat from the operation of these components, it also reduces or eliminates a number of the unwanted side effects from standard open loop approaches to air cooling:

No noise from fans drawing air through external vents. (With fan-assisted airflow there will still be such noise, but it is internal to the cooled chamber, which can easily be sound insulated.)

No dust or fluff drawn into the cooling path that clogs and degrades the performance of fans and heat exchangers. (The internal environment is hermetically sealed, so no dust or fluff can enter.)

No unwanted thermal load from waste heat dumped back into the surrounding environment (e.g. waste hot air from electronics).

For components requiring liquid cooling, this can conveniently be delivered by integrating the liquid cooling ports for the component into the HTF loop.

Some components may also be cooled by direct conductive thermal contact with a bank, for instance an electronic assembly may be directly embedded within the PCM composite of a bank.

In an alternative embodiment, a set of radiator fins in the airflow may be attached to heat pipes, which extend into the bank of PCM (with an internal fin-tube like embodiment). A part of the heat pipes may be flattened, embedded in copper or aluminium (optionally equipped with flat heat-pipe heat spreader) to form a heat sink. This heat sink part may be attached to components (like electronics) able to be conductively cooled.

70. In a further embodiment, electronics or other components not required for the operation of the Thermal Store, but required for other purposes, may also be cooled by the mechanisms in 69 above. Examples include, but are not limited to:

Computers, e.g. servers or media servers.

Power electronics, e.g. inverters.

Electric motors

According to a third aspect of the present invention there is provided a method of heating and/or cooling an environment, said method comprising:

providing a heat source; and providing a series of banks containing heat storage material;

wherein the heat storage material in the series of banks is capable of storing and/or releasing energy at different temperatures.

According to a fourth aspect of the present invention there is provided a method of heating and/or cooling an environment, said method comprising:

providing a thermal energy store capable of accepting and/or storing and/or releasing thermal energy at a range of one or more temperatures to/from at least one thermal energy source and/or sink, said thermal energy store comprising:

providing a configuration of one or more thermal energy storage banks, each of said thermal energy storage banks having a usual operating temperature range;

providing at least one or more of the thermal energy storage banks capable of containing an appropriate amount and type of thermal energy storage material comprising a single material or a mixture of materials;

wherein said thermal energy storage material in at least one bank contains at least some of one or more types of thermal energy storage material that undergoes at least one energy absorbing and/or releasing phase transition at one or more temperatures or one or more sub-ranges of temperatures within the usual operating temperature range of each bank; and wherein each phase transition is associated with a change in the physical and/or chemical properties of said thermal energy storage material.

BRIEF DESCRIPTION OF THE FIGURES

Embodiments of the present invention will now be described, by way of example only, with reference to the accompanying drawing in which:

FIG. 10 shows an embodiment having an external heat pump;

FIG. 11 shows an embodiment having heat pumps interposed between each bank;

FIG. 17a shows an embodiment having an incoming air duct;

FIG. 17b shows an embodiment which is an alternative embodiment;

FIG. 17c shows an embodiment having in which the heat pumps are re-positioned;

FIG. 25a is a representation of inset 2590 of FIG. 25;

FIG. 35a shows an embodiment having metal plates;

FIG. 35b shows a variation in which there are no metal plates or blocks;

FIG. 35c shows a variation having a secondary tube;

FIG. 35d shows a variation having a plate heat exchanger; and

DETAILED DESCRIPTION

Figure 1:
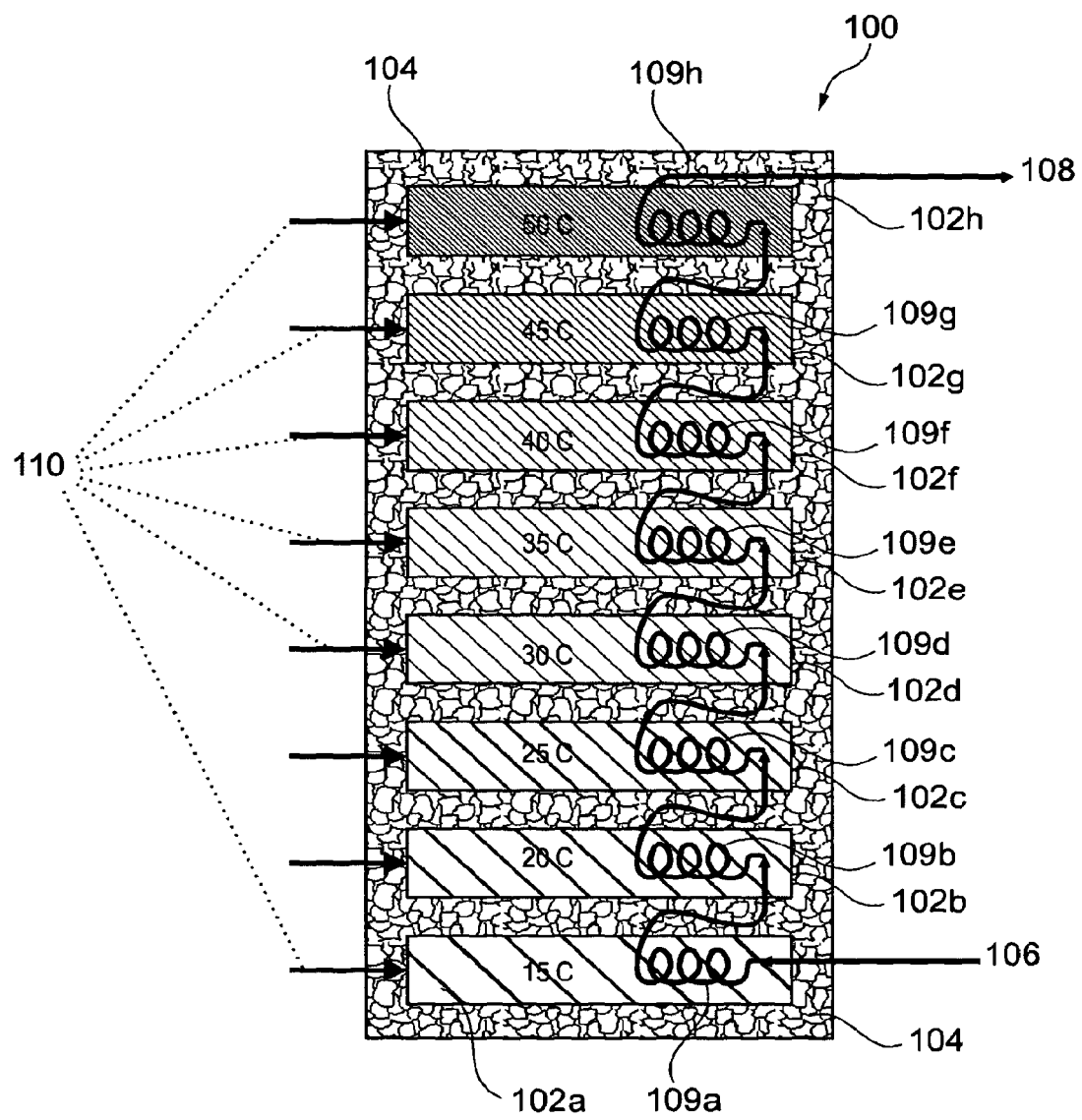
FIG. 1 is a schematic representation of an energy storage system according to a first embodiment of the present invention.

FIG. 1 is a representation of an energy storage system according to the present invention generally designated 100. The heating/cooling system comprises a series and/or a collection of banks 102a, 102b, 102c, 102d, 102e, 102f, 102g and 102h which are used to collect and store thermal energy from, for example, a solar thermal panel (not shown) and, for example, later deliver thermal energy to heat up cool water. Although FIG. 1 shows eight banks, the invention is intended to cover any suitable number of banks. Each of the banks 102a, 102b, 102c, 102d, 102e, 102f, 102g, 102h contains a different phase change material which therefore has a different melting point to store heat. As shown in FIG. 1, there is insulation 104 around the banks 102a, 102b, 102c, 102d, 102e, 102f, 102g, 102h. Bank 102a is at temperature of about 15° C. by virtue of containing a suitable phase change material with a phase transition temperature of 15° C. Similarly, bank 102b is at temperature of about 20° C., bank 102c is at temperature of about 25° C., bank 102d is at temperature of about 30° C., bank 102e is at temperature of about 35° C., bank 102f is at temperature of about 40° C., bank 102g is at temperature of about 45° C., bank 102h is at temperature of about 50° C. Although FIG. 1 shows specific temperatures, the present invention is intended to cover any selection of temperatures. As shown in FIG. 1 each of the banks in the energy storage system 100 contain heat exchangers 109a, 109b, 109c, 109d, 109e, 109f, 109g, 109h. Cold water is inserted from an inlet 106 into heat exchanger 109a and passes through heat exchangers 109b, 109c, 109d, 109e, 109f, 109g and 109h. Heated water may exit outlet 108 at about 45° C. Heat from, for example, a solar thermal panel (not shown) and/or from the environment or other heat sources may be fed in from any of feed points 110 using heat exchange means (not shown).

In FIG. 1, the heat storage medium in each of banks 102a, 102b, 102c, 102d, 102e, 102f, 102g, 102h could be water (or some other heat storage medium), but preferably the heat storage medium is a suitable phase change material (PCM) A PCM is used for several reasons:

The energy density of the PCM heat store (kWh stored per litre) will be much higher than for water;

Large amounts of energy can be stored (melting) or extracted (freezing the PCM) within very narrow temperature bounds around the melting point—thus each bank can genuinely represent a specific temperature in a heating ladder;

There is no reason to stick to cylindrical shapes typical for water tanks: the store can be a cuboid or any shape convenient to the application which means further density advantages.

As long as over the whole storage cycle the different banks of the multi-bank PCM heat store are kept in equilibrium (i.e. as much heat is added to any given bank as is extracted from the same bank via water heating and incidental losses) it can at any given moment accept heat from any environmental heat source at any temperature from over 15° C. to over 50° C. (for the example in FIG. 1) and route it to the appropriate bank. For example when a solar panel is just warming up in the morning and it reaches 20° C., it can already start to load heat into the 15° C. bank of PCM material. At midday in bright sunlight when the solar panel's stagnation temperature could be over 100° C. the control system of the thermal store can choose an appropriate heat transfer fluid flow rate and bank into which to load heat, for instance:

A low flow rate to take heat from the solar panel at 60° C. to load into the 50° C. bank; or A higher flow rate to take heat at 40° C. to load into the 35° C. bank.

It should be noted also that heat transfer fluid that started at the solar panel at say 60° C. is, after it exits the heat exchanger in the 50° C. bank, still at or above 50° C. This can be routed now to load heat to the 45° C. bank, and so on down to the coolest bank. Thus heat transfer fluid can be made to return to the solar panel at around 15° C. in this example to be warmed again. So almost all the useful heat collected by the solar panel can be extracted and stored. Also the solar thermal panel itself will perform more efficiently, with lower thermal losses, by virtue of the low temperature of heat transfer fluid entering it.

Figure 2:
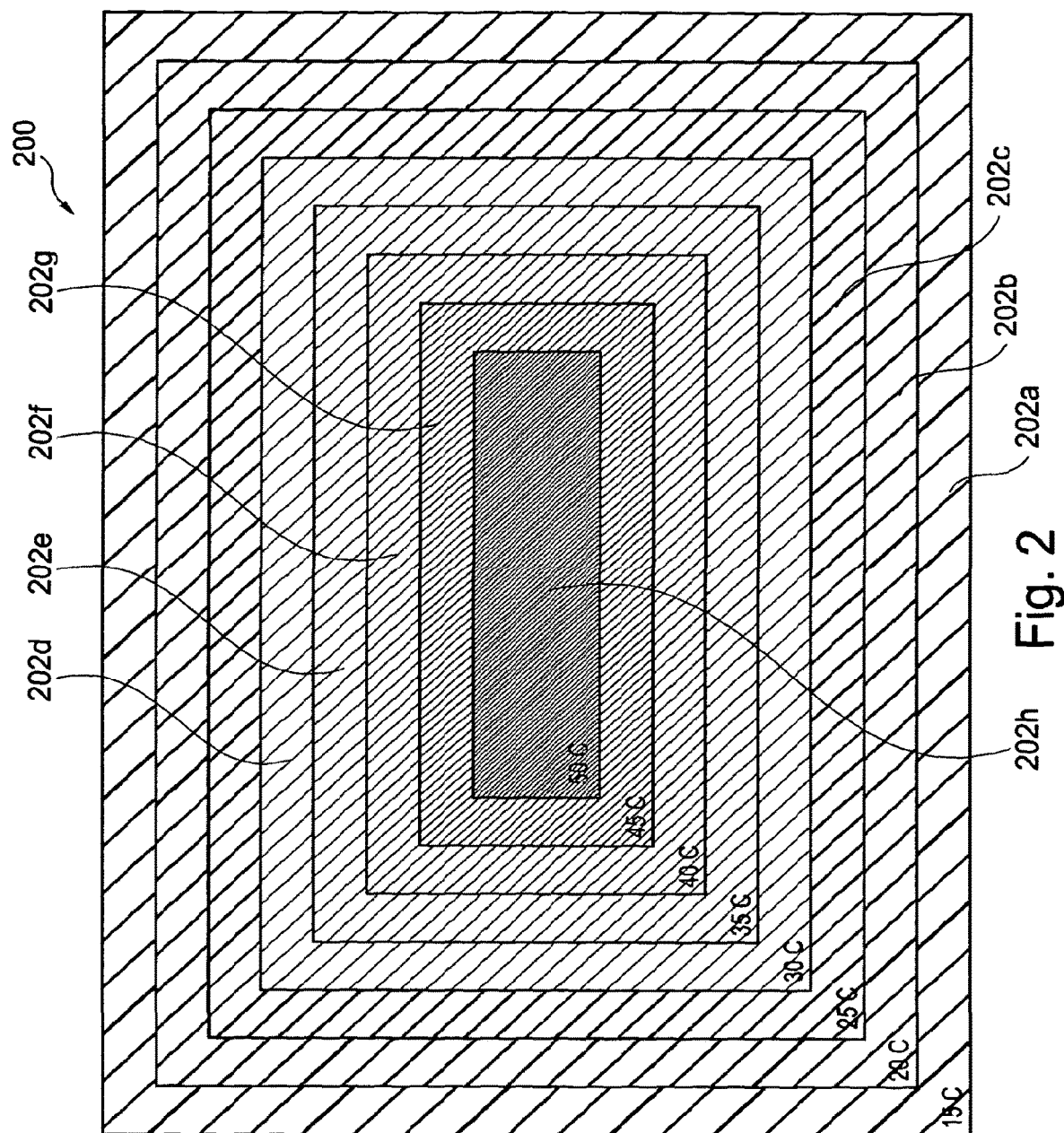
FIG. 2 is schematic representation of an energy storage system according to a further embodiment of the present invention comprising a nested multi-bank phase change material heat store.

A further preferred embodiment is to nest the banks of PCM inside each other like Russian dolls. Such an energy storage system 200 is shown in FIG. 2 which has nested banks 202a, 202b, 202c, 202d, 202e, 202f, 202g, 202h. Bank 202a is at temperature of about 15° C., bank 202b is at temperature of about 20° C., bank 202c is at temperature of about 25° C., bank 202d is at temperature of about 30° C., bank 202e is at temperature of about 35° C., bank 202f is at temperature of about 40° C., bank 202g is at temperature of about 45° C., bank 202h is at temperature of about 50° C. (For clarity purposes insulation has been omitted from FIG. 2).

The innermost bank 202h would be the hottest, with the outermost bank 202a the coolest. Of course there would still be maintained some insulation between each layer. In this case the loss of heat from each bank would be proportional to the much smaller ΔT between each bank and its outer neighbour.

| Bank (° C.) | ΔT (° C.) | Derived by (° C.) |
|---|---|---|
| 55 | 5 | 55-50 |
| 50 | 5 | 50-45 |
| 45 | 5 | 45-40 |
| 40 | 5 | 40-35 |

-continued

| Bank (° C.) | ΔT (° C.) | Derived by (° C.) |
|---|---|---|
| 35 | 5 | 35-30 |
| 30 | 5 | 30-25 |
| 25 | 5 | 25-20 |
| 20 | 5 | 20-15 |
| 15 | −5 | 15-20 |

By contrast, the embodiment of FIG. 1 separately insulates each bank from the local environment. If the insulation is of identical type and thickness around each bank then the higher temperature banks will lose more heat to their surroundings than the lower temperature ones, because heat loss is proportional to the ΔT between the bank and its surroundings.

For a multi-bank PCM store inside a house, with surrounding temperature 20° C.:

| Bank (° C.) | ΔT (° C.) | Derived by (° C.) |
|---|---|---|
| 55 | 35 | 55-20 |
| 50 | 30 | 50-20 |
| 45 | 25 | 45-20 |
| 40 | 20 | 40-20 |
| 35 | 15 | 35-20 |
| 30 | 10 | 30-20 |
| 25 | 5 | 25-20 |
| 20 | 0 | 20-20 |
| 15 | −5 | 15-20 |

The embodiment of FIG. 1, or a regular hot water tank, over time loses energy to the local environment. The nested multi-bank PCM heat store of FIG. 2 can, by suitable choice of outermost bank temperature to be equal to or lower than the local environment temperature, be made virtually neutral. For example in FIG. 2, if the local environment is at 20° C., the thermal store's outermost 15° C. layer will slowly absorb heat from the local environment.

This means energy storage system 200 will store the heat put into it much better than energy storage system 100 (although over time the grade of heat it holds will reduce as heat flows from the high temperature core out to lower temperature banks around it). It will also be cool to the touch making it possible to integrate it into places one would not want to put a hot water tank.

It should be noted that everything described so far can also apply in inverse for cold applications, with a coldest layer as the innermost bank, well below environmental temperature, and increasingly warm layers surrounding it, with the outermost layer the warmest at close to environmental temperature.

Figure 3:
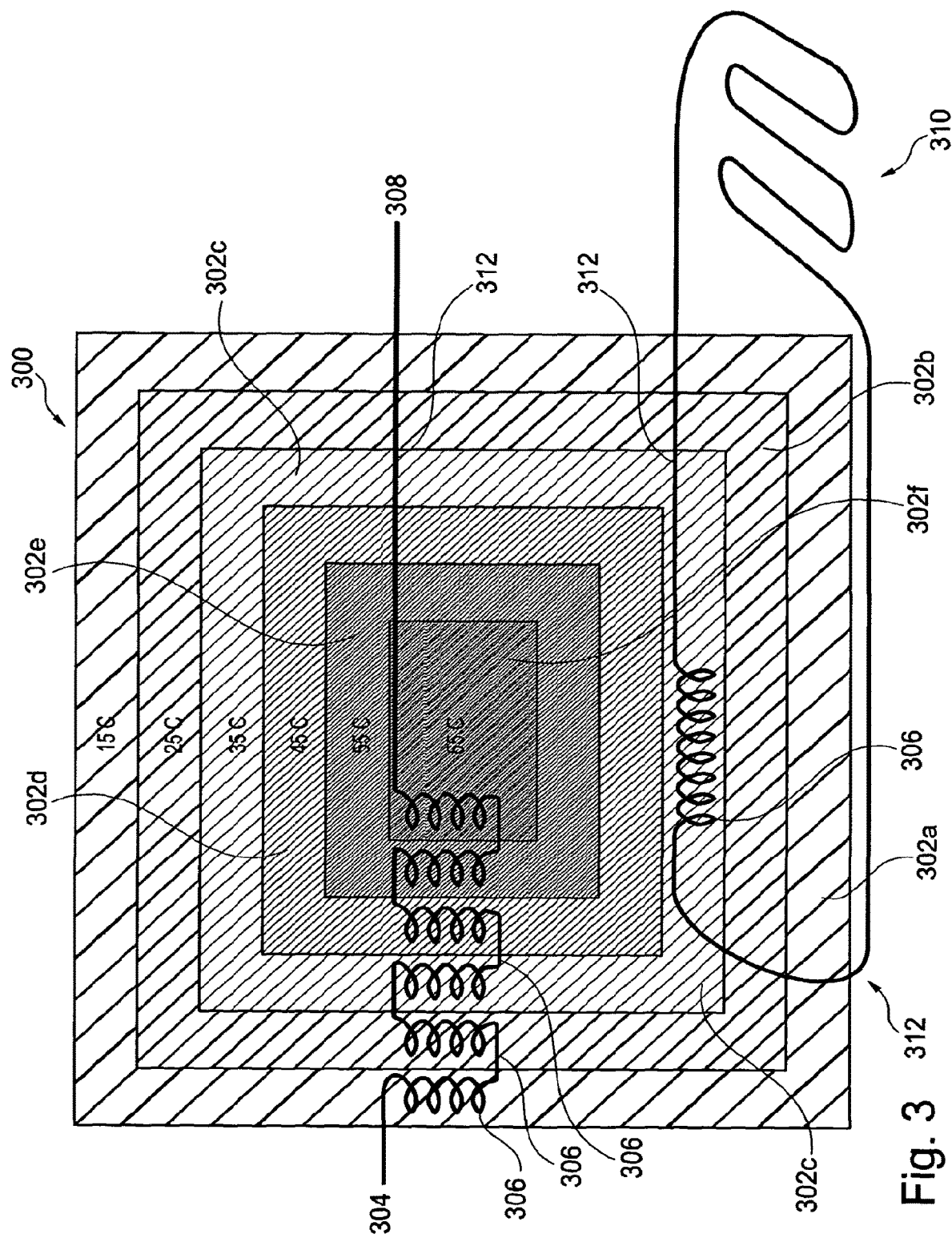
FIG. 3 is a schematic representation of an energy storage system according to a further embodiment of the present invention of a nested multi-bank phase change material heat store used for underfloor heating as well as water heating.

We now refer to FIG. 3 which relates to an energy storage system 300. There are banks 302a, 302b, 302c, 302d, 302e, 302f. Bank 302c is preferably the largest bank as this is connected to an underfloor heating system 310 which has insulation 312 around its pipes where they pass through other banks 302a and 302b in the energy storage system 300. The energy storages system 300 contains an inlet 304 for mains cold water and heat exchangers 306 in each of the banks 302a, 302b, 302c, 302d, 302e, 302f. There is also an outlet 308 for hot water which also benefits from insulation 312 when it passes through banks 302e, 302d, 302c, 302b and 302a.

Figure 4:
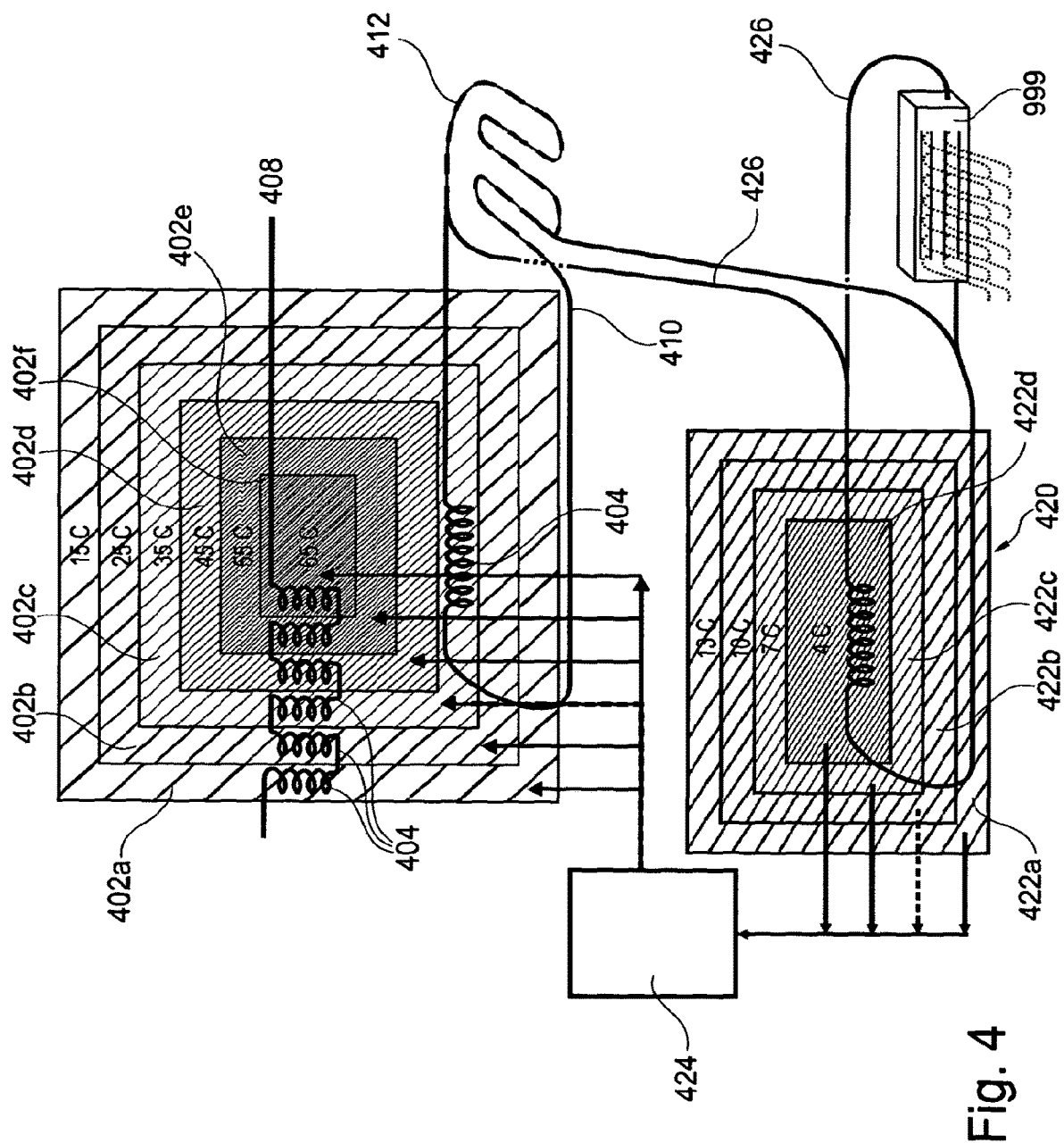
FIG. 4 relates to a single heat pump directly connected between two PCM stores, one intended to store and provide warmth for heating and hot water and one intended to store and provide coolth for cooling according to a further embodiment of the present invention.

We now refer to FIG. 4 which is a further energy storage system 400 according to the present invention. There is a multi-bank phase change material (MBPCM) heat store generally designated 410. There are a series of banks 402a, 402b, 402c, 402d, 402e, 402f connected with heat exchangers 404. There is also a cold water inlet 406 and a hot water outlet 408. The energy storage system 400 also has a heating loop 410 and a heating/cooling loop 412. There is also a multi-bank phase change material (MBPCM) cold store generally designated 420 which contains banks 422a, 422b, 422c, 422d. A heat pump 424 may be used to extract heat from selected banks (any of 422a, 422b, 422c, 422d) of cold store 420 and load it at higher temperatures into selected banks (any of 402a, 402b, 402c, 402d, 402e, 402f) of heat store 410 (for clarity purposes the heat exchangers to and from heat pump 424 have been omitted). Exiting from the cold store 420 there is a cooling loop 426 which is connected to a fan coil 428 which may blow cold air and/or may be connected at times when no heating is required to underfloor loop 412 to deliver comfort cooling.

To generate cool for air-conditioning, heat can be removed from a bank of the PCM cool store using a heat pump and concentrated to a suitable higher temperature. This higher temperature heat could be released to the environment; however an alternative is to add it to a bank of a PCM heat store that needs additional heat.

The highlighted path in FIG. 4 shows heat being removed from 10° C. bank 422b of cool store 420 via heat pump 424 and entering heat store 35° C. bank 402c. The benefit is high since this single use of a heat pump is both adding heat to the heat store 410 for later use (e.g. for hot water, space heating) and simultaneously (and with the same energy to drive the heat pump) removing heat from the cool store 420, thereby adding cool to it for later use (e.g. for air conditioning).

Figure 5:
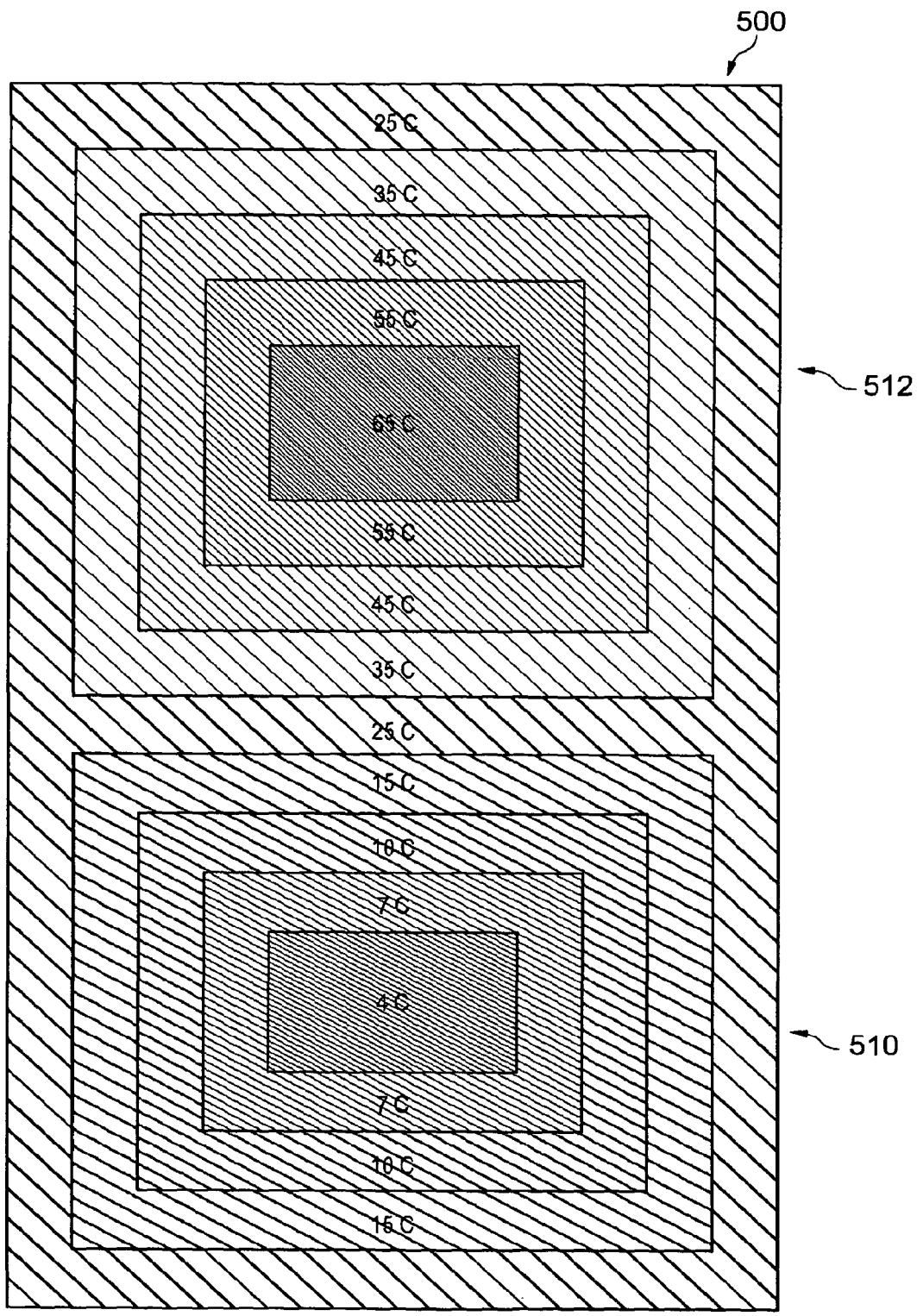
FIG. 5 is a reconfigured store which has two centres (one cold, one hot) and an outermost bank at or close to room temperature according to a further embodiment of the present invention.

It is not clear that there really need to be two distinct stores (one for heat and one for cold) as the ranges of useful temperature overlap. FIG. 5 therefore shows a further energy storage system 500 with a cold store 510 and heat store 512 joined together, having two centres, one hot and one cold and an outermost bank at or close to room temperature (assuming it will be housed inside a building's thermal envelope).

Figure 6:
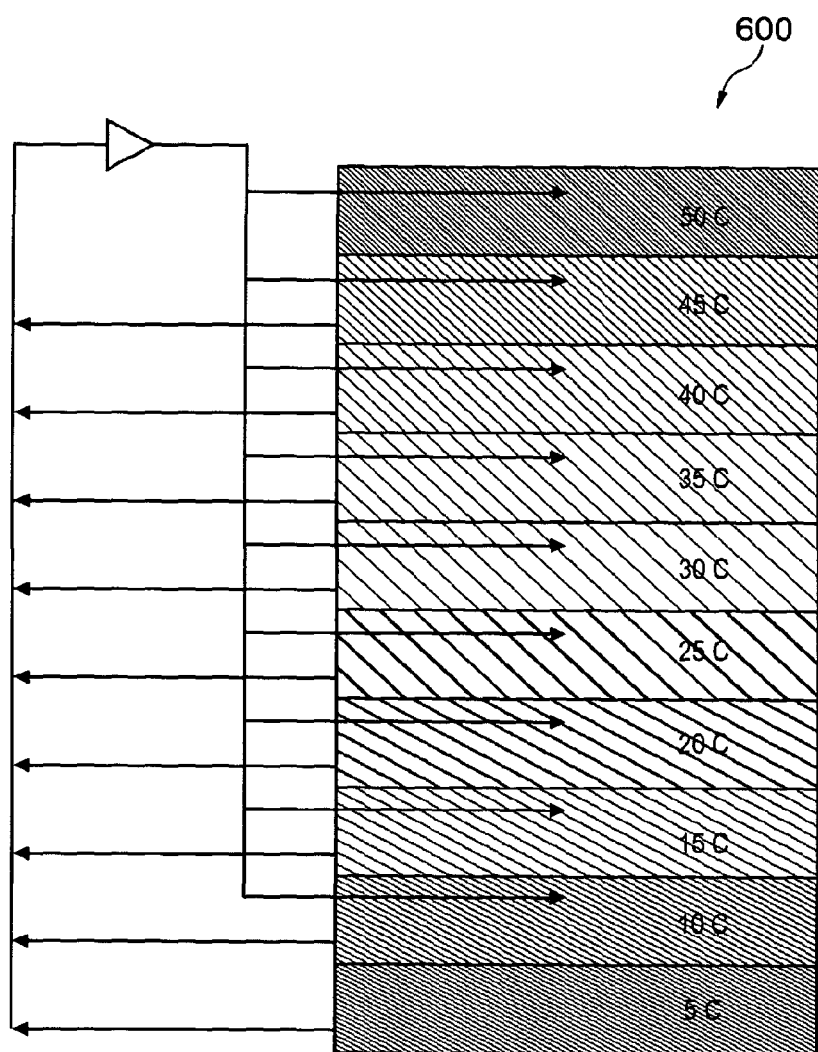
FIG. 6 relates to a single time-shared heat pump with many-to-many (i.e. multiple) connectivity according to a further embodiment of the present invention.

In FIG. 6, a similar shared heat and cold store 600 is shown which has a single time-shared heat pump with many-to-many connectivity, connected on its input side to all except the hottest bank (the connection is multiplexed, i.e. a choice can be made of which cold source to draw upon) and on its output side connected by a multiplexed connection to all except the coldest bank.

Most practical implementations of Multi-Bank PCM Heat/Cool Stores will need to re-balance the amount of heat stored between banks. Sometimes this will be possible purely by controlling the flow of heat from environmental sources to each bank; however it is likely that this will not always be possible.

Furthermore, often some banks of PCM are required, for example for air conditioning, at below ambient temperature or below room temperature. A conveniently cold ambient source may not be available.

A multi-bank PCM heat store could be configured with one or more heat pumps. These could be connected by heat exchangers, valves, etc in such a way that the heat pump(s) can pump heat from any bank to any warmer bank.

Many practical implementations of heating and cooling systems using multi-bank phase change heat stores will likely include one or more heat pumps to provide a guaranteed way to lift heat from cooler to warmer.

Figure 7:
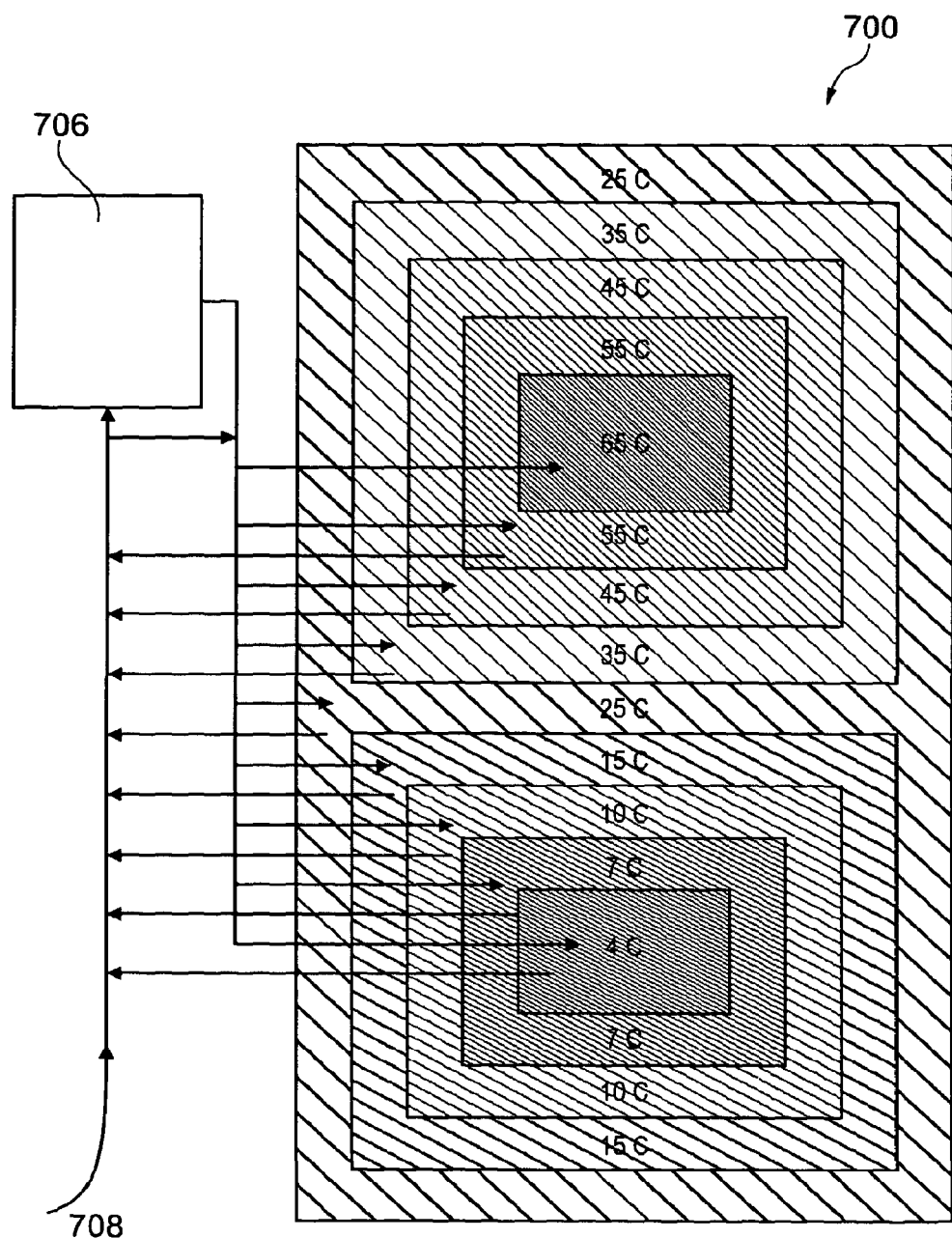
FIG. 7 relates to a heat pump performing dual duty and two heat transfer buses according to a further embodiment of the present invention.

A heat pump can be time multiplexed to perform dual duty both as a bank to bank heat pump and also as an external heat pump as in practice, there will be occasions when it makes sense to transfer heat directly from colder to hotter banks of a thermal store, and others when it makes sense to remove heat to or extract heat from the surrounding environment. With suitable configuration of pipes and valves it is possible to allow for all these possibilities. In that case control algorithms can add this direct transfer to their repertoire and optimise for this as well, thus dynamically choosing it when appropriate. This is shown in FIG. 7 where energy storage system 700 has a heat pump 706 performing this dual duty. There is an environmental heat source 708. (For clarity purposes the insulation and some of the valves have been omitted).

Figure 8:
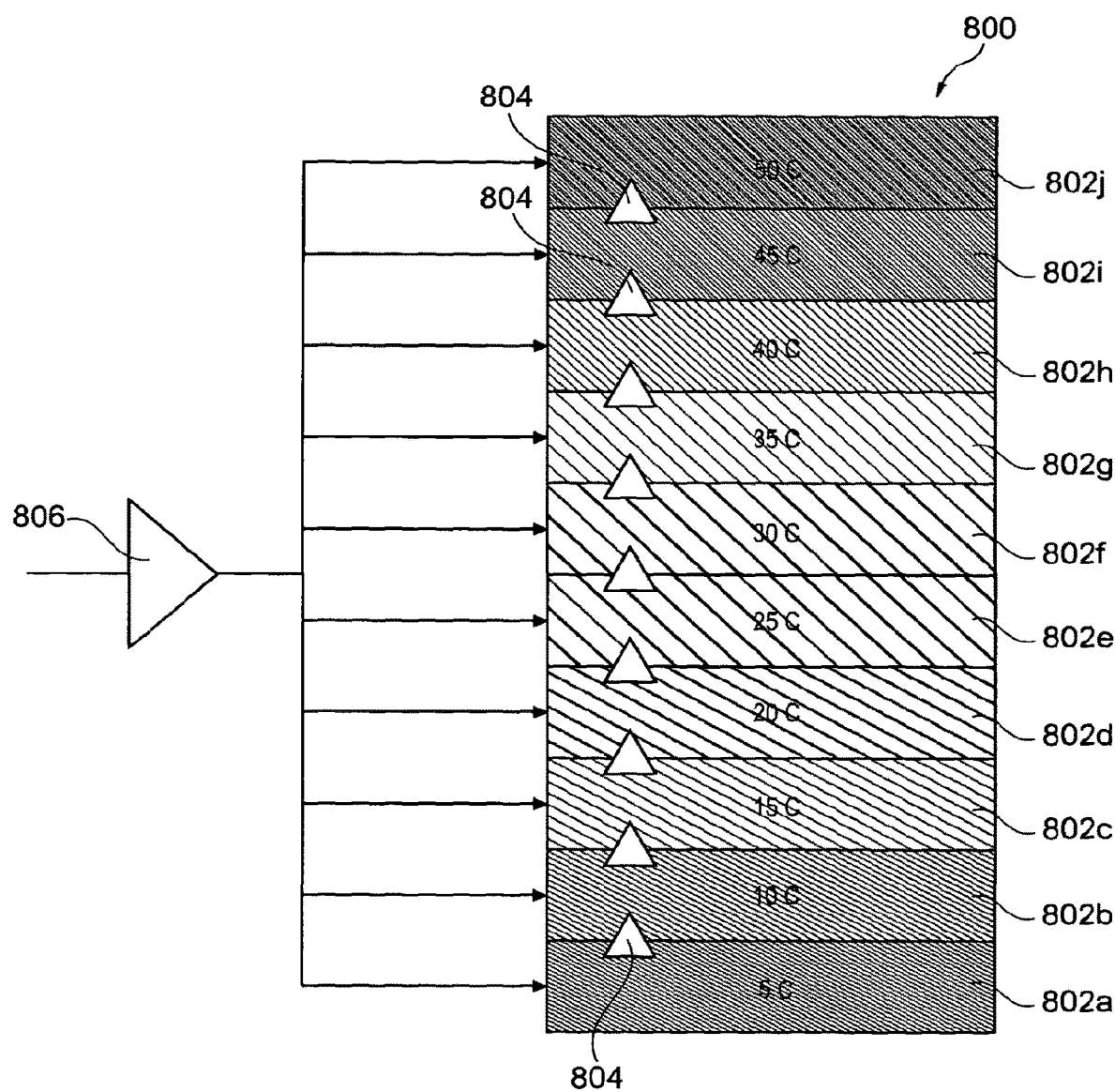
FIG. 8 relates to pulling heat from an environmental source using a heat pump and lower capacity heat pumps interposed between each bank according to a further embodiment of the present invention.

Instead of time-sharing or multiplexing a heat pump, an alternative is to interpose a lower capacity heat pump between each bank. This is illustrated in the energy storage system 800 shown in FIG. 8 which has a series of banks 802*a*, 802*b*, 802*c*, 802*d*, 802*e*, 802*f*, 802*g*, 802*h*, 802*i*, 802*j* between which are interposed heat pumps 804. (For clarity pipework, heat exchangers connecting heat pumps 804 to the banks and insulation are omitted). There is also an external heat pump 806 allowing heat to be drawn from an environmental source.

Figure 9:
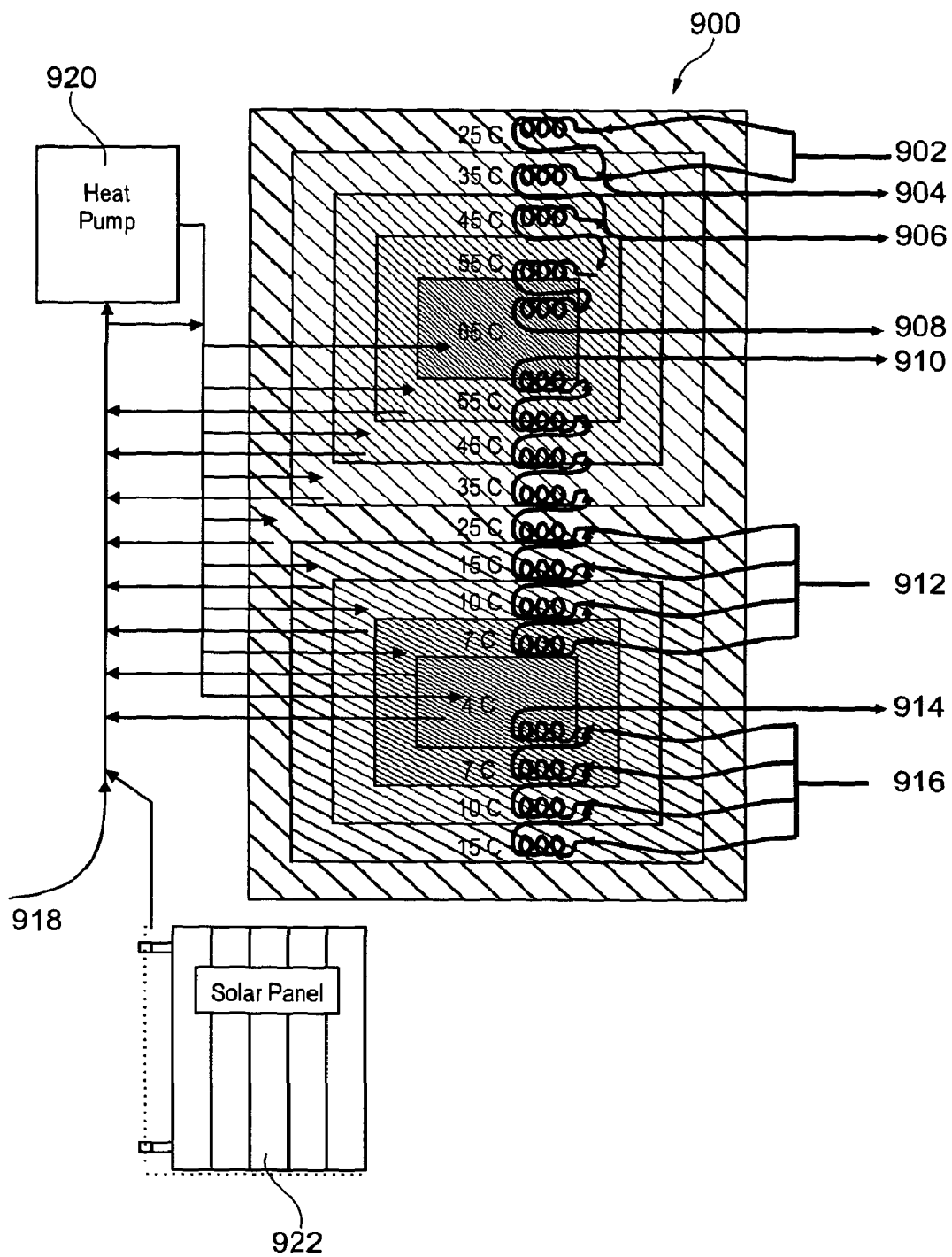
FIG. 9 relates to multi bank PCM heat & cool store for domestic heating, hot water and air conditioning from environmental heat sources using a shared heat pump according to a further embodiment of the present invention.

An application of a heat & cool store for domestic heating, hot water and air conditioning from environmental heat sources using a shared heat pump is shown in FIG. 9. An energy storage system 900 comprises a series of banks where heated water or other heat transfer fluids may be used for a variety of purposes. Inlet 902 is used as a heating return; outlet 904 is used for underfloor heating; outlet 906 is used for fan-coil radiator flow; outlet 908 is used for radiator flow; inlet 912 is used for cold mains; outlet 910 is used for hot water; inlet 916 is used for air conditioning return and outlet 914 is used for air conditioning flow. Inlet 918 is an environmental heat source. Heat pump 920 may be used as a heat pump or by-passed if the environmental or solar heated water from a solar panel 922 is at a sufficiently high temperature. (The insulation has been omitted for clarity and multiplexing valves omitted for clarity. On the left-hand side of FIG. 9 flows are only shown and returns are omitted for clarity. Furthermore, pathways for cooling via night-time radiation from solar panel are omitted for clarity).

Consider the case where environmental heat is loaded into an MBCPM Heat/Cool Store by using an External Heat Pump to raise the temperature at which heat is transferred from the environmental source to the Heat Store to above the temperature of the coldest bank of the Heat Store Instead of using a heat pump to directly move heat from a lower temperature environmental source, a thermal store could instead be configured with one or more additional (colder) banks of PCM that have temperatures lower than the environmental source. The heat from the environmental source can flow into these colder banks without initial heat pumping.

Heat pumps interposed between each bank of the thermal store can be used to pump the heat so acquired to hotter banks; thereby making the heat useful and keeping the colder banks at a low enough temperature that they can continue to capture environmental heat thus eliminating the need for any external heat pumps.

We can consider the example of an MBCPM system used to drive a radiator-based central heating system, where the primary heat source is a ground loop recovering low grade heat from the earth at 5° C.

Figure 10:
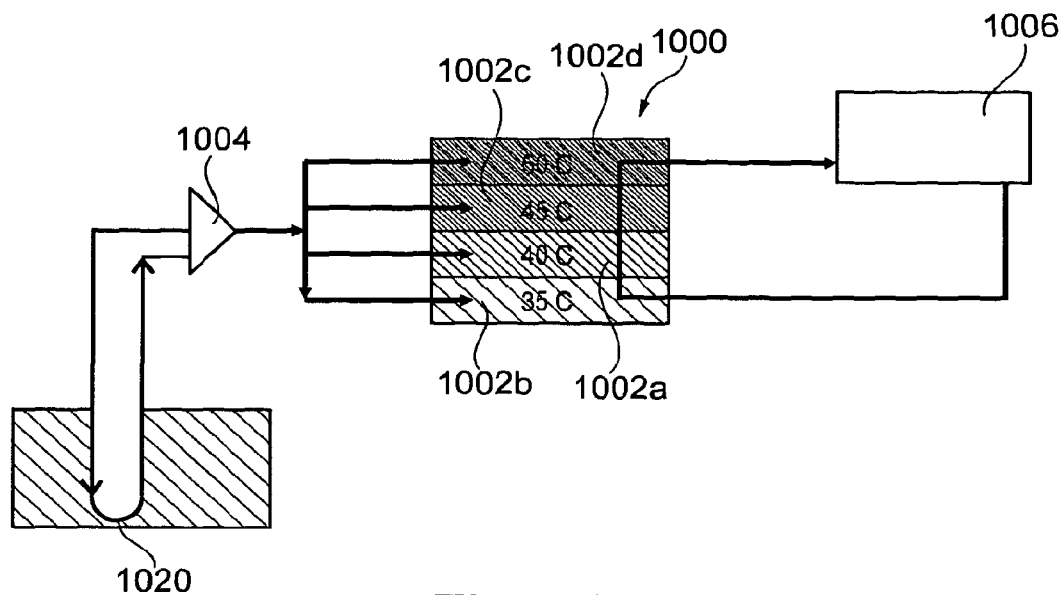
FIGS. 10 and 11 relate to a radiator-based central heating system according to a further embodiment of the present invention.
Figure 11:
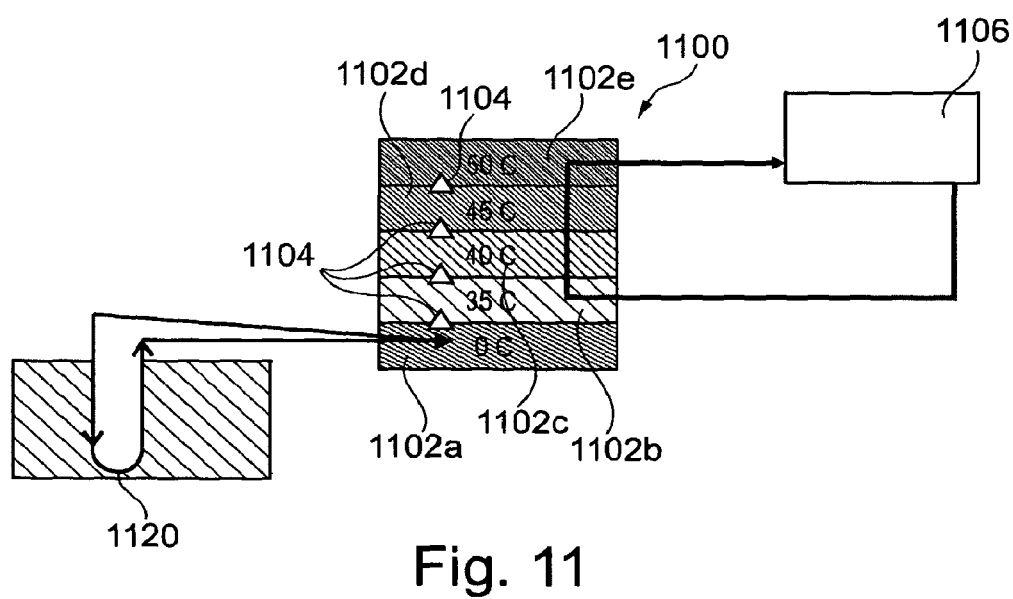

We refer to FIGS. 10 and 11 which represent energy storage systems 1000, 1100, respectively.

In one case as shown in FIG. 10, there is an external heat pump 1004 that raises the heat of the ground water 1020 to 35° C.-50° C.+ in order that it can be loaded into the PCM banks 1002*a*, 1002*b*, 1002*c*, 1002*d* at 35, 40, 45, 50° C., respectively. The heated water is fed to radiator 1006. In FIG. 11, there are PCM banks 1102*a*, 1102*b*, 1102*c*, 1102*d* which have heat pumps 1104 interposed between each bank. The heated water is fed to radiator 1106.

Bank 1102*a*, specially configured with PCM with melting point 0° C., is introduced. Heat is captured from ground water 1120 by passing this 5° C. fluid through heat exchange with the 0° C. bank 1102*a*. Later or simultaneously, this heat is pumped to the warmer banks using heat pumps 1104.

Figure 12:
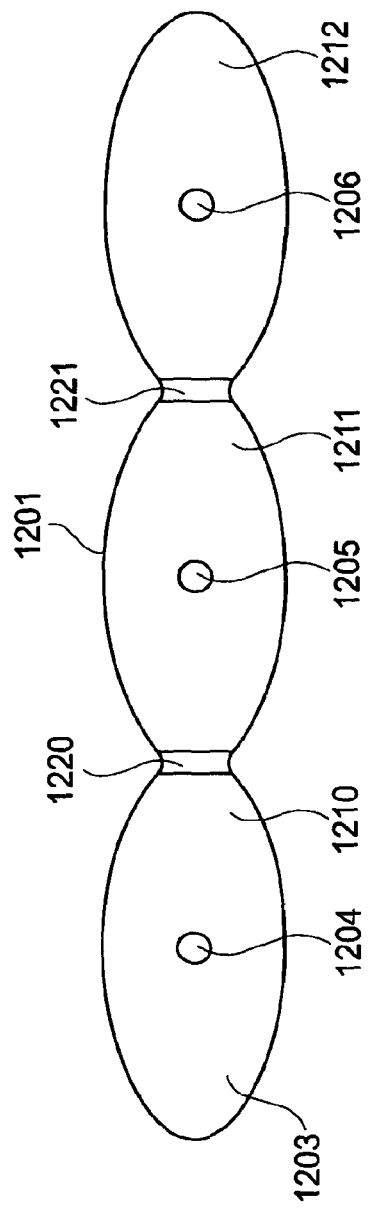
FIG. 12 is a representation of an integrated solar collector combining a solar thermal panel with a store of heat integrated into the panel according to the present invention.

FIG. 12 is a cut-through representation of an embodiment of a solar collector integrating phase change material (PCM) storage with the solar collector. In this specific embodiment (see description, section 10 for further exemplary embodiments) a thin flexible plastic outer jacket 1201 contains a PCM 1203 (which may be water or another PCM or a PCM composite). Pipes 1204, 1205, 1206 carrying glycol, brine or another heat transfer fluid (HTF) run through the solar collector, connected in series order 1204, 1205, 1206, or in parallel or in a series-parallel fashion.

The thin, flexible walls of the collector adapt to expansion or contraction on freezing/thawing of the PCM. Preferentially the collector walls may be pillowed, combined with internal ribs, in the manner of an inflatable mattress, (airbed) to maintain a broadly flat, thin section while permitting expansion/contraction.

The walls can be black or coloured (to promote absorption of incident solar irradiance) or transparent to allow solar irradiance to penetrate to the PCM. The PCM may be mixed with a black dye or a selective absorber such as TiNOx to promote absorption of light to heat. The PCM forms a large thermal reservoir at the point of collection of solar energy, and may form one bank (or if several collectors with different temperature PCMs are used, several banks) of a heat store of the present invention.

Alternatively different pockets of the same collector (for example illustrated in FIG. 12 as three pockets 1210, 1211, 1212, but not limited to three pockets) may contain different PCMs with different melting points. In which case the internal ribs separating pockets (positioned as illustrated 1220, 1221) additionally serve to separate the different PCM materials, and may preferentially be insulated, and may incorporate a thermoelectric device or other heat pumping means.

Preferentially in such an embodiment HTF flows in sequence through serially connected tubes 1204, 1205, 1206 entering tube 1204 at a colder temperature and exiting tube 1206 at a hotter temperature; also preferentially the different PCMs are arranged so that pocket 1210 contains the lowest melting point PCM and pocket 1212 contains the highest melting point PCM.

Figure 13:
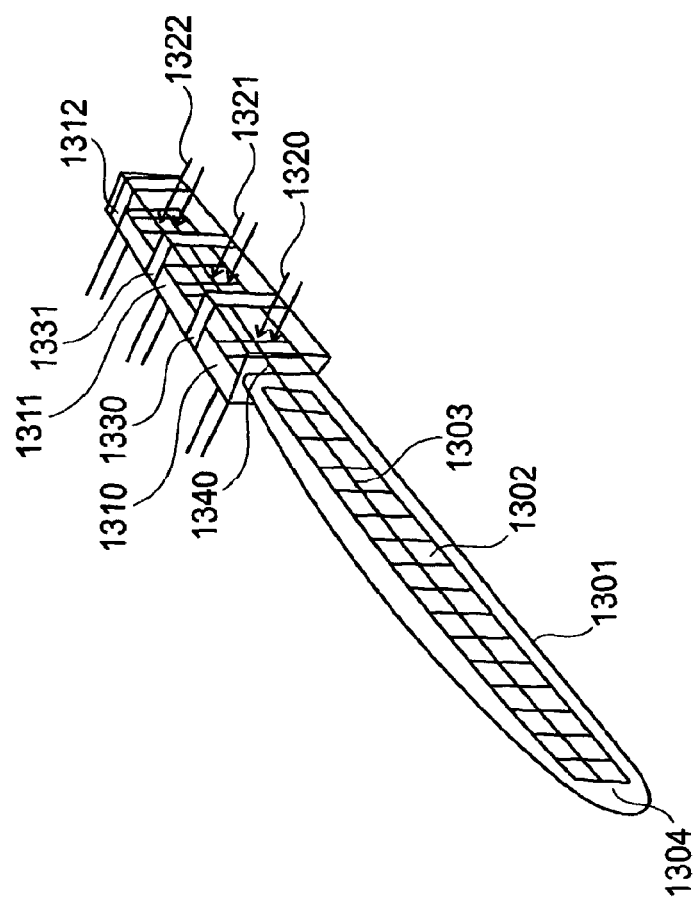
FIG. 13 is a representation of where in sequence along each heat pipe there are several banks of PCM, each with different melting point temperatures.

FIG. 12 is merely illustrative of a specific embodiment of an integrated solar collector according to the present invention. Those skilled in the art will be able to adapt other embodiments for example:
- addition of cover glass (to reduce re-radiation of captured heat);
- addition of side and rear insulation;
- improvement of insulation between pockets;
- replacement of the flexible plastic pockets with rigid metal or plastic enclosures containing PCM or PCM Composite;
- selective absorber coatings including but not limited to TiNOx replacement of flexible plastic pockets with shape-stabilised blocks of PCM composite covered in a thin film to resist passage of air and water FIG. 13 illustrates a vacuum tube solar thermal collector with integrated multi bank PCM storage according to the present invention.

Glass tube 1301 contains metal collector plate 1302 equipped with heat pipe 1303 in (partial) vacuum 1304 in accordance with prior art. In the illustrated embodiment of the present invention, heat pipe 1303 is extended into and through PCM banks 1310, 1311 and 1312, each containing a different temperature of PCM or PCM composite (for example the PCM in 1310 may melt at 32° C., in 1311 at 45° C. and in 1312 at 58° C.). The number of such PCM banks is three for illustrative purposes only and may vary.

Insulation 1330 and 1331 sits between (and not illustrated for clarity, around) the PCM banks. At the point marked 1340 and at each point where the heat pipe penetrates inter-bank insulation 1330 and 1331, it is equipped with heat diode or switchable means to ensure heat does not leak back from the PCM in the bank via the heat pipe to the solar collector.

Also not illustrated, heat-pumping means, e.g. thermoelectric devices, may be integrated in cavities extending through the insulation 1330 such that it can extract heat from PCM bank 1310 and deliver it to PCM bank 1311 (and similarly via cavities in 1331 from 1311 to 1312).

Internally PCM banks 1310, 1311, 1312 are equipped with fins or other means to promote the transfer of heat from the heat pipe into the PCM. Such fins or other means also promote transfer of heat to tubes 1320, 1321, 1322 containing heat transfer fluid, which respectively penetrate PCM banks 1310, 1311, 1312. Such tubes may be connected across a number of the vacuum tube solar thermal collector with integrated multi bank PCM storage embodiments in FIG. 13 in parallel to provide three (or a number) of HTF circuits that can extract heat at different temperatures. Alternatively, via a parallel-series arrangement apparent to one skilled in the art, at each vacuum tube solar thermal collector with integrated multi bank PCM storage the PCM banks 1320, 1321, 1322 can be visited in sequence so as to raise the temperature of a single HTF over a larger temperature range.

Figure 14:
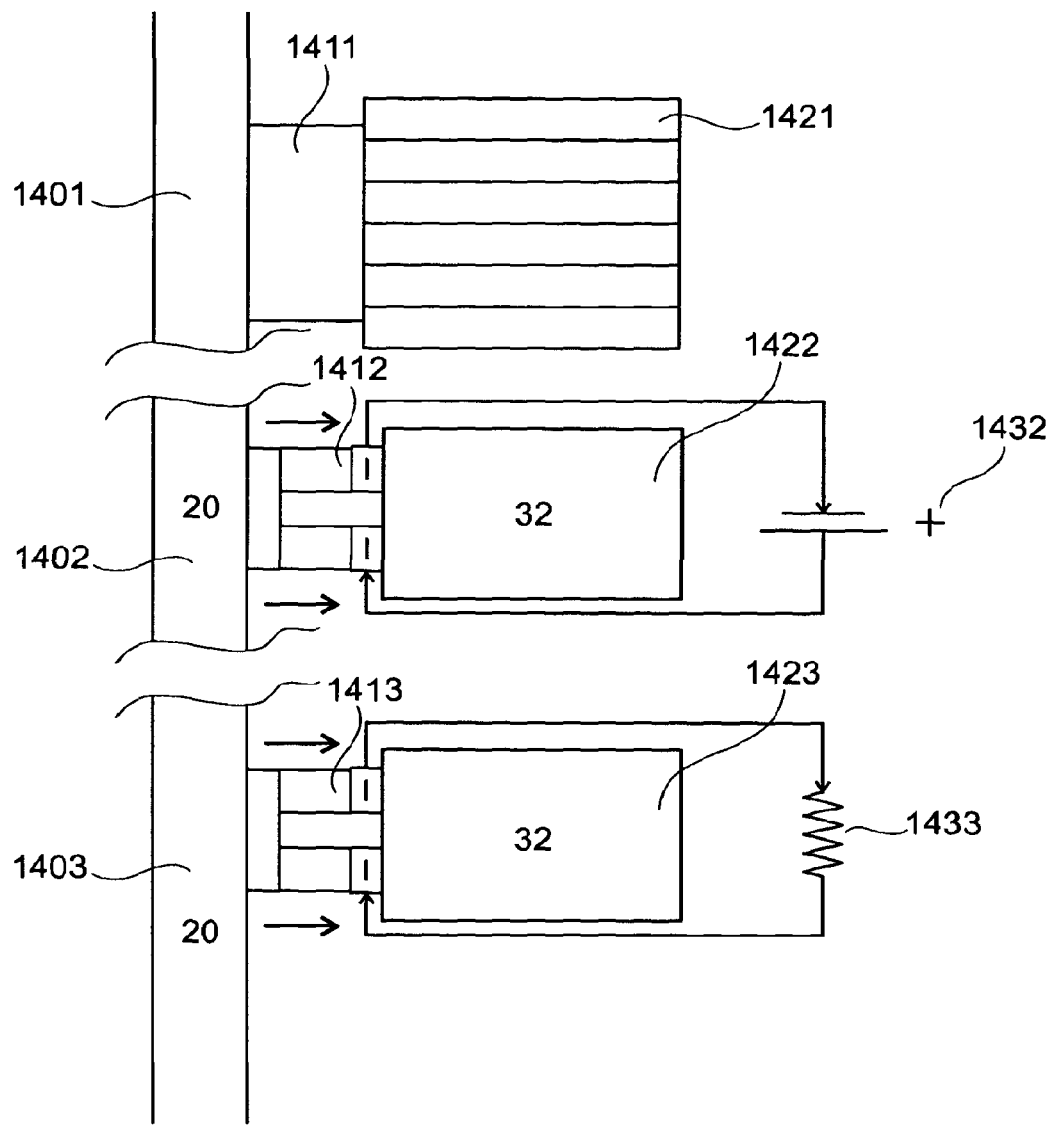
FIG. 14 is a representation of where the temperature in a heat pipe is lower than the bank temperature, a decision could be made to expend electrical energy in the TED so that heat could be pumped into the bank and the TED can also be left in a condition where essentially no heat flows.

FIG. 14 is a representation in which a heat pipe 1401 is connected to a PCM bank 1421 only by a thermoelectric device (TED) 1411 (insulation surrounds the PCM bank, a tube containing heat transfer fluid may pass through it, and it may contain fins or composite material, but these are omitted for clarity).

Specific sections of heat pipe 1402, 1403 are illustrated, attached via TEDs 1412, 1413 to PCM banks 1422, 1423 respectively. In both cases the heat pipe is illustrated at 20° C. and the PCM bank at 32° C.

A battery 1432 (or alternatively any other electrical power source) is connected in circuit (switched via switching apparatus not illustrated) with TED 1412 such that TED 1412 pumps heat from heat pipe segment 1402 to PCM bank 1422.

A resistive load 1433 (illustrative of the broader class of all electrical loads) is connected in circuit (switched via switching apparatus not illustrated) with TED 1413. Heat flows from PCM bank 1423 via TED 1413 to colder heat pipe 1403. This causes TED 1413 to make a current flow in the circuit.

Not illustrated there may be other banks of PCM at other melting points, and these may between them be equipped with TEDs.

Heat can be added to PCM banks via several mechanisms:
Solar irradiance resulting in the heat pipe temperature exceeding the PCM bank temperature
Lower solar irradiance resulting in the heat pipe temperature being lower than the PCM bank temperature, with additional electrical energy causing the TED to pump heat from the heat pipe to the PCM bank
Loading heat from HTF at a higher temperature than the PCM bank temperature via an (un-illustrated) tube passing through a heat exchanger within the bank.

Energy can be extracted from the bank via a user or automatic choice between two mechanisms:
Extracting heat from the PCM bank temperature via an (un-illustrated) tube passing through a heat exchanger within the bank carrying HTF at a lower temperature than the PCM bank.
When the heat pipe is at a lower temperature than the PCM bank (e.g. at night), allowing heat to flow back to the heat pipe via the TED to generate an electrical current.

Figure 15:
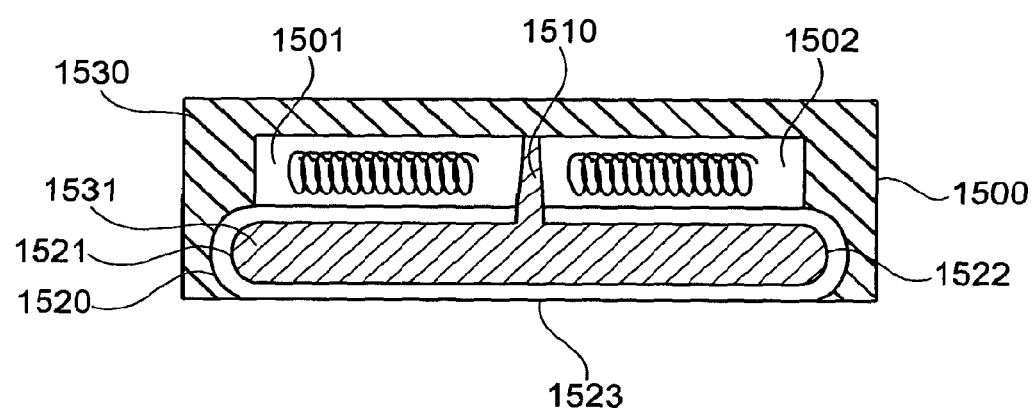
FIG. 15 is a representation of a specific embodiment of a radiator and a ceiling panel comprising two insulated banks of PCM (one melting at 18° C. and one at 24° C.), with suitable internal fins or conductivity enhancing material to allow heat to flow to/from a flat heat pipe; the flat heat pipe being arranged so that at another point it forms the bottom surface of the ceiling tile, bringing it into radiative contact with a room.

FIG. 15 is a representation of a specific embodiment of a radiator and ceiling panel 1500 comprising two insulated banks of PCM 1501 (having an illustrative melting point temperature of 18° C.), 1502 (having an illustrative melting point temperature of 24° C.), each PCM bank having internally fins, or conductivity enhancing material composited with the PCM, to allow heat to flow to/from a flat heat pipe 1520, arranged so that at another point it forms the bottom surface 1523 of the ceiling tile in radiative contact with a room. There are at points 1521 and 1522 heat pump switching means (not illustrated) to allow a controlling system to decide at any time whether to allow heat to flow between either/both of PCM banks 1501, 1502 and bottom surface 1523.

A TED 1510 is in contact with both PCM banks 1501 and 1502 such that upon application of electrical power it can pump heat from 1501 to 1502 (or at another time it can generate electrical power by allowing heat to flow from 1502 to 1501.

Figure 16:
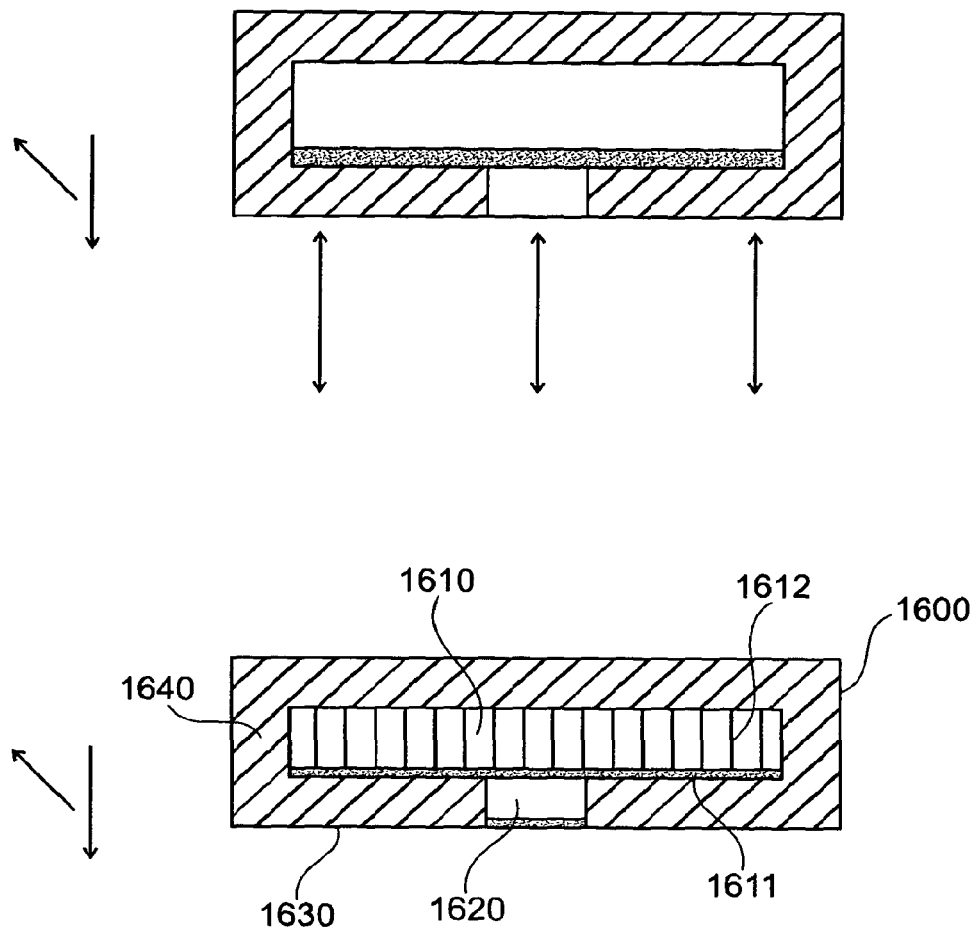
FIG. 16 is a representation of a specific embodiment having a single insulated bank of PCM (e.g. 24° C.), plus a thermoelectric device ("TED") connecting that bank to a heat spreader (perhaps a planar heat pipe)

FIG. 16 is a representation of a specific embodiment of a ceiling tile 1600 (or similar radiator) having a single bank of PCM 1610 (at a temperature e.g. 24° C.) plus a thermoelectric device ("TED") 1620 connecting PCM bank 1610 to a heat spreader 1630 in radiative (and to an extent convective) contact with a room. Insulation 1640 surrounds PCM bank 1610. PCM bank 1610 is furnished with an internal heat spreader plate 1611 and fins 1612 standing perpendicular to 1611 (or alternatively is equipped with PCM composite containing a thermal conductivity enhancer). Heat spreader plates 1611 and 1630 in preferred embodiments consist of metal plates or flat heat pipes.

Figure 17A:
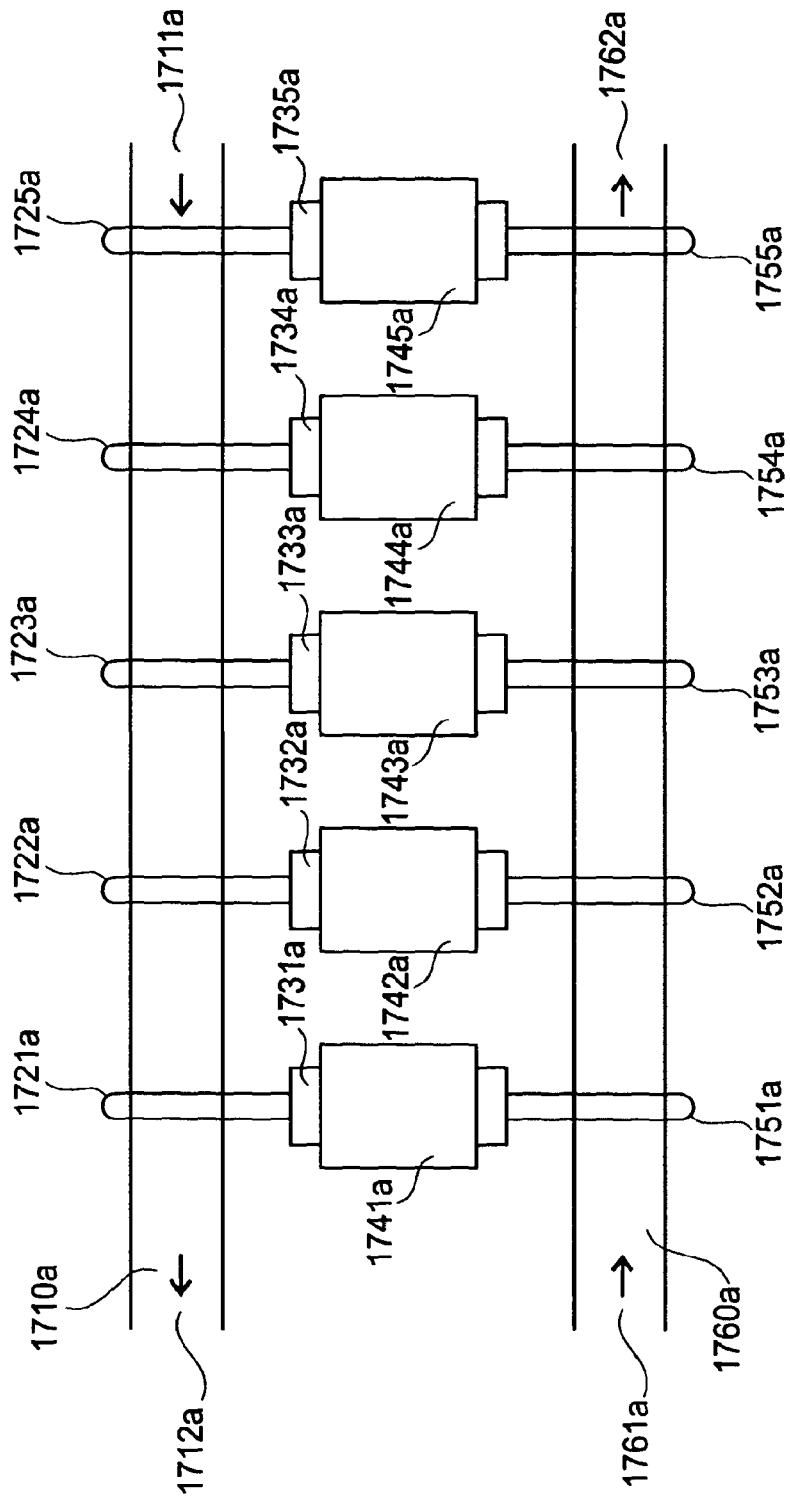
FIGS. 17a-c are representations of a variety of embodiments wherein heat recovery ventilation systems are equipped with a variety of configurations of PCM banks and heat pumps.

FIGS. 17a,b and c are representations of a variety of embodiments wherein heat recovery ventilation systems are equipped with a variety of configurations of PCM banks and heat pumps.

FIG. 17a shows an incoming air duct 1710a, with cold outdoor air entering at 1711a and exiting to a heated environment at 1712a; an outgoing air duct 1760a, with warm stale indoor air entering at 1761a and exiting to the outdoor environment at 1762a.

PCM banks 1741a, 1742a, 1743a, 1744a, 1745a with melting temperatures 15° C., 11° C., 8° C., 5° C., 3° C. respectively (all temperatures being exemplary rather than prescriptive, and the number five of PCM banks also being exemplary only), are thermally connected with 1760 by heat exchangers 1751a, 1752a, 1753a, 1754a, 1755a (which may preferentially be formed of metal fins and/or heat pipes).

Outgoing air starting at 1761*a* at ~21° C. may thus be cooled to exit at ~6° C. while storing heat into banks 1741*a*, 1742*a*, 1743*a*, 1744*a*, 1745*a*.

Air in duct 1710*a* enters from outdoors cold at 1711*a*, encountering in sequence heat exchangers 1725*a*, 1724*a*, 1723*a*, 1722*a*, 1721*a*. When a controlling system decides heat needs to be added to the incoming air, heat pumps (which may preferentially be thermoelectric devices) 1735*a*, 1734*a*, 1733*a*, 1732*a*, 1731*a* (which are interposed between heat exchangers 1725*a*, 1724*a*, 1723*a*, 1722*a*, 1721*a* and PCM banks 1745*a*, 1744*a*, 1743*a*, 1742*a*, 1741*a*) are activated to draw heat from the PCM banks and deliver it to the air in the incoming duct 1710*a*. The use of the heat pumps delivers the air at a higher temperature than a passive heat recovery ventilation system would, and the temperature can be precisely controlled. Advantageously heating of incoming air can be controlled to be delivered at selected times only.

Figure 17B:
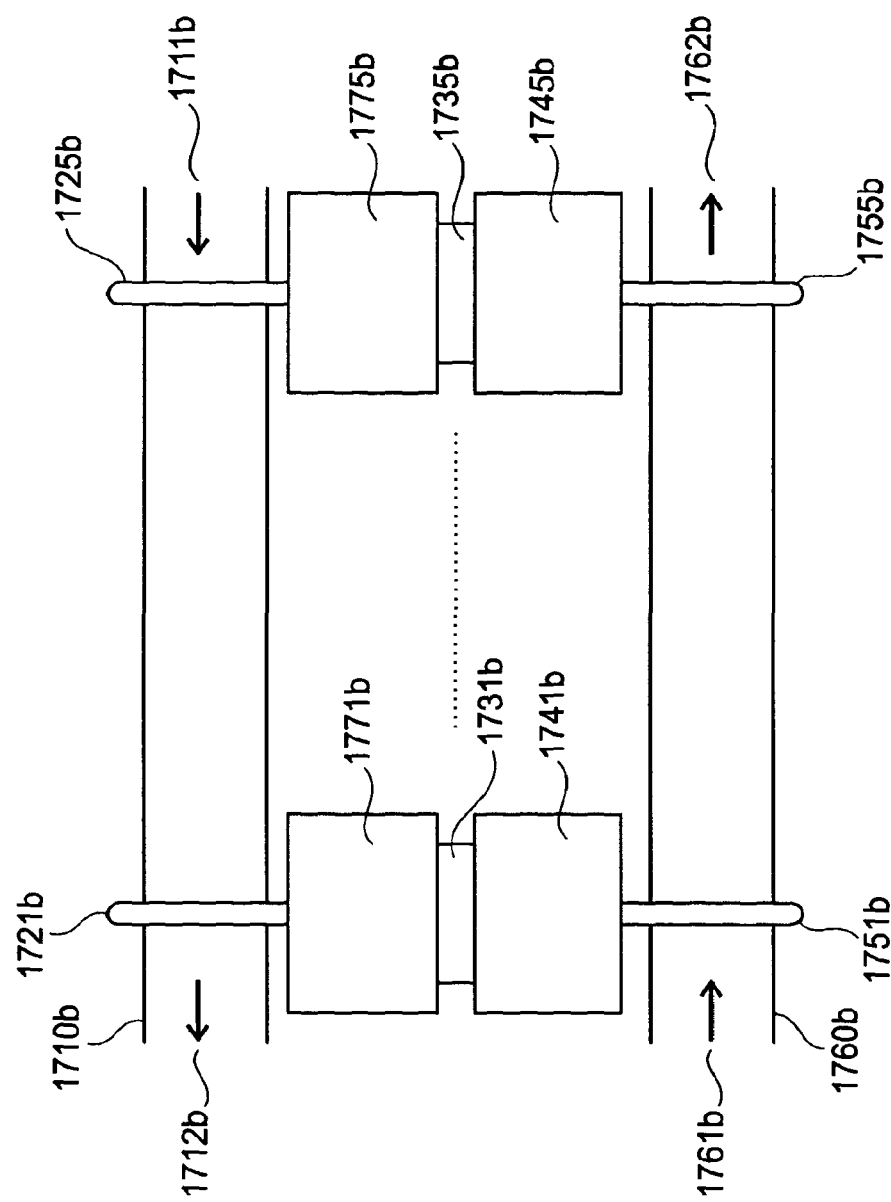

FIG. 17*b* shows an alternative embodiment, in which items labelled 17*xxb* have the same meanings they had where labelled 17*xxa* in FIG. 17*a*. Additional PCM banks 1771*b*, 1775*b* are interposed between thermoelectric devices 1731*b*, 1735*b* and incoming air duct heat exchangers 1721*b*, 1725*b*. The melting point temperatures of PCM in banks 1771*b*, 1775*b* may be chosen for example as 25° C., . . . 13° C., just sufficient to drive heat into incoming air via heat exchangers 1721*b*, 1725*b* to deliver it at a comfortable indoor temperature e.g. 21° C. at 1712*a*. This embodiment allows the PCM banks 1741*b*, 1745*b* and 1771*b*, 1775*b* to act as a rate buffer permitting continuous heat capture from outgoing air in duct 1760*b* and continuous heat delivery to incoming air in duct 1710*b*, while permitting heat pumping by devices 1731*b*, 1735*b* to be intermittent according to rules or conditions relating to the availability of electricity to drive the heat pumps.

Figure 17C:
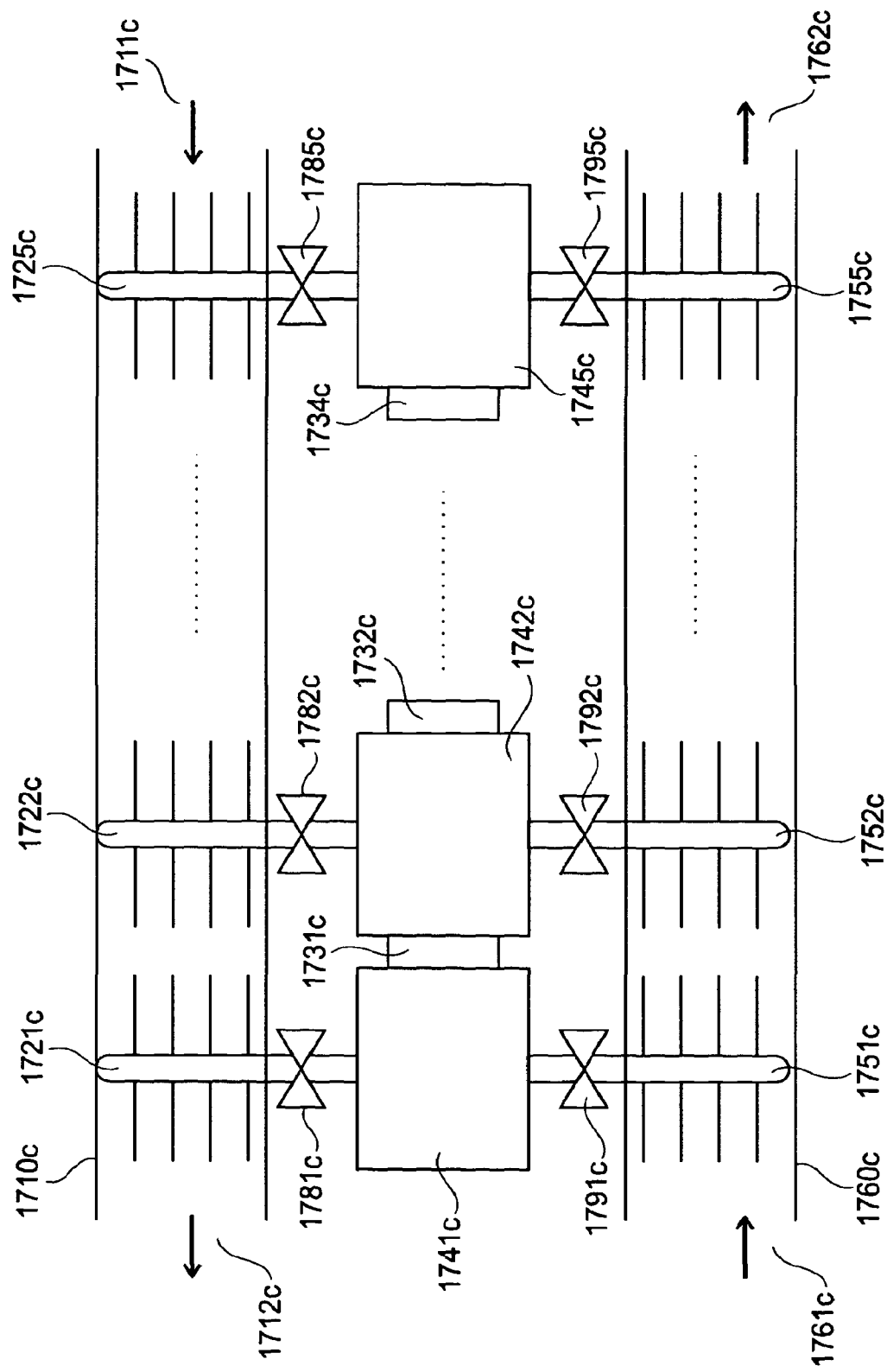

FIG. 17*c* shows an alternative embodiment, in which items labelled 17*xxc* have the same meanings they had where labelled 17*xxa* in FIG. 17*a*. Heat pumps are repositioned between banks (1731*c* between 1741*c* and 1742*c*, 1732*c* between 1742*c* and 1743*c*, and so on). Heat exchangers 1721*c*, . . . , 1725*c* are each equipped with a switch or valve or (in a preferred embodiment switchable heat pipe) 1781*c*, . . . , 1785*c* to control whether heat can flow between the heat exchanger and the PCM bank, or not. Heat exchangers 1751*c*, . . . , 1755*c* are each equipped with a switch or valve or (in a preferred embodiment switchable heat pipe) 1791*c*, . . . , 1795*c* to control whether heat can flow between the heat exchanger and the PCM bank, or not.

This embodiment requires half the number of PCM banks, less than half the number of heat pumps, of 17*b*, but has the same rate-buffering capabilities, permitting continuous heat capture from outgoing air in duct 1760*c* and continuous heat delivery to incoming air in duct 1710*c*, while permitting heat pumping by devices 1731*c*, . . . , 1735*c* to be intermittent according to rules or conditions relating to the availability of electricity to drive the heat pumps. Using switch/valve means 1781*c*, . . . , 1785*c* heat delivery to incoming air can also be controlled in timing and extent. Using switch/valve means 1791*c*, . . . , 1795*c* heat recovery from outgoing air can be bypassed for all or just some PCM banks. Bank 1741*c* may be equipped with PCM melting at 25° C., 1742*c* at 20° C., 1743*c* at 15° C., 1744*c* at 10° C., 1745*c* at 5° C. Heat exchangers 1751*c* and/or 1752*c* may be omitted as PCM banks 1741*c* and/or 1742*c* may always be above or close to the temperature of the air introduced at 1761*c* to outgoing air duct 1760*c*. Similar variations will be apparent to those skilled in the art.

FIGS. 17*a,b* and *c* represent cases where a heated indoor environment is exchanging air with a cold outdoor environment. Adaptations to cover cooled indoor environments exchanging air with hot outdoor environments will be apparent to those skilled in the art.

Figure 18:
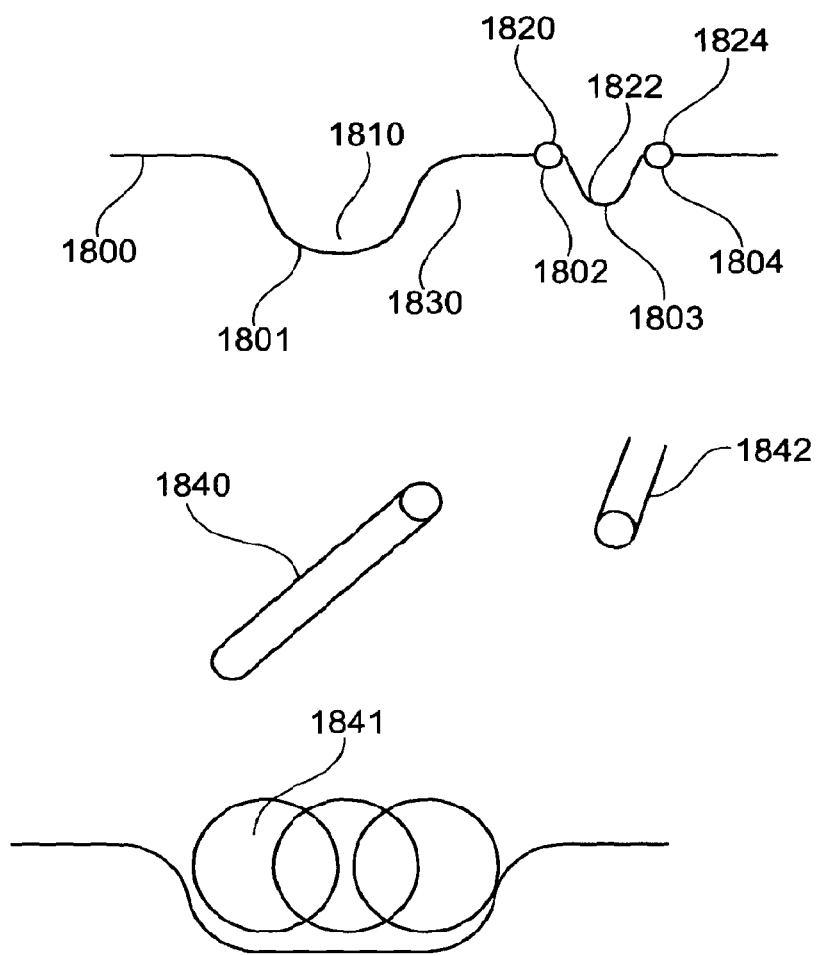
FIG. 18 is a representation of a representation of a cross-section through an embodiment of a part of a PCM bank or heat battery.

FIG. 18 is a representation of a cross-section through an embodiment of a part of a PCM bank or heat battery in which a metal plate 1800 is bonded face-to-face with a mirror image plate (not illustrated). Below plate 1800 is a body of PCM 1830 (and similarly above the mirror plate). Indentations 1801, 1802, 1803, 1804 are formed in plate 1800. These may be made using a fixed stamp in a press, or by repeated strikes 1841 or 1842 of a die 1840. Indentation 1801 (and its mirror) form a pipe to carry heat transfer fluid 1810. Indentation 1803 forms a smaller pipe to carry refrigerant 1820. To ensure no leakage of refrigerant gas, additional shallow indentations 1802, 1804 are formed, and filled with die-cut flexible seals 1822, 1824.

Figure 19:
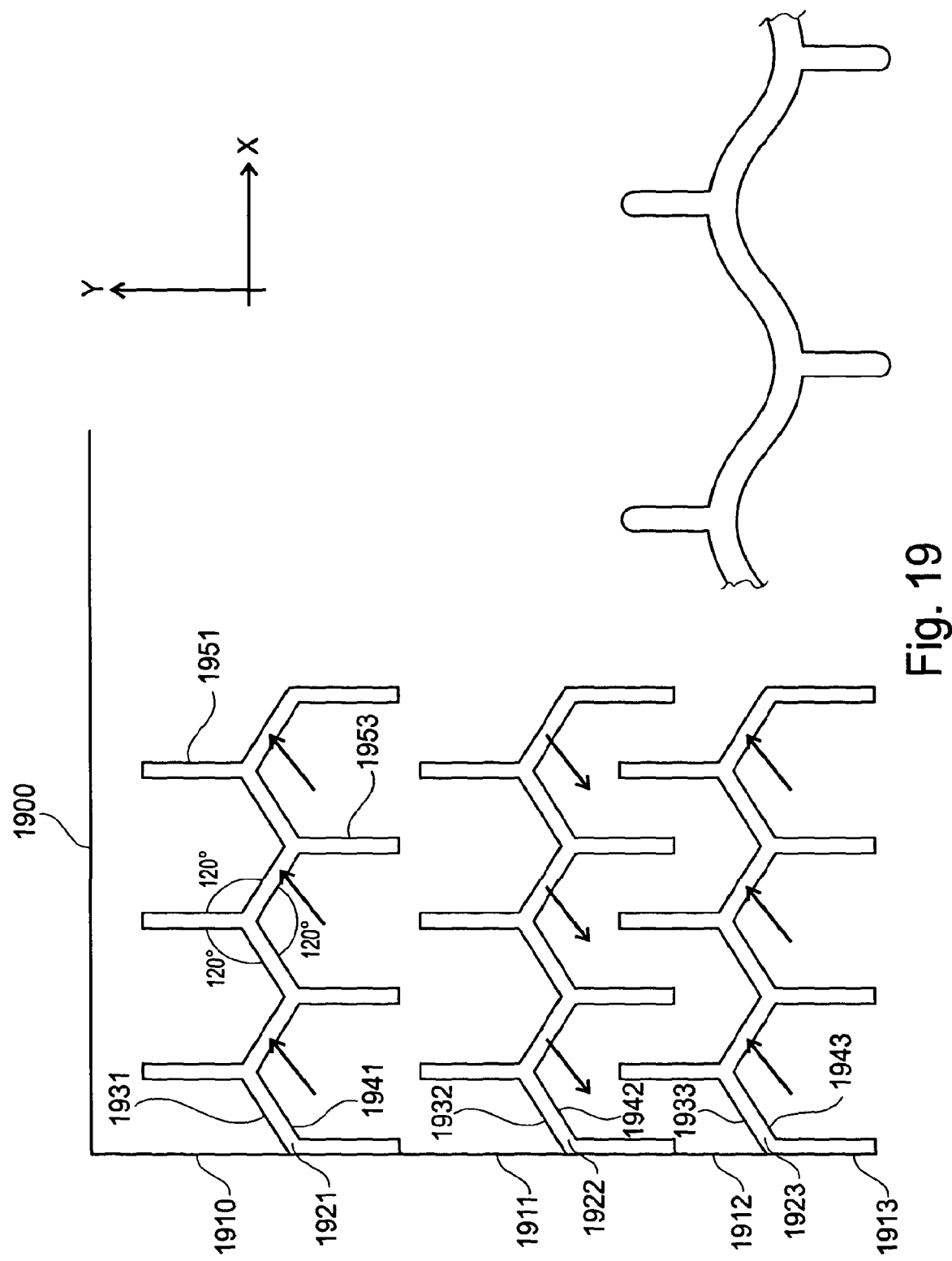
FIG. 19 shows a cross-section through an embodiment of a PCM bank.

The embodiment shown in FIG. 19 has the following advantages:
1. Reducing layer thickness from start to end of heat transfer fluid HTF-mirror image of depletion curve for a fixed thickness layer—so that all PCM is heat applied at same time.
2. Pattern of HTF channels is strippable, mouldable or carveable (e.g. by CNC for rapid prototyping) in either metal (to be filed with PCM/composite) or directly in PCM composite (to then be metallised on other surface coating).
3. Overlaid patterns of ripples and surface roughening (e.g. dimples) can be chosen to maximise heat transfer and minimise fouling.
4. Grove pattern can be carved in a 3D-sinusoid to maximise oath length of HTF and maximise surface area.

FIG. 19 is a representation of a cross-section through an embodiment of a PCM bank including a number of layers (1910, 1911, 1912, 1913 are illustrated here) of PCM or PCM composite (which may include thermal conductivity enhancers and/or other means to enhance thermal conductivity such as fine fins, not illustrated). A set of channels 1921, 1922, 1923 are formed using mirror-image indentations 1931/1941, 1932/1942, 1933/1943. Such indentations may be stamped, moulded, carved or machined into the surface of the layers (after which a metallized or polymer or other coating may be applied). Alternatively each of 1931, 1932, 1933, 1941, 1942, 1943 may be thin metal layers, made with moulding, stamping, etc, between which PCM/composite is introduced to form the layers.

Heat Transfer Fluid (HTF) or refrigerant flows in channels 1921, 1922, 1923. A different or the same fluid may flow in each channel. (Not illustrated are an external containment box or side walls to prevent fluid leaking out or between channels, and an arrangement of manifolds at near and far ends giving access to the channels.)

Deeper, non-mirrored grooves exemplified by 1951, 1952 may be formed in the channels to allow HTF or refrigerant to flow closer to PCM and with larger surface area. Any channel surface exemplified by 1931, 1941, 1951, 1952 may be given a periodic displacement (e.g. a 3D sinusoid) to maximise surface area and HTF flow-path length.

A pattern of overlaid ripples or surface roughening such as dimples may be formed on surfaces 1931, 1941, 1951, 1952, etc, where the patterns are chosen from patterns known in the art to enhance heat transfer and/or minimise fouling.

Layer 1910 has a channel adjacent to it on just one surface (the bottom). Whereas 1911, 1912 have channels adjacent on two surfaces (top and bottom). Double-surfaced layer 1912 is shown with decreased vertical thickness compared with layer 1911, which may be advantageous to compensate for decreasing temperature difference as HTF flows first in channel 1921, then 1922, 1923 and so on in sequence. Other variations of layer thickness may be advantageous for example due to the use of different HTFs in different channels with different thermo-physical properties that move heat from/to layers with different effectiveness.

Figure 19A:
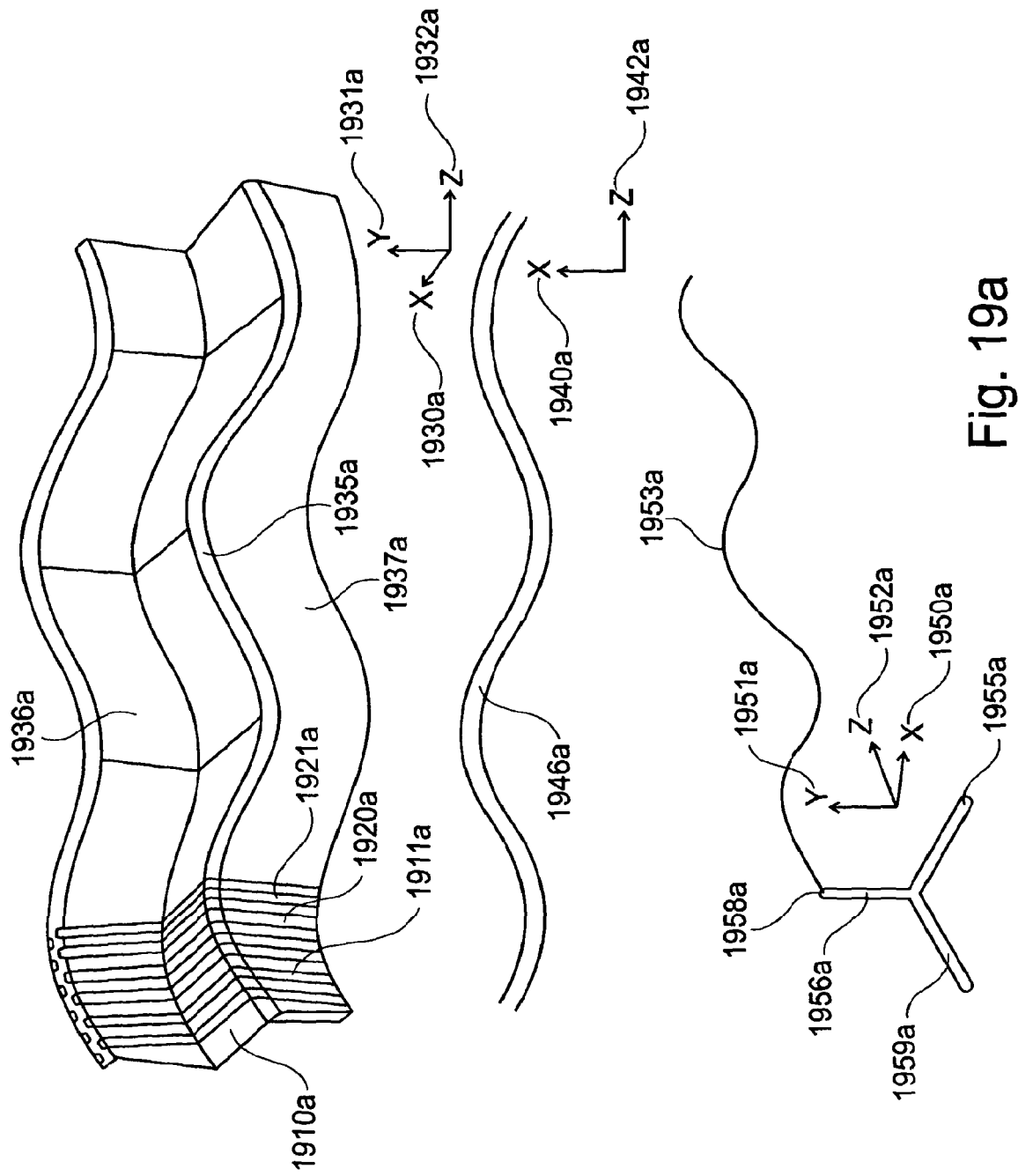
FIG. 19a is a representation of exemplary ribbing patterns, surface dimples formed into a surface channel.

FIG. 19a depicts in more detail elements of FIG. 19, including exemplary ribbing patterns 1920a, 1921a and surface dimples 1910a, 1911a, formed into the surface of channel 1935a. These details are depicted without showing the PCM/composite, therefore the detail of 1910a, 1911a, 1920a, 1921a are seen from the PCM/composite side of the wall of channel 1935a.

Channel 1935a is depicted with two grooves 1936a, 1937a extending upwards and downwards respectively, all following a three-dimensional sinusoidal curve.

X-axes 1930a, 1940a, 1950a; Y-axes 1931a, 1951a; Z-axes 1932a, 1942a, 1952a are all in the same frame of reference.

1946a depicts in plan view the sinusoidal curvature of channel 1936a.

1956a depicts in cross-sectional view the gross shape (excluding surface dimples, ripples) of channel 1936a, and 1955a depicts the shape of 1935a, noting that 1955a is at a greater angle than 90 degrees to 1958a to increase surface area. A channel 1959a is depicted that is the mirror around the Y-axis of 1955a. A point in the cross-section 1958a is extruded in a three-dimensional sinusoid 1953a. All other points are extruded so as to maintain the same displacement from point 1958a in X-Y plane 1951a-1950a in each later plane parallel to the said plane.

Figure 20:
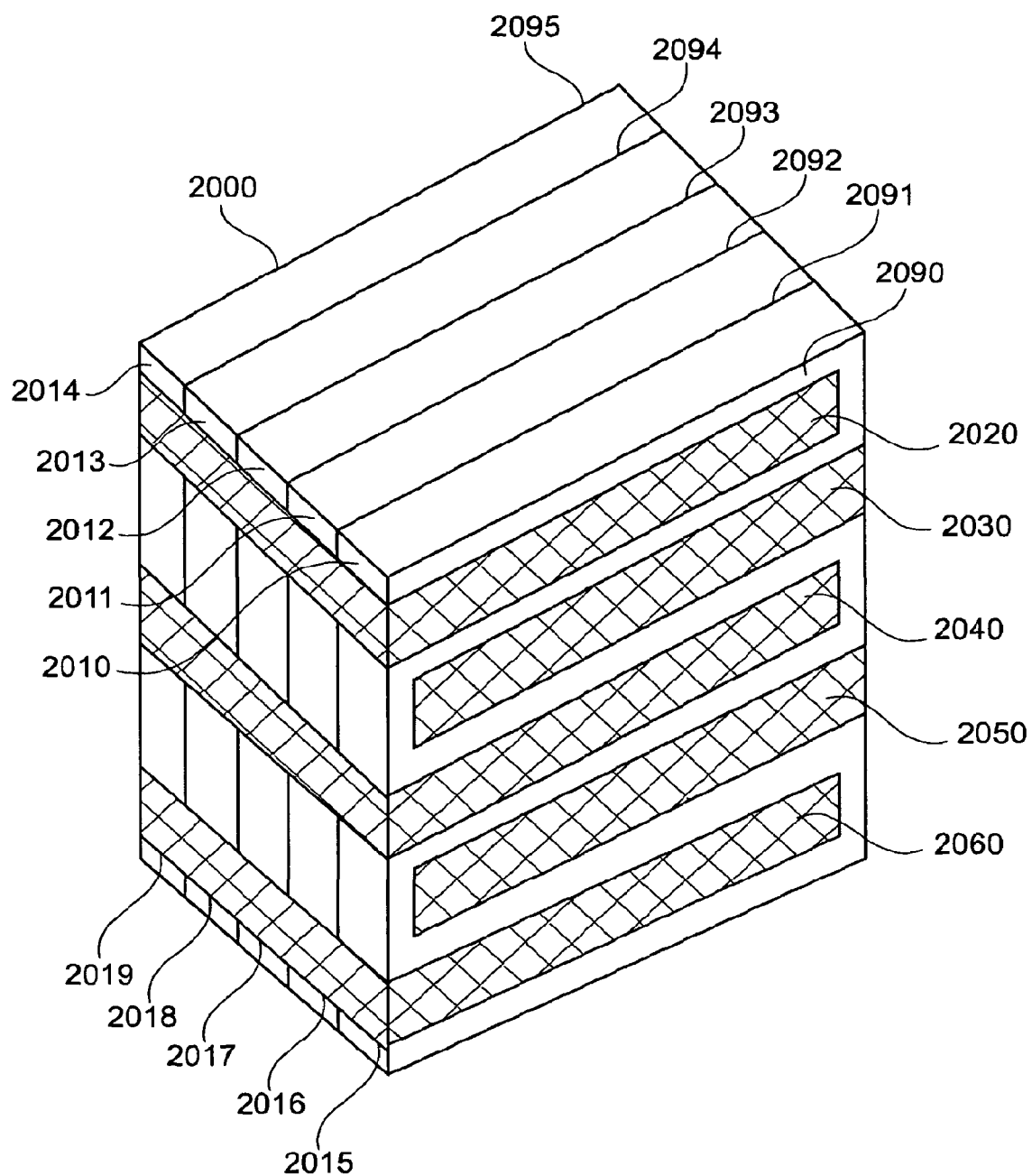
FIG. 20 is a representation of a further embodiment of an HTF arrangement.

FIG. 20 is a representation of an embodiment of the structure of a PCM to HTF heat exchanger 2000 forming the whole or part of a bank of PCM or a heat battery. Layers of PCM 2020, ..., 2060 are cuboids with one dimension (thickness) substantially smaller than the others, formed from PCM or PCM composite (optionally with internal thermal conductivity enhancing fins or the composite containing thermal conductivity enhancing additive) enclosed in a metal casing or a thin film (metallised, polymer or other).

A set of support structures is illustrated comprising metal or plastic sheets, 2090, ..., 2095, each shaped or cut into a repeated S-shaped comb-like arrangement, with cuts running horizontally, cut alternatively from the near and far ends. Each cut is sized to the thickness of the PCM layer, and into each cut is inserted a PCM layer (2020, ..., 2060).

The said supporting sheets are depicted standing vertically and spaced apart to create channels of which the entry points 2010, ..., 2014 and exit points 2015, ..., 2019 are depicted. The channels run near to far above the top-most PCM layer, with further channels below this PCM layer, and each subsequent descending PCM layer, of which 2015, ..., 2019 are depicted. Entry point 2010 connects in a continuous S-shaped channel to exit 2015, running first near to far over the top of PCM layer 2020, then round the far end of 2020, then back under 2020 and simultaneously over the top of PCM layer 2030, and round the near end of 2030 and so on descending layer by layer. A similar set of channels connects 2011 to 2016, 2012 to 2017, 2013 to 2018 and 2014 to 2019.

Figure 21:
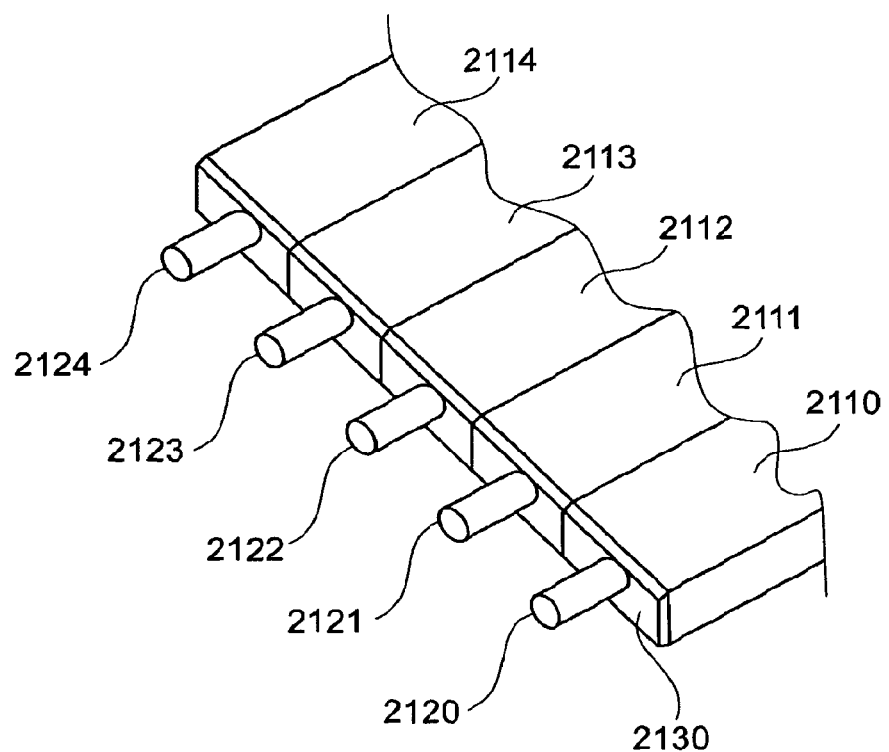
FIG. 21 is a representation of a further embodiment where multiple manifolds serve multiple HTFs through different channel sets, a suitable geometry and sealing is adopted to ensure no mixing of fluids and from each void a further hole (or holes), of suitable diameter to satisfy the aggregate design flow rate through all channels, leads to/from external pipe connectors supplying/removing the HTF to elsewhere in the Thermal Store.

FIG. 21 depicts a detail of one embodiment of the PCM to HTF heat exchanger of FIG. 20, showing an end plate 2130 covering the entry point of channels 2110, ..., 2114 (identical to channels 2010, ..., 2014 in FIG. 20). End-plate 2130 is attached to pipe sections 2120, ..., 2124 affording respectively a pipe connection into channels 2110, ..., 2114. A like arrangement would afford outflow from channel exit points.

Figure 22:
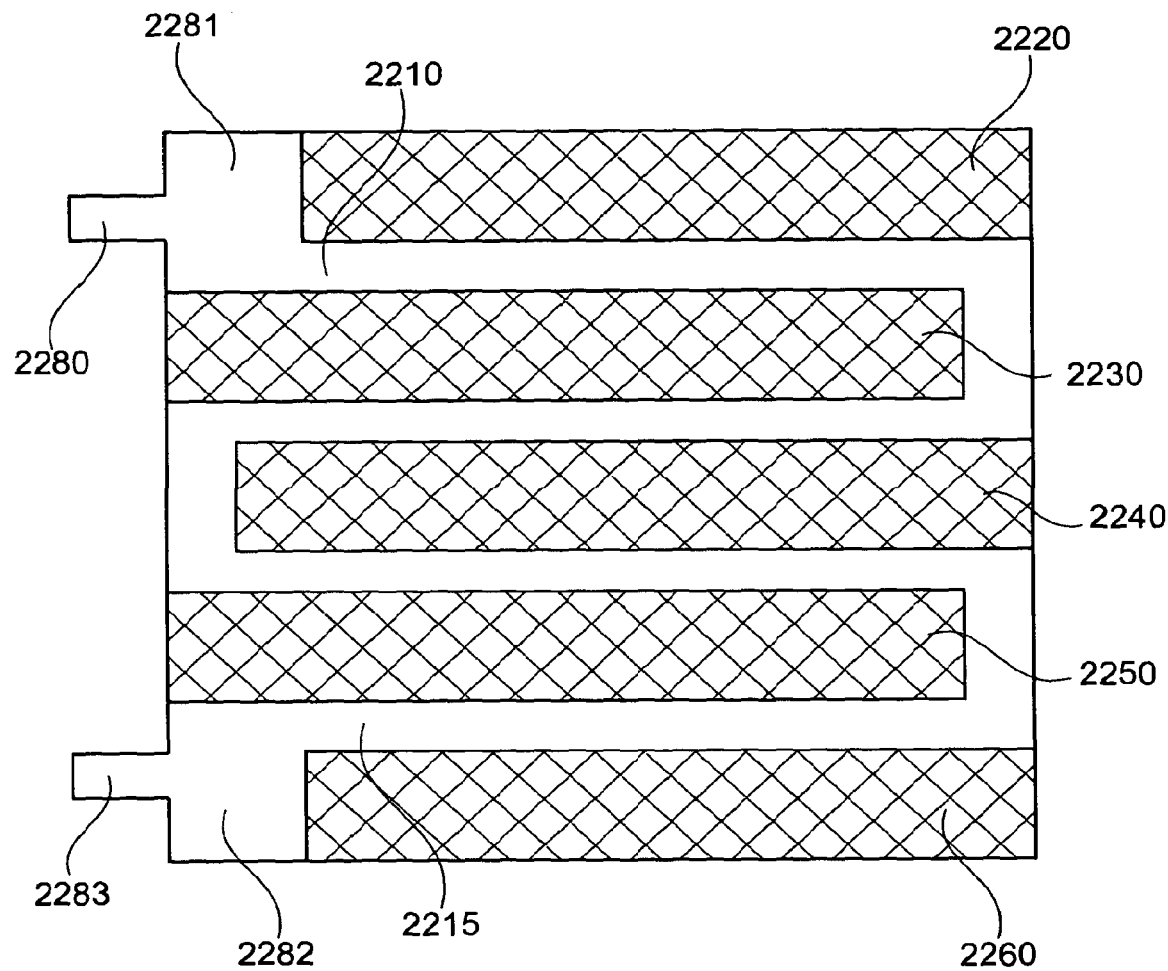
FIG. 22 is a representation of a further embodiment which represents another method of constructing a manifold.

FIG. 22 depicts in cross-section an alternative embodiment of the structure of a PCM to HTF heat exchanger 2200 wherein a rearrangement of the shape of supporting sheets 2220, ..., 2260 affords a pair of voids 2281 and 2282 that act as manifold spaces within the volume of the heat exchanger giving access to channels (the entry 2210 and exit 2215 of one channel is illustrated in cross-section). Pipes 2280 and 2283 are illustrated allowing heat transfer fluid to flow into 2281 and out of 2282 respectively.

Figure 23:
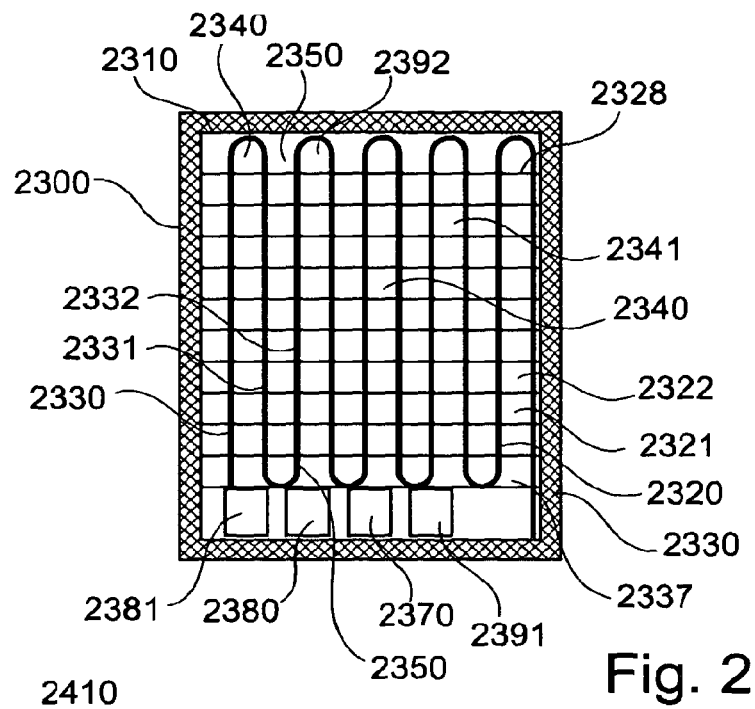
FIG. 23 is a representation of a further embodiment where only channel structure is shown and PCM/composite omitted for clarity in flow channels.

FIG. 23 depicts a PCM to HTF heat exchanger 2300, showing a plan view of a fin-tube gas-HTF heat exchanger, with only some fins illustrated 2320, 2321, 2322, 2328 and tubes 2330, 2331, 2332, 2337, enclosed in an insulated box 2310. The gas spaces between fins and tubes are filled with phase change material in all locations, exemplified by 2340, 2341. The tubes form u-bend return ends exemplified by 2390, 2391, 2392 where there are no fins, so these are filled with phase change material composite containing a thermal conductivity enhancer in locations exemplified by 2350, 2351. Heat exchanger 2370 exchanges heat between an external service (not illustrated) and a secondary heat transfer fluid pumped around the tube loop by pump 2360. Heat exchanger 2380 exchanges heat with a heat pump (not illustrated) bringing heat from a colder melting point bank (with 2380 forming the heat pump's condenser, if it is a vapour compression heat pump). Heat exchanger 2381 exchanges heat with a heat pump (not illustrated) taking heat to a higher melting point bank (with 2381 forming the heat pump's evaporator, if it is a vapour compression heat pump). 2360, 2370, 2380, 2381 may be in a cavity or embedded in phase change material composite.

Figure 24:
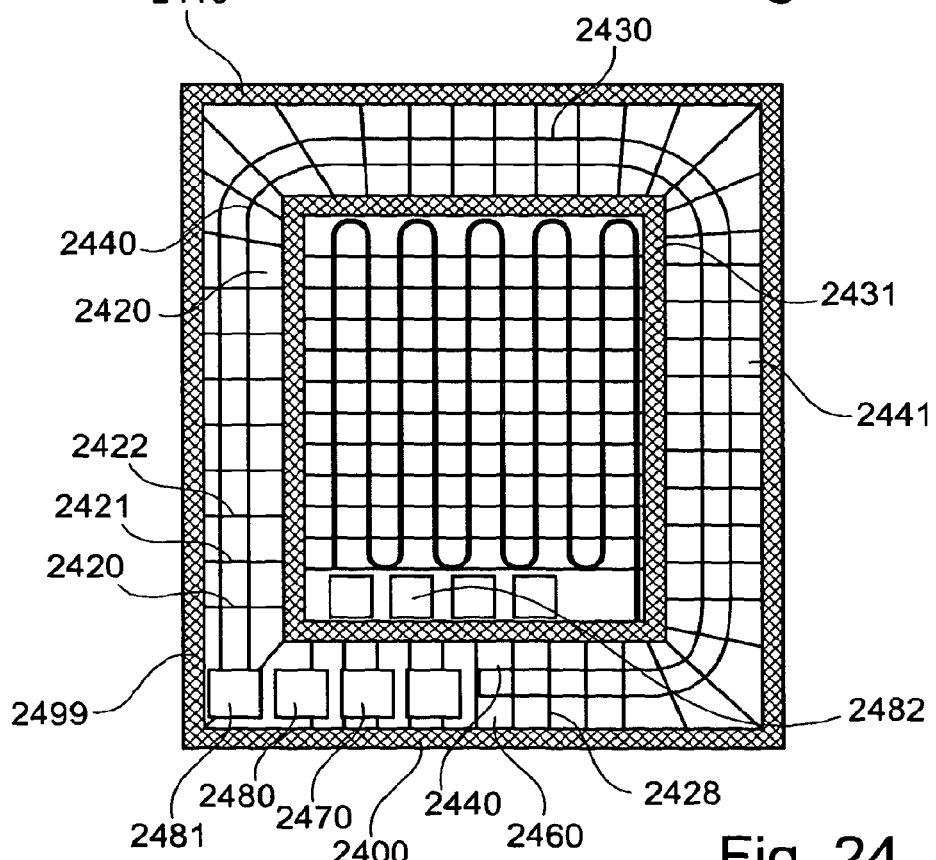
FIG. 24 is a representation of a nested PCM to HTF heat exchanger.

FIG. 24 depicts a nested PCM to HTF heat exchanger 2499, with a core element 2400 (with internal elements identical to 23xx in FIG. 23), nested within an outer heat exchanger shown in plan view comprising a curved fin-tube gas-HTF heat exchanger, wrapping around 2400, with only some fins 2420, 2421, 2422, 2428 illustrated, and tubes 2430, 2431, enclosed in an insulated box 2410. The gas spaces between fins and tubes are filled with phase change material in all locations, exemplified by 2440, 2441. The tubes form u-bend return end 2490 where there are no fins, so this space is filled with phase change material composite containing a thermal conductivity enhancer in location 2450. Heat exchanger 2470 exchanges heat between an external service (not illustrated) and a secondary heat transfer fluid pumped around the tube loop by pump 2460. Heat exchanger 2480 exchanges heat with a heat pump (not illustrated) bringing heat from a colder melting point bank (with 2480 forming the heat pump's condenser, if it is a vapour compression heat pump). Heat exchanger 2481 exchanges heat with a heat pump (not illustrated) taking heat to nested higher melting point bank 2400, (with 2481 forming the heat pump's evaporator, if it is a vapour compression heat pump), thus connecting to 2482 (equivalent to 2380 of FIG. 23). 2360, 2370, 2380, 2381 may be in a cavity or embedded in phase change material composite.

Figure 25:
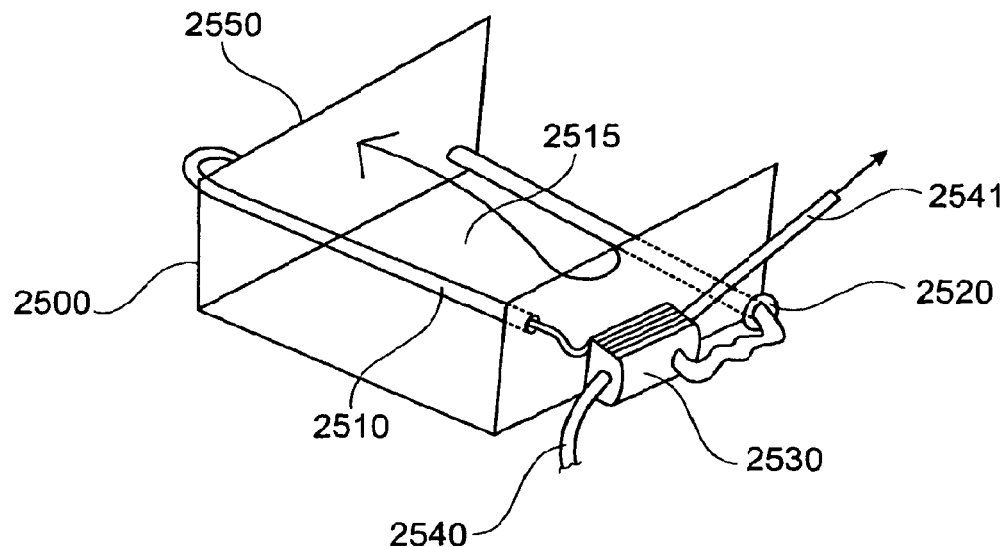
FIG. 25 is a representation of a further energy system according to the present invention.

FIG. 25 shows in isometric a partial representation of a PCM-HTF heat exchanger 2500 with a pumped loop of secondary heat transfer fluid 2510 passing in multiple tube loops through PCM heat exchanger 2515 (details omitted). Pump 2520 propels the HTF around the loop, and through plate heat exchanger 2530, where it exchanges heat with external service entering from pipe 2540, imparting heat to the water or other fluid of the external service (or alternatively extracting heat from it) by the point where it exits to pipe 2541.

FIG. 25A is a representation of inset 2590 of FIG. 25;

Inset 2590 (FIG. 25A) depicts, from an end-on view, an alternative arrangement of pump 2521 and three plate heat exchangers 2531, 2532, 2533 allowing three different external services to load or remove heat.

Position 2550 at the far end of the heat exchanger offers an additional location to mount further heat exchangers.

Figure 26:
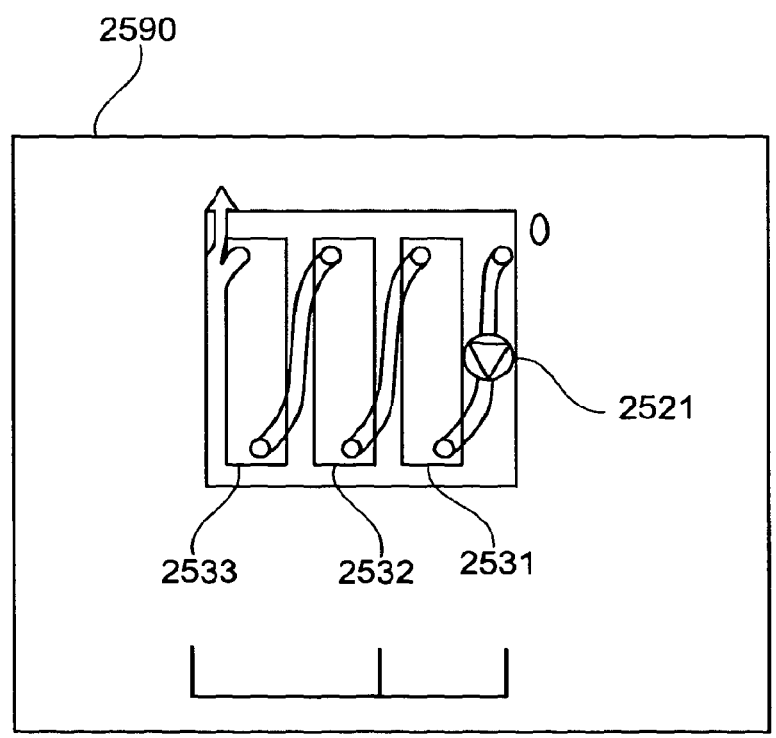
FIG. 26 is a representation of a further energy system according to the present invention where there is only one heat exchange circuit per tank multiplexed between loading heat from a heat pump.
Figure 26:
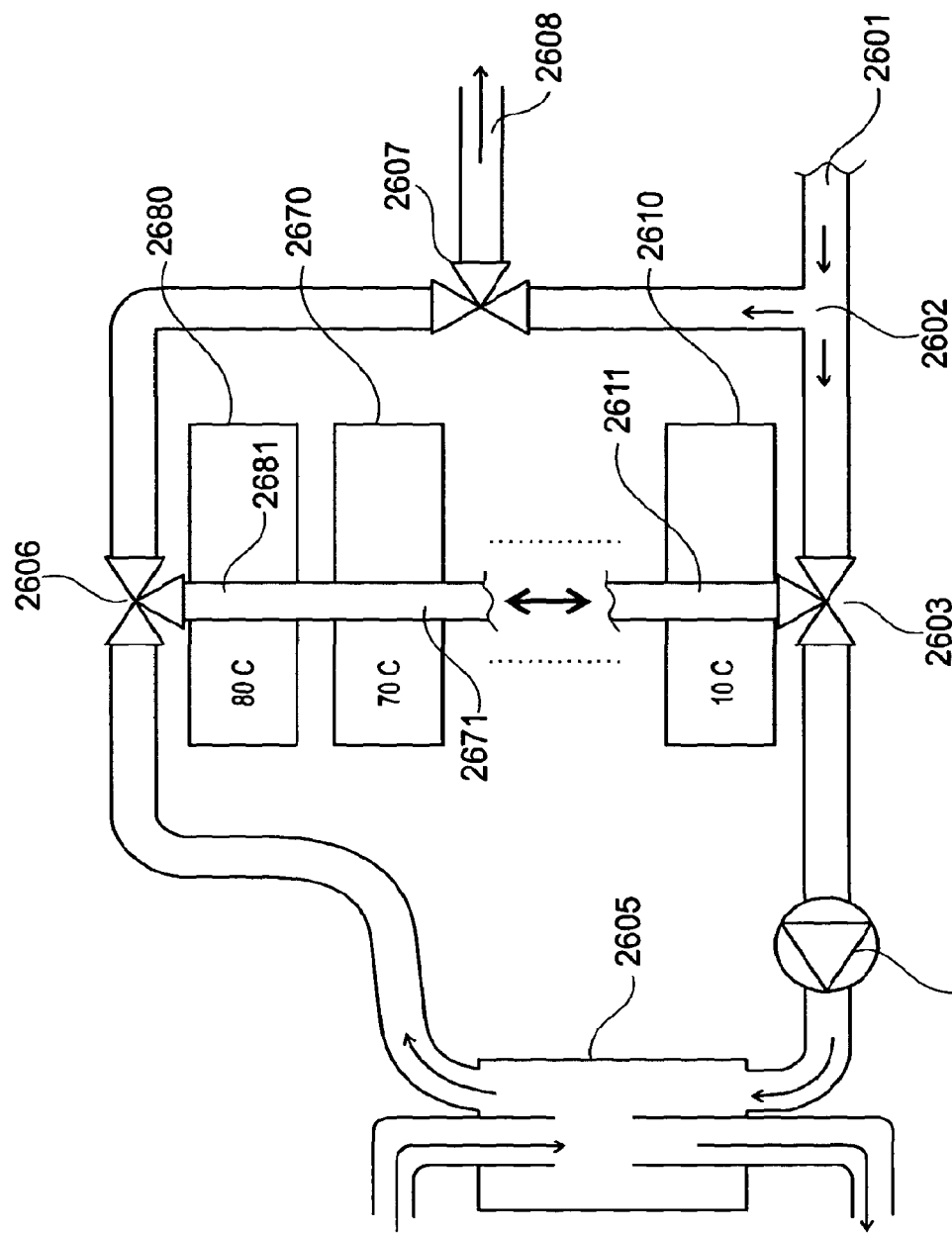

FIG. 26 is a schematic representation of a multi bank PCM thermal store, wherein only one direct heat exchange circuit per bank is shared to perform dual duty, at one time loading heat from a $CO_2$ heat pump and at another heating cold water to make hot water. Bank 2610 contains PCM with 10° C. melting point, bank 2670 contains PCM with 70° C. melting point and 2680 contains PCM with 80° C. melting point. Heat exchangers 2611, 2671 and 2681 are schematically illustrated in banks 2610, 2670 and 2680 respectively.

When charging heat energy into the banks, pump 2604 causes water to circulate through $CO_2$ heat pump 2605 where it is warmed above 80° C.; valve 2606 is set to switch the water flow into heat exchangers 2681, 2671, . . . , 2611 in sequence; valve 2603 is switched to complete the loop back to pump 2604.

When hot water is demanded, pump 2604 and heat pump 2605 are switched off. Cold water enters at 2601; valve 2603 is switched so water flows into heat exchangers 2611, . . . , 2671, 2681 in sequence; valve 2606 is switched so the now hot water flows to set-point valve 2607, where it is mixed with cold water and delivered at the hot set-point temperature at exit 2608.

Figure 27:
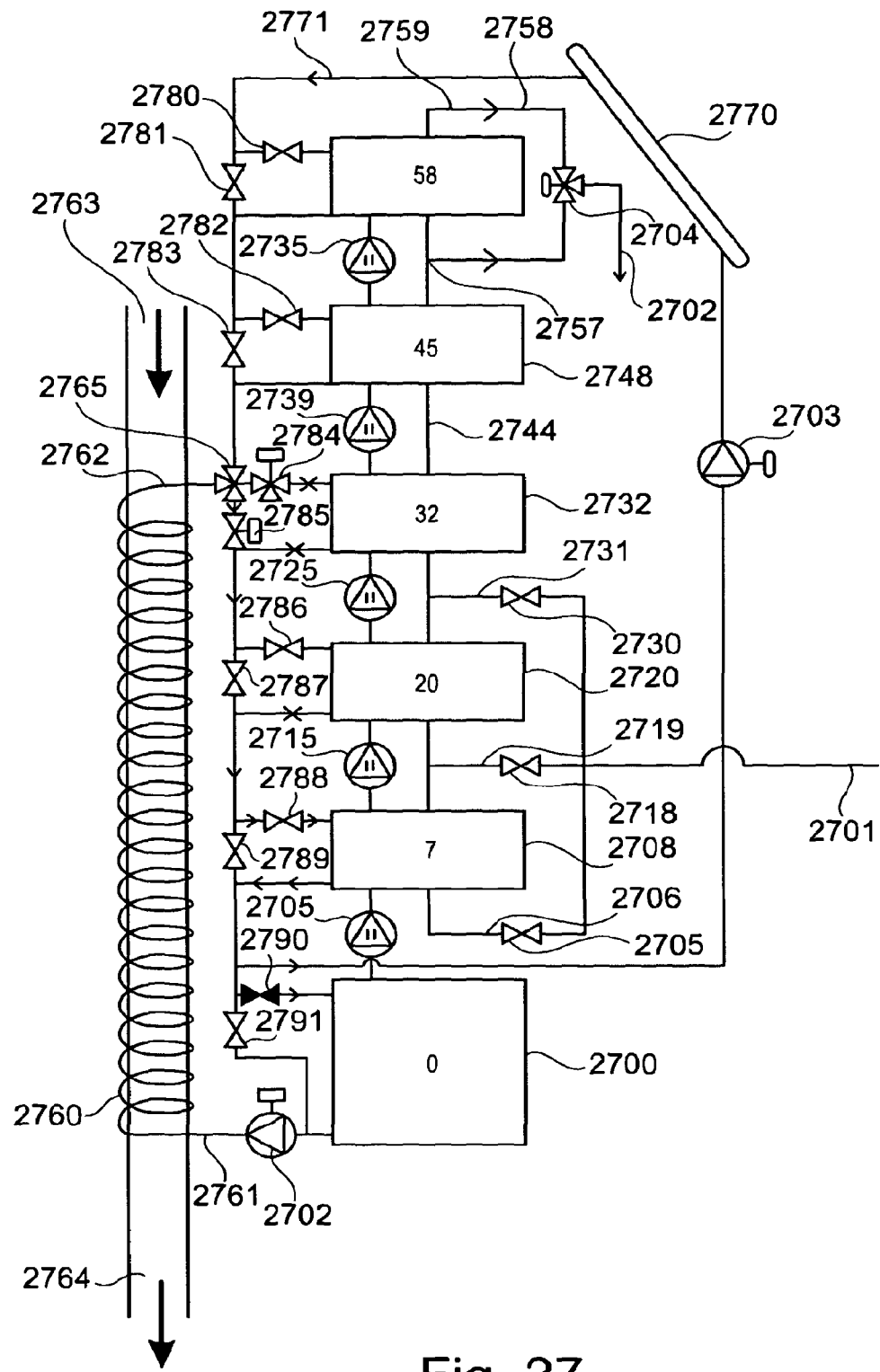
FIG. 27 is a representation of where HTF can be directed to the highest melting temperature bank colder than the HTF, and subsequently directed through a sequence of ever lower temperature banks, before being pumped back to the waste water heat recovery unit.

FIG. 27 is a schematic representation of a complex embodiment of the present invention comprising a multi bank PCM thermal store with inter-bank heat pumping providing hot water service from heat collected from a solar thermal panel and waste water heat recovery.

Solar heat transfer fluid is caused to circulate by pump 2703 through solar panel 2770 whenever there is sufficient sunlight and there is no concurrent waste water heat recovery. Solar HTF proceeds via pipe circuit 2771 to valves 2780 and 2781 which are always set in opposition (alternatively a single three-way valve could be used) to select between passing Solar HTF through bank 2758 (containing 58° C. melting point PCM) or bypassing said bank, depending on decision logic. Similarly valves 2782, 2783 pass or bypass bank 2745; 2784, 2785 for bank 2732; 2786, 2787 for 2720; 2788, 2789 for 2707. When flowing to the solar side of the circuit, both valves 2790 and 2791 are closed, bypassing bank 2700.

When waste water flow is detected by sensors (not illustrated) at 2763, pump 2703 is switched off; valve 2765 is switched to prevent flow in the solar side of the circuit, and to allow flow on the waste water recovery side; pump 2702 is switched on, and solar HTF now flows via pipe 2761 into waste water heat recovery heat exchanger 2760 where it counter-flows with the waste water, exiting at 2762 where the HTF's temperature is sensed. HTF flows via switched valve 2765. Valves 2784 and 2785 which are always set in opposition (alternatively a single three-way valve could be used) select between passing HTF through bank 2732 (containing 32° C. melting point PCM) or bypassing said bank, depending on decision logic. Similarly valves 2786, 2787 pass or bypass bank 2720; 2788, 2789 for 2707; 2790, 2791 for 2700. 2700 may sometimes be bypassed even if there is heat to be captured, to ensure that the temperature of HTF entering 2760 at 2761 is not so low that it causes waste water leaving at 2764 to be so cold that it would freeze in waste pipes downstream in winter.

Heat pump 2705 under command of control logic can extract heat from bank 2700 and deliver it at higher temperature to bank 2707; likewise heat pump 2715 from 2707 to 2720; 2725 from 2720 to 2732; 2735 from 2732 to 2745; 2755 from 2745 to 2758.

Cold mains water enters at 2701; valves 2705, 2718, 2730 control whether water then flows via pipes 2706, 2719 or 2730 respectively first into heat exchangers (not illustrated) in banks 2707, 2720 or 2732. If having first flowed through 2707 water flows onwards to the heat exchanger in 2720 and then 2732. If having first flowed to 2720 then 2707 is bypassed completely, and water flows onwards to 2732. If having first flowed to 2732 then 2707 and 2720 are fully bypassed. After bank 2732, water always flows through 2745. A thermostatic mixing valve, 2704, controls how much water flows through 2758 and how much bypasses it. The output of 2704 flows to the mains hot water supply at 2702.

Figure 28:
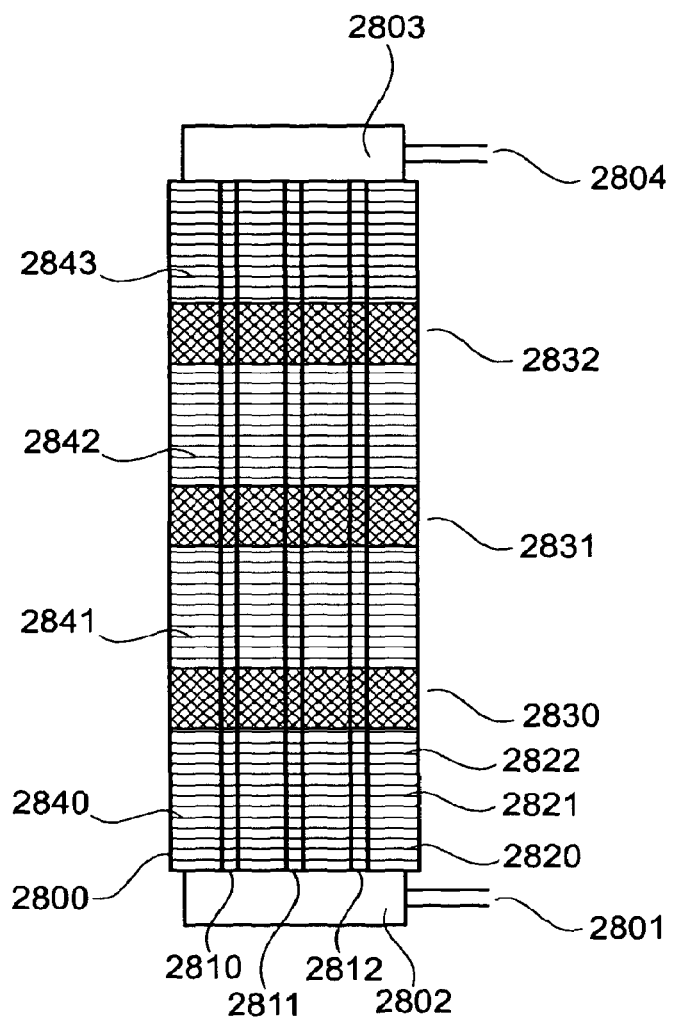
FIG. 28 is a representation of where some or all of the tubes or heat pipes pass through fins with PCM or PCM composite between the fins, or pass through PCM composite without fins ("fin-tube-like embodiments"), the along-tube direction can be divided into several segments containing different PCMs with different melting temperatures.

FIG. 28 is a plan view representation of a fin-tube heat exchanger 2800 divided into four compartments 2840, 2842, 2842, 2843, each containing a different phase change material with a different melting point temperature, which are monotonically rising (or alternatively monotonically falling) from 2840 to 2843. Heat transfer fluid enters at 2801 and via manifold 2802 enters in parallel tubes 2810, 2811, 2812, passing first into compartment 2840, wherein it passes through heat exchange fins 2820, 2821, 2822. Thereafter the HTF passes through insulation 2830 into compartment 2841 (where the tube passes through the insulation, plastic tube may be used in place of heat conductive metal pipe elsewhere); then through insulation 2831 into compartment 2842; through 2832 into 2843; and thereafter via manifold 2803 to outlet 2804.

Figure 29:
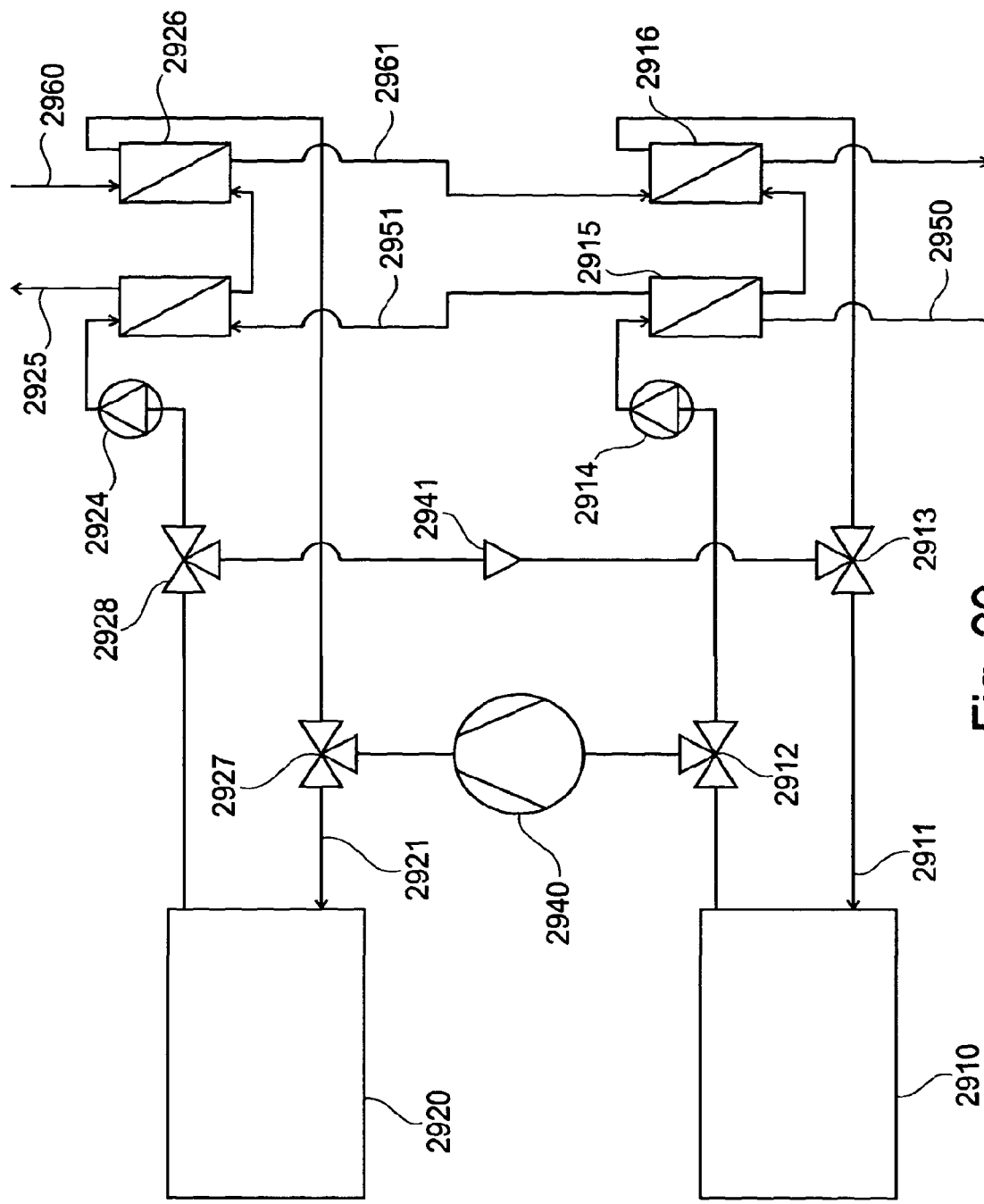
FIG. 29 is a representation showing heat pumping becoming an integrated element of the PCM-HTF heat exchanger bank structure.

FIG. 29 is a schematic illustration of a partial embodiment wherein a heat transfer fluid is also at some other time a refrigerant. PCM banks 2910, 2920 contain PCM wherein 2910 has a lower melting temperature and 2920 a higher one. Heat transfer fluid at 2911 can pass through a heat exchanger (not shown) in 2910. In regular operation valve 2912 would be switched so that the HTF enters pump 2914 which pumps HTF in a closed loop via heat exchangers 2915 and 2916 and valve 2913 back to 2911. In this arrangement heat can be extracted from bank 2910 via heat exchanger 2915 to external service 2950 and/or loaded from service 2961 via heat exchanger 2916 to bank 2910.

Heat transfer fluid at 2921 can pass through a heat exchanger (not shown) in 2920. In regular operation valve 2928 would be switched so that the HTF enters pump 2924 which pumps HTF in a closed loop via heat exchangers 2925 and 2926 and valve 2927 back to 2921. In this arrangement heat can be extracted from bank 2920 via heat exchanger 2925 to external service 2951 and/or loaded from service 2960 via heat exchanger 2926 to bank 2920.

In heat pumping operation between banks 2910 and 2920, pumps 2914 and 2924 are switched off and valves 2912, 2927, 2928 and 2913 are switched so that HTF (now acting as a refrigerant) passes first through the heat exchanger in 2910, acting as an evaporator, then compressor 2940, then the heat exchanger in 2920, acting as a condenser, then expansion valve 2941 and back to 2911.

Figure 30:
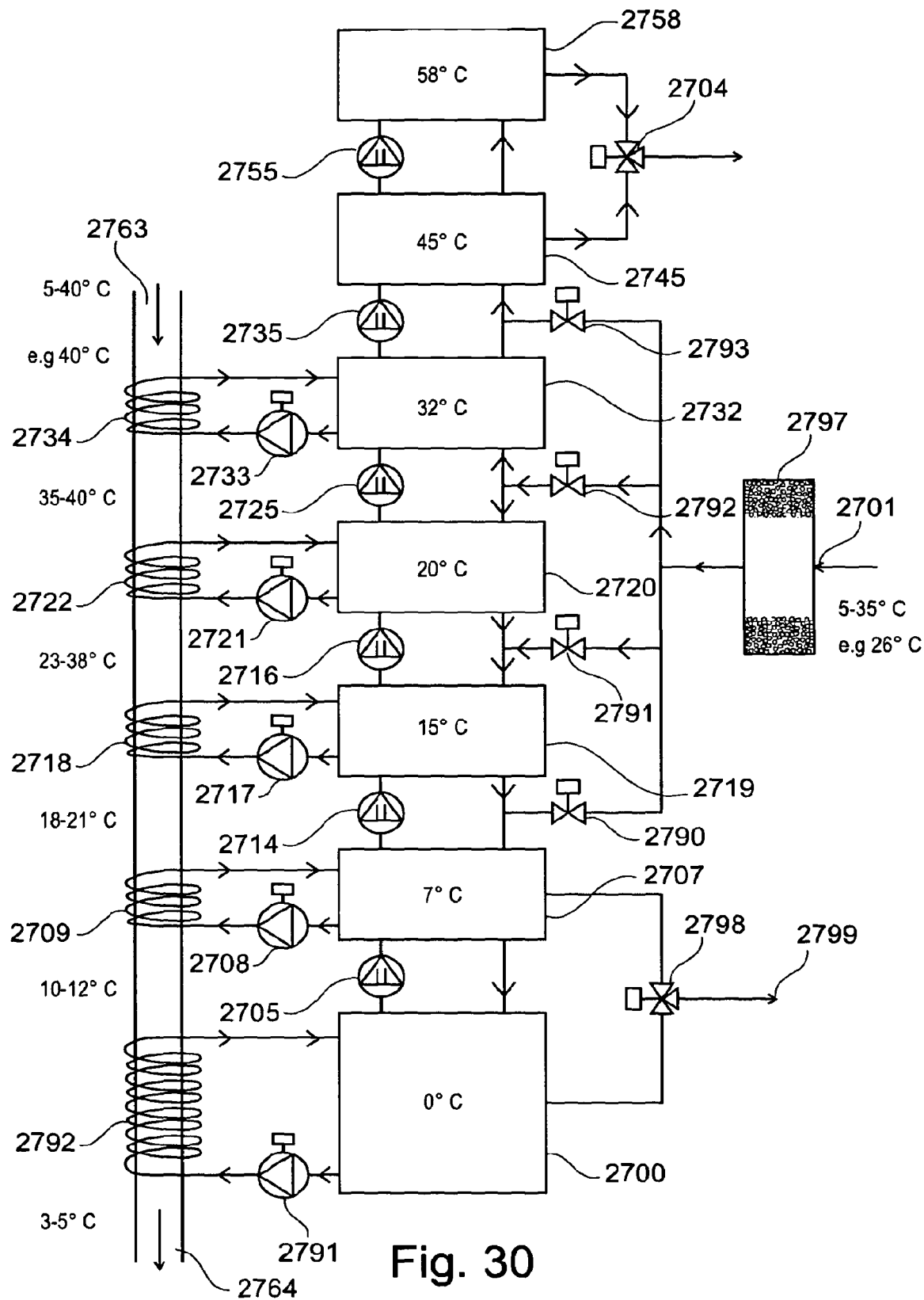
FIG. 30 is a representation of bank or banks of a Thermal Store being used to pre-cool mains water arriving into a building.

FIG. 30 is a schematic representation of a complex embodiment of the present invention comprising a multi bank PCM thermal store with inter-bank heat pumping providing hot water service from heat collected from waste water heat recovery and heat pumped from cold banks used to provide a cold water service in countries where mains water can arrive quite hot from the mains.

When waste water flow is detected by sensors (not illustrated) at 2763, depending on its temperature a selected set of pumps 2791, 2708, 2717, 2721, 2733 is switched on, thereby allowing HTF to flow into waste water heat recovery heat exchangers 2792, 2709, 2718, 2722, 2734 respectively, thus capturing heat to a selected set from banks 2700, 2707, 2715, 2720, 2732 respectively.

Pump 2791 may sometimes be suppressed, even if there is heat to be captured, to ensure that the temperature of HTF entering 2792 is not so low that it causes waste water leaving at 2764 to be so cold that it would freeze in waste pipes downstream in winter.

Heat pump 2705 under command of control logic can extract heat from bank 2700 and deliver it at higher temperature to bank 2707; likewise heat pump 2714 from 2707 to 2715; 2716 from 2715 to 2720; 2725 from 2720 to 2732; 2735 from 2732 to 2745; 2755 from 2745 to 2758.

Cold mains water enters at 2701; passes via optional ion exchange column 2797; depending on the mains water temperature, the opening of one of valves 2790, 2791, 2792, 2793 controls whether water then flows first into banks 2715, 2720, 2732 or 2745. Whichever first bank water initially flows through, it then flows through all banks warmer than said first bank until it has exited bank 2745. A thermostatic mixing valve, 2704, controls how much water flows through 2758 and how much bypasses it. The output of 2704 flows to the mains hot water supply at 2702.

Water can also flow from the mains to colder banks than the mains temperature, for example if the mains temperature is 25° C. and valve 2792 is open, water can not only flow up the banks to 2732, 2745, 2758 but also down to banks 2720, 2715, 2707, 2700. A thermostatic mixing valve 2798 on the outputs of banks 2707 and 2700 allows a set temperature control on the cold water output 2799.

Figure 31:
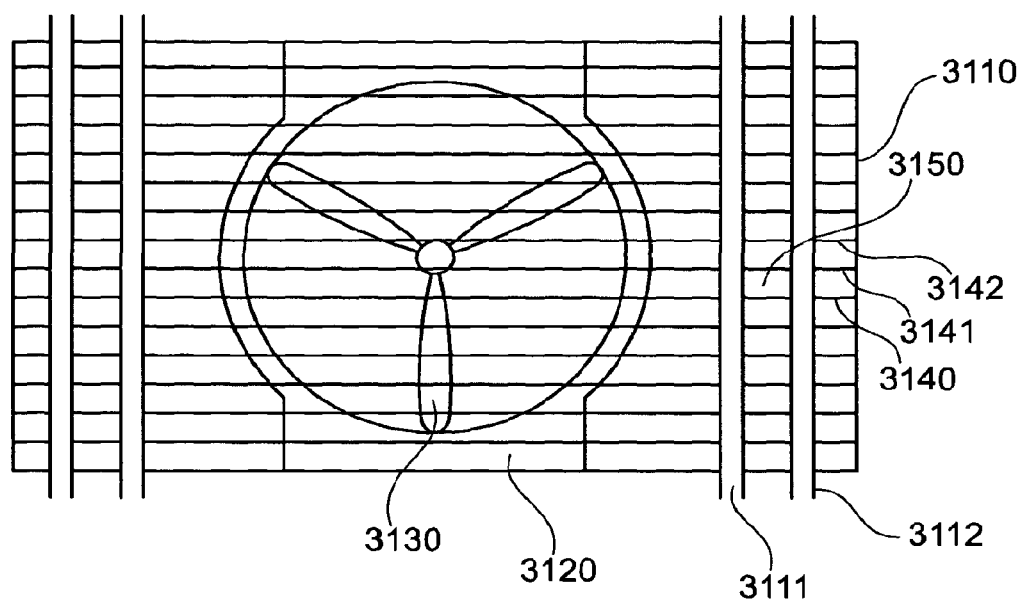
FIG. 31 is a representation of where a source of heat to a Thermal Store is an air source using a fan coil and a bank or banks of the Thermal Store may be directly integrated into the air source.

FIG. 31 is a representation of a PCM-HTF heat exchanger apparatus in which a PCM-HTF heat exchanger 3110 surrounds an air-HTF fin-tube heat exchanger 3120 with a fan 3130 mounted in front of it.

Tubes 3111, 3112 run through the fins including fins 3140, 3141, 3142, which extend through the PCM filled region 3110, in which region PCM 3150 fills the spaces between fins, and also the air-filled region 3120.

Figure 32:
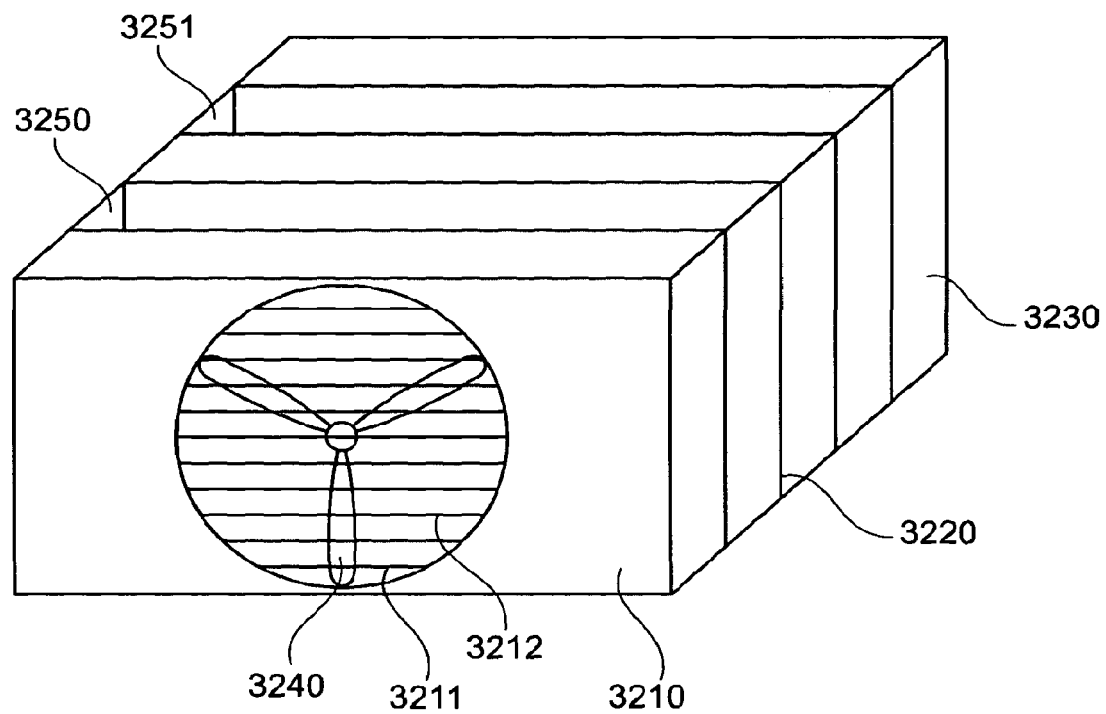
FIG. 32 is a representation of stacking several layers of the above embodiments behind each other (with reducing PCM temperature in each bank in sequence along the air flow direction) where more heat can be extracted from the air.

FIG. 32 is a representation of an arrangement of three of the apparatus depicted in FIG. 31 stacked in front of each other. The three heat exchangers 3210, 3220, 3230 have monotonically increasing PCM melting point temperatures. In front of 3210 is placed fan 3240. Depicted on 3210 are exemplar fins 3211, 3212. Between banks 3210 and 3220 is placed insulation 3250 (also with a hole in the centre to allow air to flow between banks); likewise between banks 3220 and 3230, is placed insulation 3251.

Figure 33:
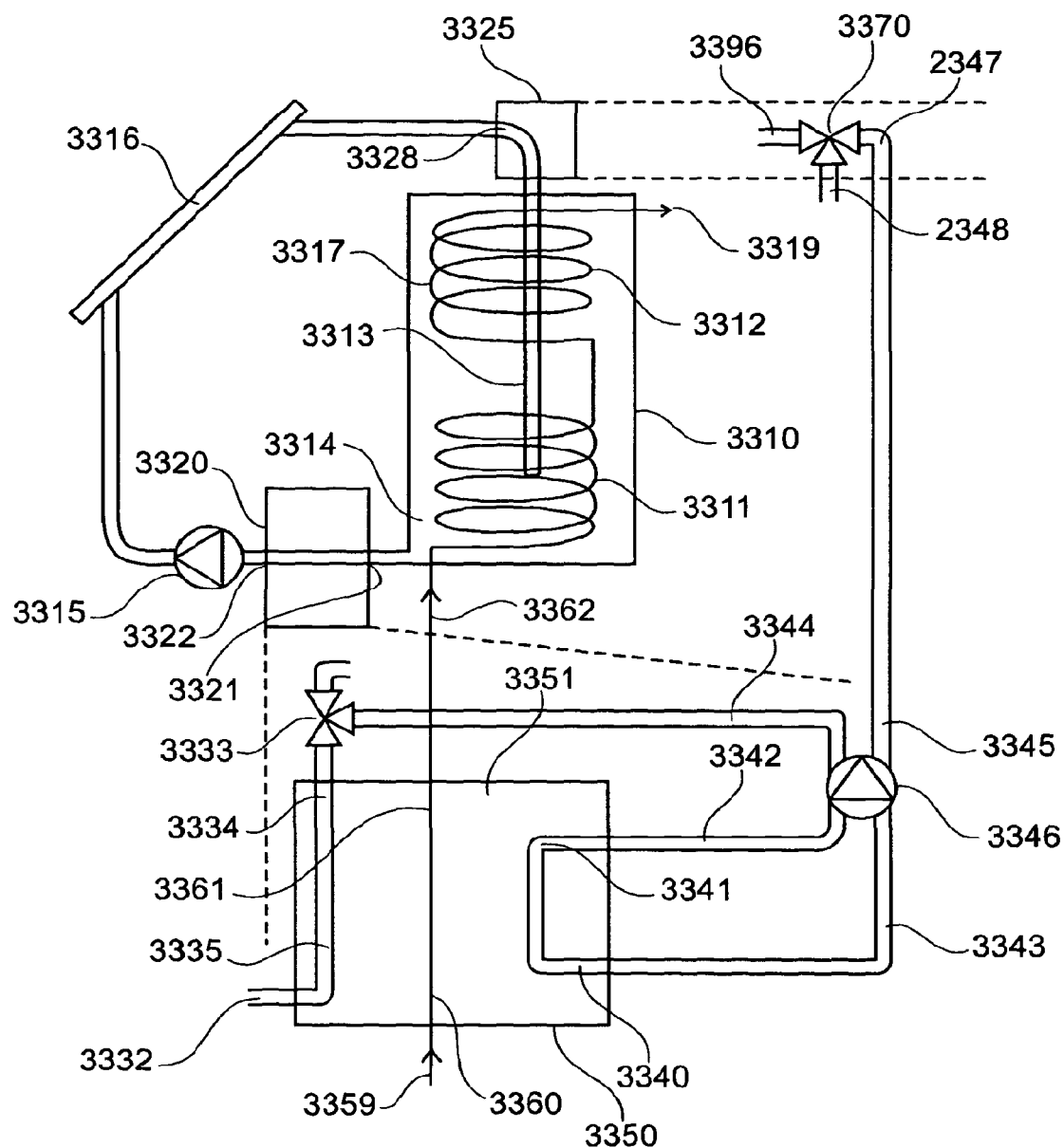
FIG. 33 is a representation of return temperature of solar HTF from a Thermal Store to a solar thermal panel which can be controlled to enhance the thermodynamic efficiency of the solar thermal panel.

FIG. 33 depicts an embodiment of the present invention, comprising a solar thermal hot water tank of conventional design, a set of PCM banks and heat pumps, configured to be a retrofit option to existing designs of solar thermal systems extracting more heat from return solar HTF before it flows back to the solar panel; using such stored heat for both pre-heating mains water before the solar thermal tank and for delayed heat pumping, for example overnight.

Boxes 3320 and 3325 depict where the new apparatus is introduced to a prior art system.

A tank 3310 is filled with solar thermal HTF, which is stratified with a temperature typically 40° C. at 3314 and 70° C. at 3317. Solar HTF flows out near 3314 via pump 3315 to solar panel 3316, returning via stratifying lance 3313 into the tank. Internal drinking water coils 3311 and 3312 heat mains water introduced at 3362 and deliver hot water at 3319.

In the current invention, the pipe between 3321 and 3322 (box 3320) is substituted with 3331 to 3332. From 3331, solar HTF flows via valve 3333, which is switched in normal solar collecting operation to flow on via heat exchangers 3334, 3335 in banks 3351, 3350 respectively. Banks 3350, 3351 contain phase change material melting at 20° C., 32° C. respectively. A larger number of banks and different temperatures could be used. Thus at 3332 HTF flows to the solar panel at a much lower temperature e.g. 25° C. than the e.g. 40° C. at 3314 in the tank 3310, thereby having extracted additional energy, and improving the performance of the solar panel 3316 by reducing its operating temperature and hence thermal losses.

Cold mains water at e.g. 10° C. introduced at 3359 into heat exchangers 3360 and in sequence 3361 in banks 3350, 3351 respectively, is pre-heated to e.g. 25° C. before entering water tank 3310 at 3362.

In the current invention, the pipe from 3326 to 3328 (box 3325) is substituted by connections 3346 and 3348 passing through three-way valve 3370, which also has connection 3347.

Overnight or at other times, if there is insufficient heat in the HTF in tank 3310, valves 3370 and 3333 may be switched so that water near 3314 flows out of tank 3310, via 3331 and valve 3333 to heat pump 3346, where heat is added, raising the HTF's temperature, and then back via 3347, valve 3370 and stratifying lance 3313 back into tank 3310. Heat pump 3346 extracts heat from banks 3351 and 3350 by way of flowing refrigerant via 3343 through heat exchanger means 3340 and in sequence 3341 and back via 3342.

Figure 34:
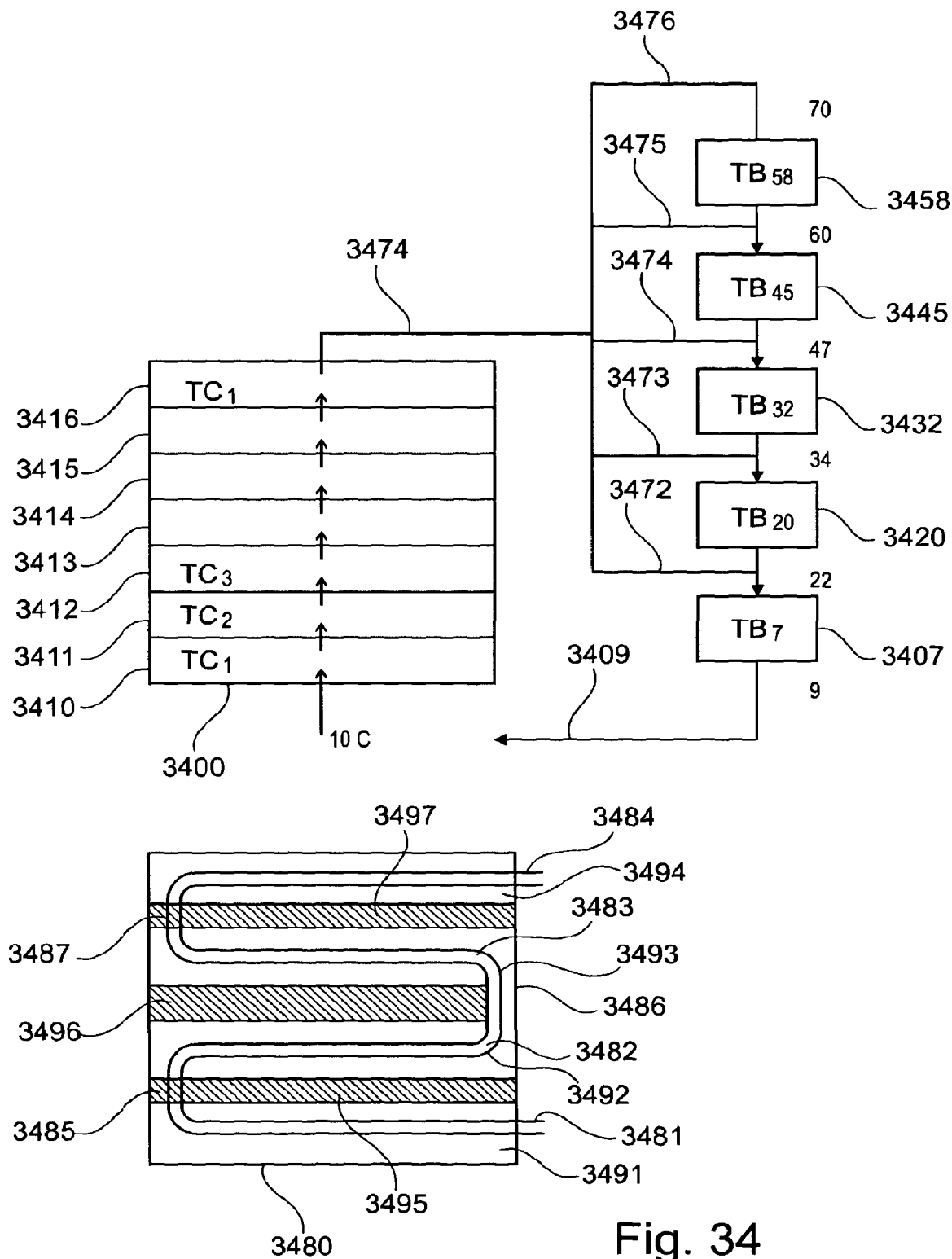
FIG. 34 is a representation of where a solar panel is broken into a number of thermally isolated segments.

FIG. 34 depicts a schematic (top) and plan view (bottom) of a solar panel divided into thermally isolated sections combined with a multi-bank PCM thermal store (which may have heat pumping, not depicted).

A solar thermal panel 3400 is divided into thermally isolated sections 3410, 3411, . . . , 3417. Cold return solar HTF flows from 3409 at e.g. 9-10° C. into section 3410 and then in sequence through 3411, . . . , 3417 gaining heat and rising in temperature at each section, until it exits at 3471. The benefit of a low controlled return temperature is that a solar panel operates at lower temperature and hence less captured solar thermal energy is lost by re-radiation, convection and conduction. However a conventional solar panel made of metal will have substantially the same average temperature across its whole surface. Thermal isolation of sections avoids the temperature averaging and advantageously further reduces the thermal losses from the solar panel.

Sensors, control logic and valves (not illustrated), based on the temperature of HTF at 3471, choose one of pipes 3472, . . . , 3476 as the starting point to flow into heat exchangers in banks 3458, 3445, 3432, 3420, 3407, that respectively contain phase change material with melting point temperatures 58° C., 45° C., 32° C., 20° C., 7° C. In the illustrated embodiment once HTF enters a first selected bank it will also pass through all banks with lower melting points in descending sequence of banks.

3480 is a plan view of a physical embodiment of a thermally segmented solar panel. Metal pipe sections 3481, 3482, 3483, 3484 are bonded to metal plate sections 3491, 3492, 3493, 3494. Plastic pipe section 3485 joins metal pipes 3481 to 3482; plastic pipe 3486 joins 3482 to 3483; 3487 joins 3483 to 3484. Insulated plate section 3495 joins metal plates 3491 to 3492; insulated plate 3496 joins 3492 to 3493; 3497 joins 3493 to 3494. Solar HTF enters via 3481 and leaves via 3484.

Figure 35:
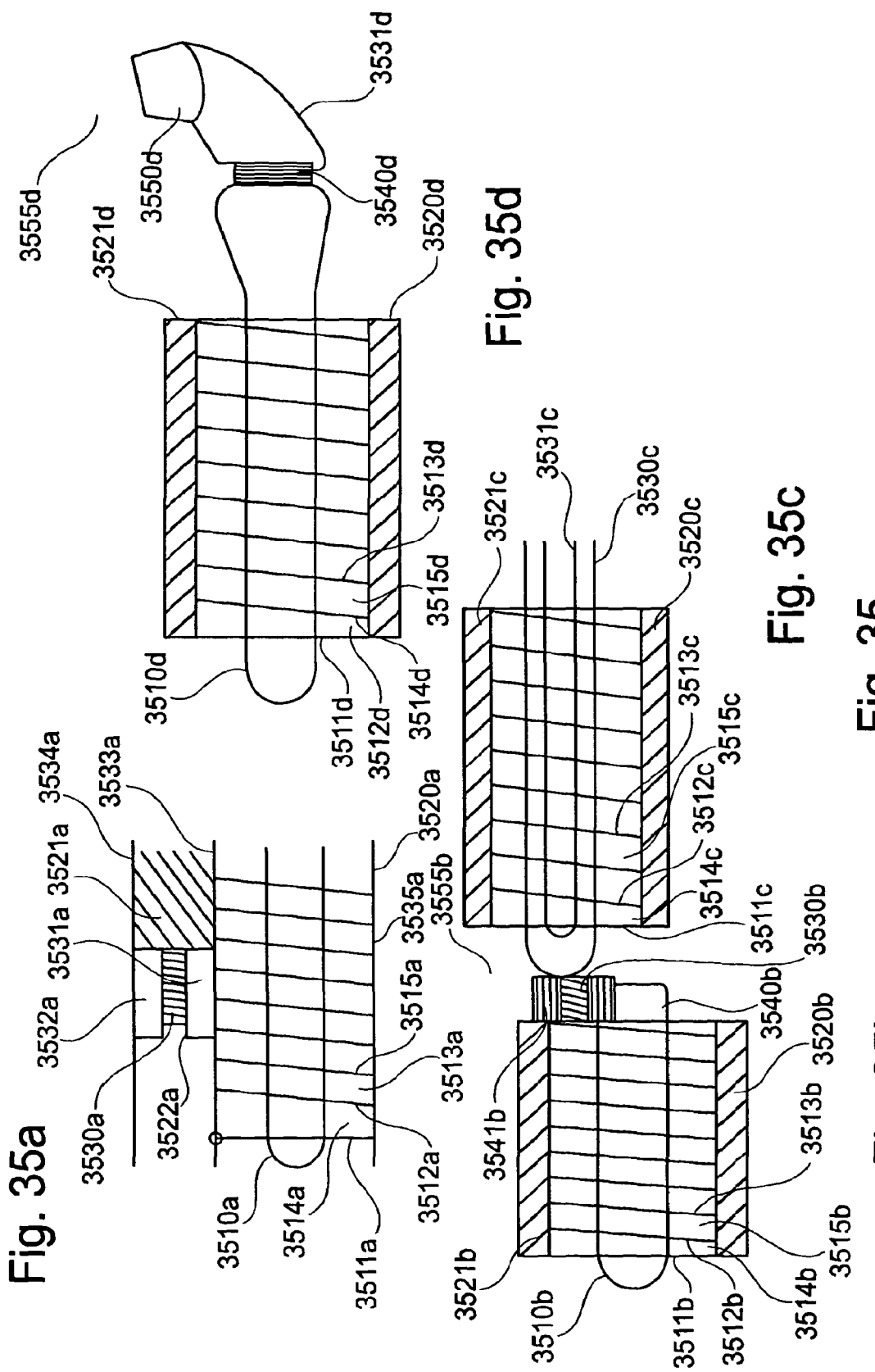
FIG. 35a-d is a representation of a further energy system according to the present invention.

FIG. 35 depicts in semi-schematic, sectional view four alternative embodiments (in sub-FIGS. 35a, 35b, 35c, 35d) of integration of heat pumping with a fin-tube PCM-HTF heat exchanger.

In all sub-FIG. 3510x is a representation of all the tubes carrying HTF or refrigerant through the heat exchanger; 3511x, 3512x, 3513x depict three representative fins; PCM/composite is present between all fins, for instance in locations 3514x, 3515x. Where present, 3520x, 3521x represent insulation around heat exchangers and between banks. (In all cases insulation at the ends is present but not depicted.)

Sub-FIG. 35a additionally depicts metal plates 3535a, 3533a bonded to or pushed against (so as to make thermal contact with) respectively the bottom and top surfaces of the array of fins. A further metal plate 3534a is also depicted representing the bottom metal plate of the next higher PCM bank (not shown). Thermally bonded to the top of plate 3533a is a metal block 3531a, which is then bonded to or pushed against (so as to make thermal contact with) with the bottom of thermoelectric device 3530a. Thermally bonded to the bottom of plate 3534a is a metal block 3532a, which is then bonded to or pushed against (so as to make thermal contact with) the top of thermoelectric device 3530a. Metal plate 3533a, metal block 3531a, combined with fins 3511a, 3512a, 3513a and other metal fins, provide a conductive thermal path for heat to be drawn from the PCM to the thermoelectric device 3530a. Similarly the metal block 3532a, metal plate 3534a and fins (not depicted) of the next higher bank provide a conductive thermal path for heat to be pushed from the thermoelectric device into the PCM of the next higher bank. Insulation is present at 3521a, 3522a between the banks, and surrounding the metal blocks and thermoelectric device. A similar arrangement of insulation, metal blocks and thermoelectric devices may be present at 3520a but is not depicted.

Sub-FIG. 35b depicts a variation in which there are no metal plates or blocks, and insulation 3520b, 3521b is continuous above and below. Tube 3510b forms a closed loop driven by a pump (not illustrated) carrying heat to/from a cold plate heat exchanger 3540b, to which is bonded or pushed (so as to make thermal contact) a thermoelectric device 3530b, which in turn is bonded to or pushed against (so as to make thermal contact) a further cold plate 3541b to connect to a circuit 3555b to carry heat to the next higher bank.

Sub-FIG. 35d depicts a variation on 35b in which 3540d is a plate heat exchanger connecting to circuit 3531d carrying refrigerant to/from a heat pump 3550d, from which a refrigerant circuit 3555d carries heat to the next higher bank.

Sub-FIG. 35c depicts a variation on 35d in which a secondary tube 3531c carries refrigerant to/from a heat pump (not depicted) and 3531c passes through the fins of the heat exchanger.

Figure 36:
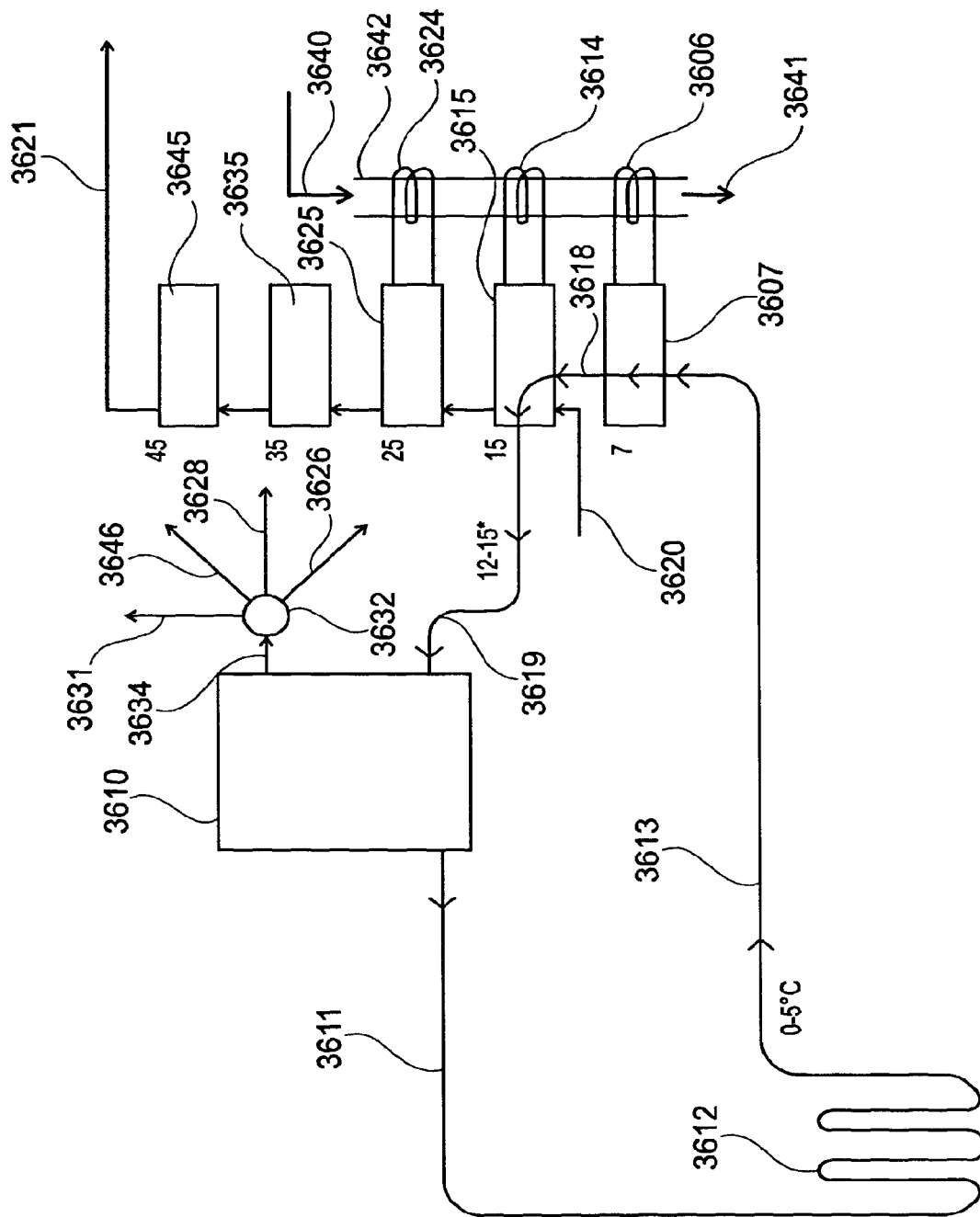
FIG. 36 is a representation of a yet further energy system according to the present invention.

FIG. 36 depicts a schematic of a ground source heat pump of conventional design connected to a set of PCM banks and waste water heat recovery, wherein the configuration increases by around 10° C. the temperature at which brine from the ground loop flows to the heat pump, thus augmenting its overall efficiency. The extra heat energy is obtained from waste water heat recovery and stored in PCM until heat pumping starts.

Waste water pipe 3642 is equipped in three locations with heat recovery coils 3624, 3614, 3606, connected to PCM banks 3625, 3615, 3607 respectively (containing PCM with melting temperatures 25° C., 15° C., 7° C. respectively). Temperature and flow sensors in the waste water stream, control logic and pumps (all not illustrated) run heat transfer fluid through 3624, 3614, 3606 as appropriate whenever waste water is flowing from 3642 at higher temperature than banks 3625, 3615, 3607.

Mains cold water enters at 3620 and is heated by banks 3615, 3625, 3635, 3645 in sequence before exiting at 3621, benefiting from waste water heat stored in banks 3615 and 3625.

Heat stored in bank 3615 is at times too cold to add significant heat to mains water, and heat in bank 3607 is too cold. A heat pump 3610 flows heat transfer fluid at below 0° C. through pipe 3610 to ground loop 3612, from which it returns via pipe 3613 at a typical return temperature 0 to 5° C. The HTF passes via heat exchangers in banks 3607 and 3615 picking up heat and rising in temperature before it enters heat pump 3610 via pipe 3619, at which point its temperature may be 10-15° C.

The output of the heat pump 3629 is switched by heat exchangers and valves (not illustrated) at 3630 and directed to heating loop 3631 or via 3626 to bank 3625, via 3636 to bank 3635 or via 3646 to bank 3645.

In alternative embodiments the ground source heat pump could be an air source heat pump, and the heat pump could be a series of small heat pumps between banks rather than a monolithic heat pump.

It will be clear to those of skill in the art, that the above described embodiment of the present invention is merely exemplary and that various modifications and improvements thereto may be made without departing from the scope of the present invention. For example, any suitable type of phase change material may be used which can be used to store energy.

The invention claimed is:

1. A thermal energy store capable of accepting, storing and releasing thermal energy at a range of more than one temperature to/from at least one thermal energy source and/or sink, said thermal energy store comprising:
    a configuration of three or more thermal energy storage banks, each of said thermal energy storage banks having an operating temperature range;
    at least one or more of the thermal energy storage banks contains thermal energy storage material comprising a single material or a mixture of materials;
    wherein said thermal energy storage material in at least one thermal energy storage bank of the thermal energy storage banks contains at least one or more types of thermal energy storage material that undergoes at least one energy absorbing and/or releasing phase transition at one or more temperatures or one or more subranges of temperatures within the operating temperature ranges of each thermal energy storage bank of the thermal energy storage banks;
    wherein each phase transition is associated with a change in physical and/or chemical properties of said thermal energy storage material; and
    two or more independently controlled thermal energy transfer connections, wherein each connection comprises one or more devices for transferring heat from a lower temperature body to a higher temperature body, each connection linking two or more of the thermal energy storage banks, wherein said configuration of three or more thermal energy storage banks is a multi-bank phase change material thermal store;

wherein one or more multi-bank phase change material thermal stores includes a control system that regulates an amount of electricity drawn by the thermal energy store or elements of the thermal energy store based on one or more of the following criteria:

a stability of the electricity grid;
an availability of electricity;
a cost of electricity;
a carbon intensity of electricity;
a signal from an electricity grid operator;
a criticality of the operation of an element of the thermal energy store.

2. A thermal energy store according to claim 1, wherein the thermal energy store is combined with at least one rechargeable battery, the battery being charged by at least one or more of a photovoltaic electricity source, a diesel generator and a mains electricity source.

3. A thermal energy store according to claim 1, wherein one or more electrical elements of the thermal energy store is powered by direct current.

4. A thermal energy store according to claim 1, wherein the thermal energy store is equipped with an inverter.

5. A thermal energy store according to claim 3, wherein the thermal energy store is configured to provide grid support services that are monitored and reported to at least one of a thermal energy store owner, a thermal energy store user, an electricity grid operator and an electricity supply company.

6. A thermal energy store according to claim 3, wherein the control system has control electronics for local electricity generation which are integrated into the thermal energy store.

* * * * *